US012659549B2

(12) United States Patent
Chen et al.

(10) Patent No.: US 12,659,549 B2
(45) Date of Patent: Jun. 16, 2026

(54) USER INTERFACE FOR IMPROVING USER ENGAGEMENT ON A MEDIA CONTENT ITEM BEING PRESENTED

(71) Applicant: Adeia Guides Inc., San Jose, CA (US)

(72) Inventors: Tao Chen, Palo Alto, CA (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 122 days.

(21) Appl. No.: 18/541,963

(22) Filed: Dec. 15, 2023

(65) Prior Publication Data

US 2025/0203168 A1 Jun. 19, 2025

(51) Int. Cl.
*H04N 21/4725* (2011.01)
*G06F 9/451* (2018.01)
(52) U.S. Cl.
CPC ......... *H04N 21/4725* (2013.01); *G06F 9/451* (2018.02)
(58) Field of Classification Search
None
See application file for complete search history.

(56) References Cited

U.S. PATENT DOCUMENTS

| | | |
|---|---|---|
| 11,270,556 B2 | 3/2022 | Givant |
| 2019/0180570 A1* | 6/2019 | Czubak ............... G07F 17/3288 |
| 2021/0097289 A1 | 4/2021 | Rousson et al. |
| 2022/0086511 A1 | 3/2022 | Laakkonen et al. |

OTHER PUBLICATIONS

Contessa Brewer et al.,"Aristocrat unveils NFL-themed slot machines as league navigates legal gambling",(Jul. 2023) (https://www.cnbc.com/2023/07/27/aristocrat-unveils-nfl-themed-slot-machines.html),(CNBC),(3 pages).
Marc Cooper,"Sit and Spin [] How slot machines give gamblers the business",(Dec. 2005),(https://www.theatlantic.com/magazine/archive/2005/12/sit-and-spin/304392/),(8 pages).
Vegas Slots Online, "Slot Machines with Sports Themes",(https://www.vegasslotsonline.com/types/themed-slots/sports/),(accessed approx. May 2023)(https://web.archive.org/web/20230515213717/https://www.vegasslotsonline.com/types/themed-slots/sports/)(7 pages).

* cited by examiner

*Primary Examiner* — James R Marandi
(74) *Attorney, Agent, or Firm* — HG LAW LLP

(57) ABSTRACT

The present disclosure relates to methods and systems for improving, by a device, user engagement on a media content item being presented. To do so, the device presents, to the user, a poll related to the media content item during the presentation of the media content item. The device generates the poll by e.g., analyzing the media content item to identify multiple events, categorizing the multiple events based on the analyzing, selecting an event category and selecting randomly at least one event outcome within the selected event category. The device is able to choose, upon a user input, an event outcome among the randomly-selected at least one event outcome.

20 Claims, 45 Drawing Sheets

102 → Analyzing, in real time, images of a media content item to generate media content item-related metadata.

FIG. 1 (Cont. I)
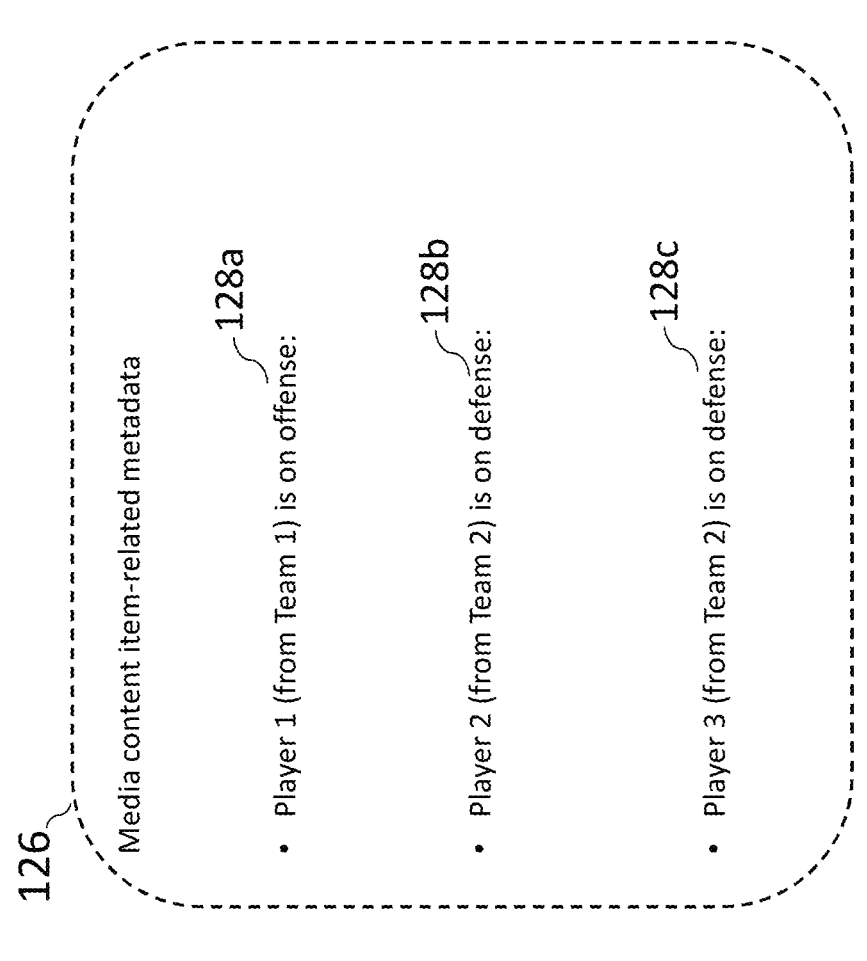
126
Media content item-related metadata
128a
• Player 1 (from Team 1) is on offense:
128b
• Player 2 (from Team 2) is on defense:
128c
• Player 3 (from Team 2) is on defense:

FIG. 1 (Cont. II)
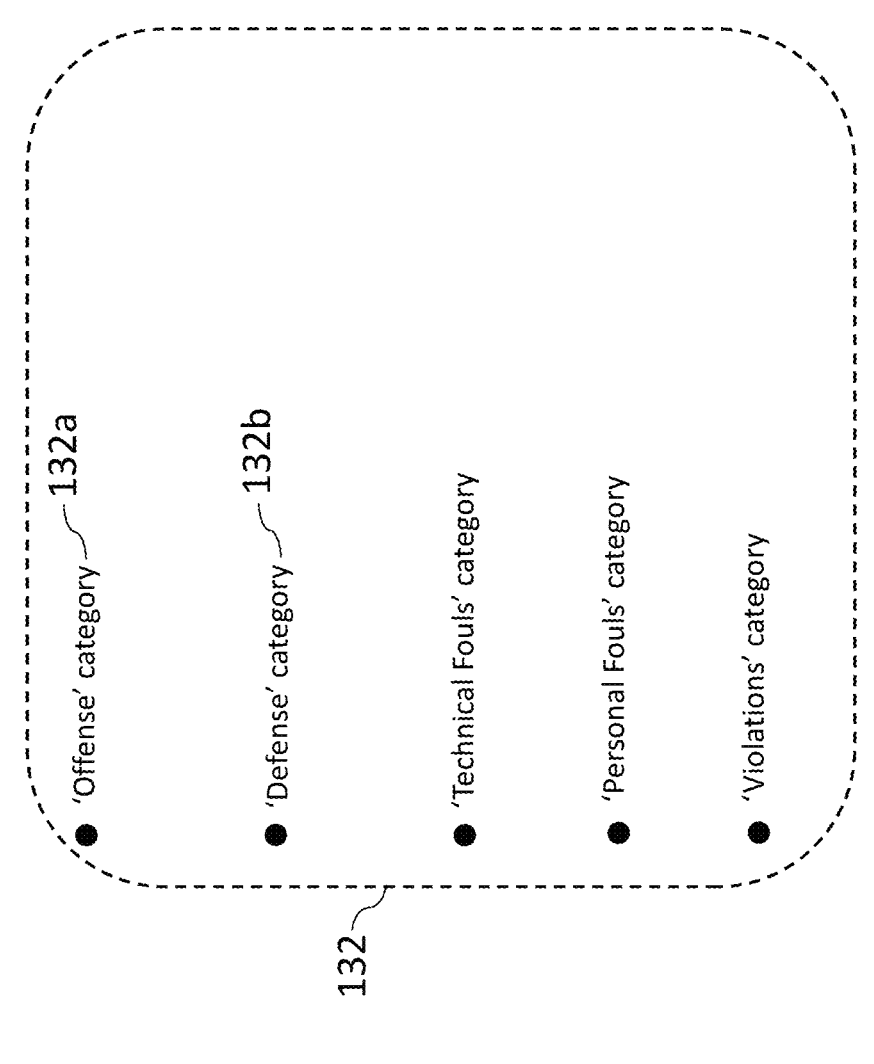
132
- 'Offense' category — 132a
- 'Defense' category — 132b
- 'Technical Fouls' category
- 'Personal Fouls' category
- 'Violations' category
130
Listing event categories
2
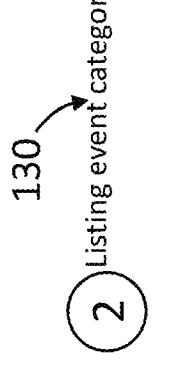
128a
Player 1 is on offense
128b
Player 2 is on defense
128c
Player 3 is on defense
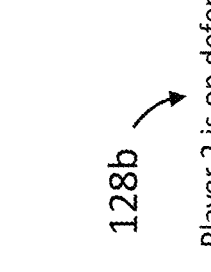

FIG. 1 (Cont. III)
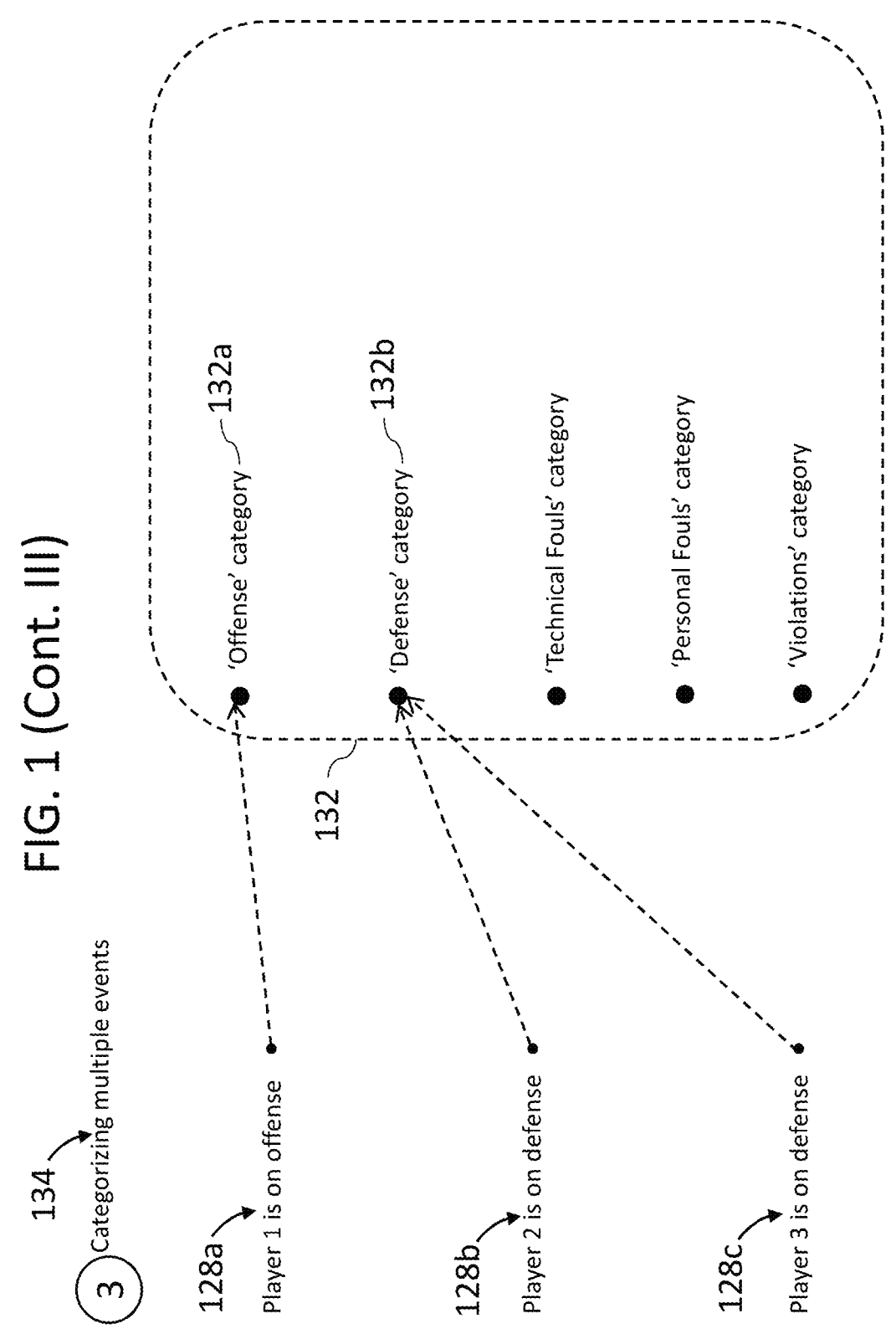

FIG. 1 (Cont. IV)
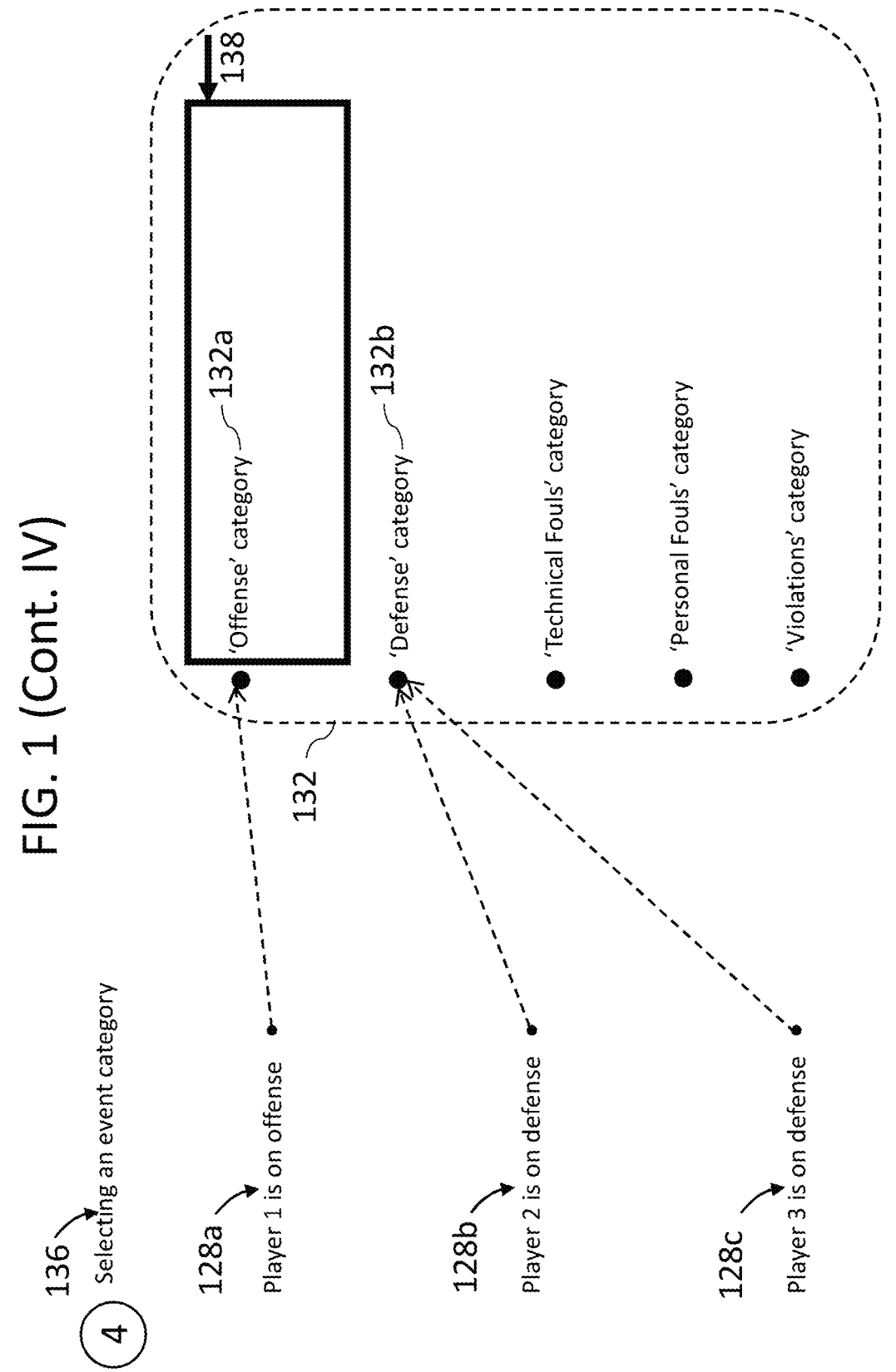

FIG. 1 (Cont. V)

5 — 140 — Randomly selecting at least one event outcome within the selected event category

142 aiming, scoring, missing attempt, fouling, committing a violation, etc.

6 — 144 — Accessing metadata to determine a probability of occurrence of the randomly-selected at least one event outcome

146

| Actions | Odds related to Player 1 when within the "key" of an opponent's backcourt |
|---|---|
| Fouling | 1/3 |
| Shooting | 1/3 |
| Losing ball | 1/3 |
| Passing ball | 1/6 |
| Scoring | 1/6 |

| Actions | Odds related to Player 1 per period |
|---|---|
| Fouling once | 1/5 |
| Fouling twice | 1/3 |
| Fouling three times | 1/10 |
| Fouling four times | 1/10 |

FIG. 1 (Cont. VI)
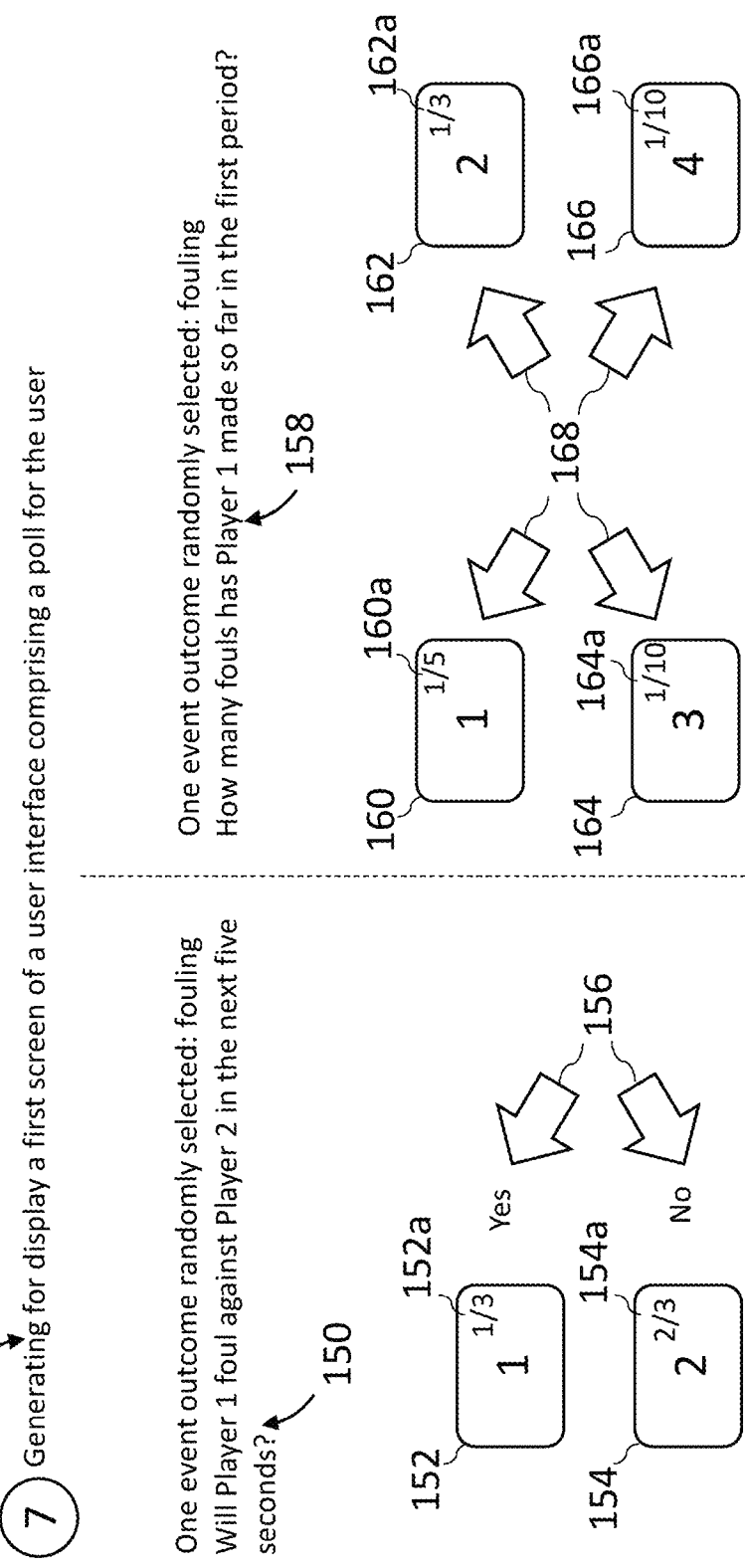
148 — Generating for display a first screen of a user interface comprising a poll for the user
One event outcome randomly selected: fouling
How many fouls has Player 1 made so far in the first period?
158
160a 1/5 1
162a 1/3 2
164a 1/10 3
166a 1/10 4
168
One event outcome randomly selected: fouling
Will Player 1 foul against Player 2 in the next five seconds?
150
152a 1/3 1 Yes
154a 2/3 2 No
156

FIG. 1 (Cont. VII)

One event outcome randomly selected: fouling, scoring

Will Player 1 foul against Player 2 or scores in the next five seconds?

170

172

172a

1/3

1 fouling

176

174

174a

1/6

2 scoring

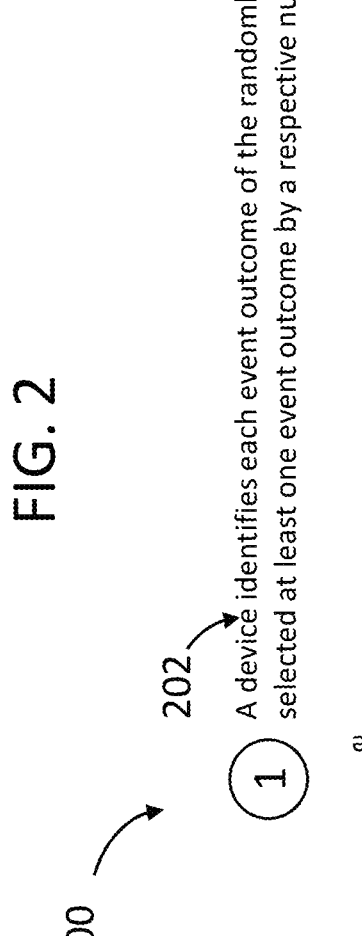

A device identifies each event outcome of the randomly-selected at least one event outcome by a respective number

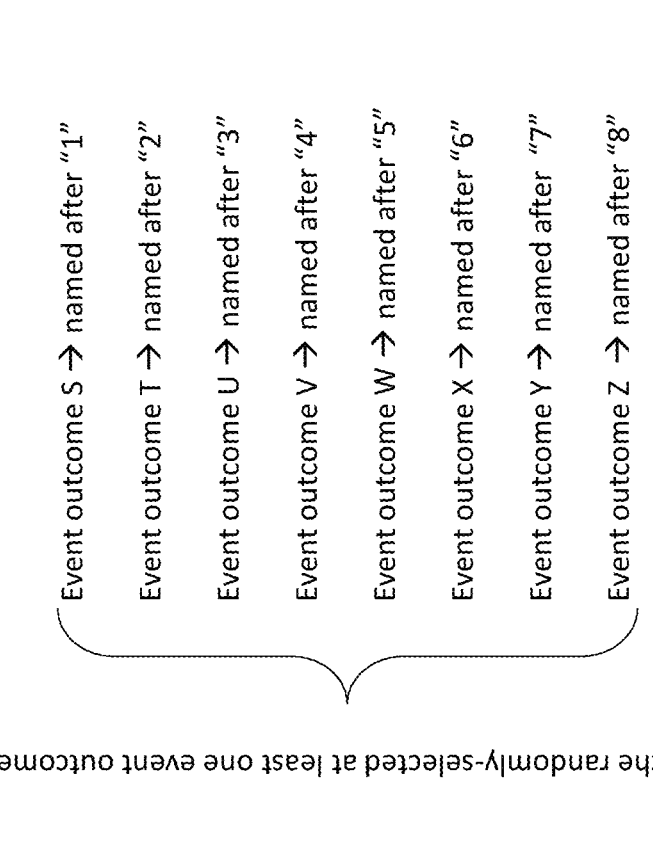

Event outcome S → named after "1"

Event outcome T → named after "2"

Event outcome U → named after "3"

Event outcome V → named after "4"

Event outcome W → named after "5"

Event outcome X → named after "6"

Event outcome Y → named after "7"

Event outcome Z → named after "8"

the randomly-selected at least one event outcome

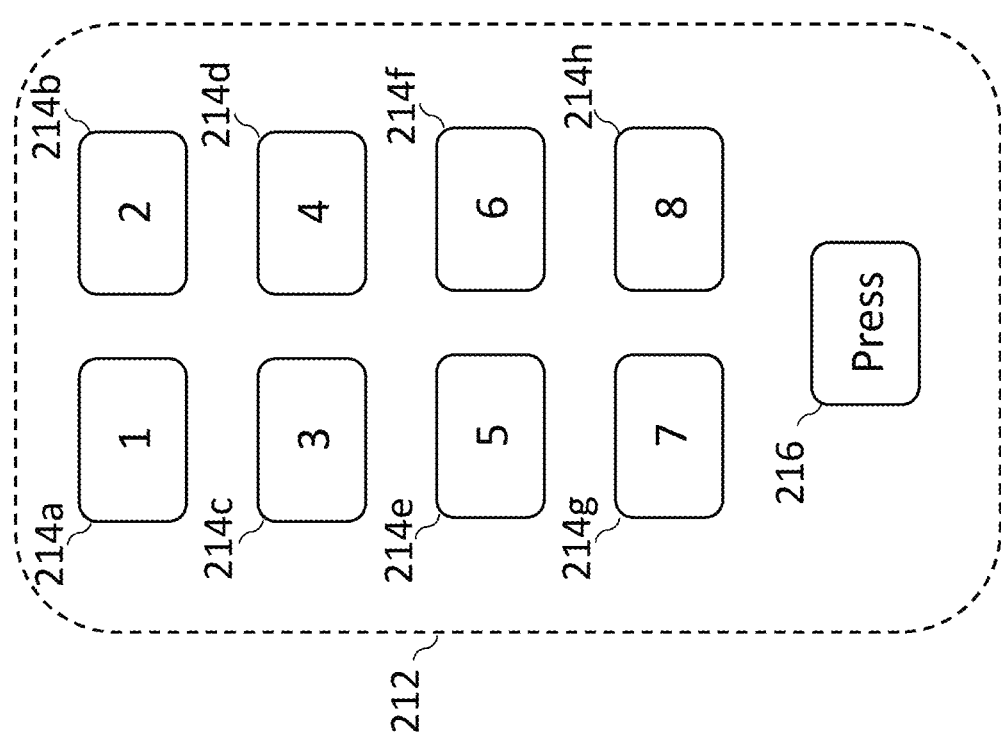
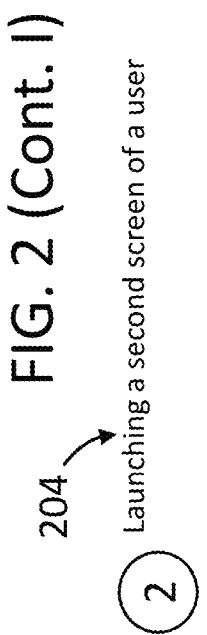
FIG. 2 (Cont. I)

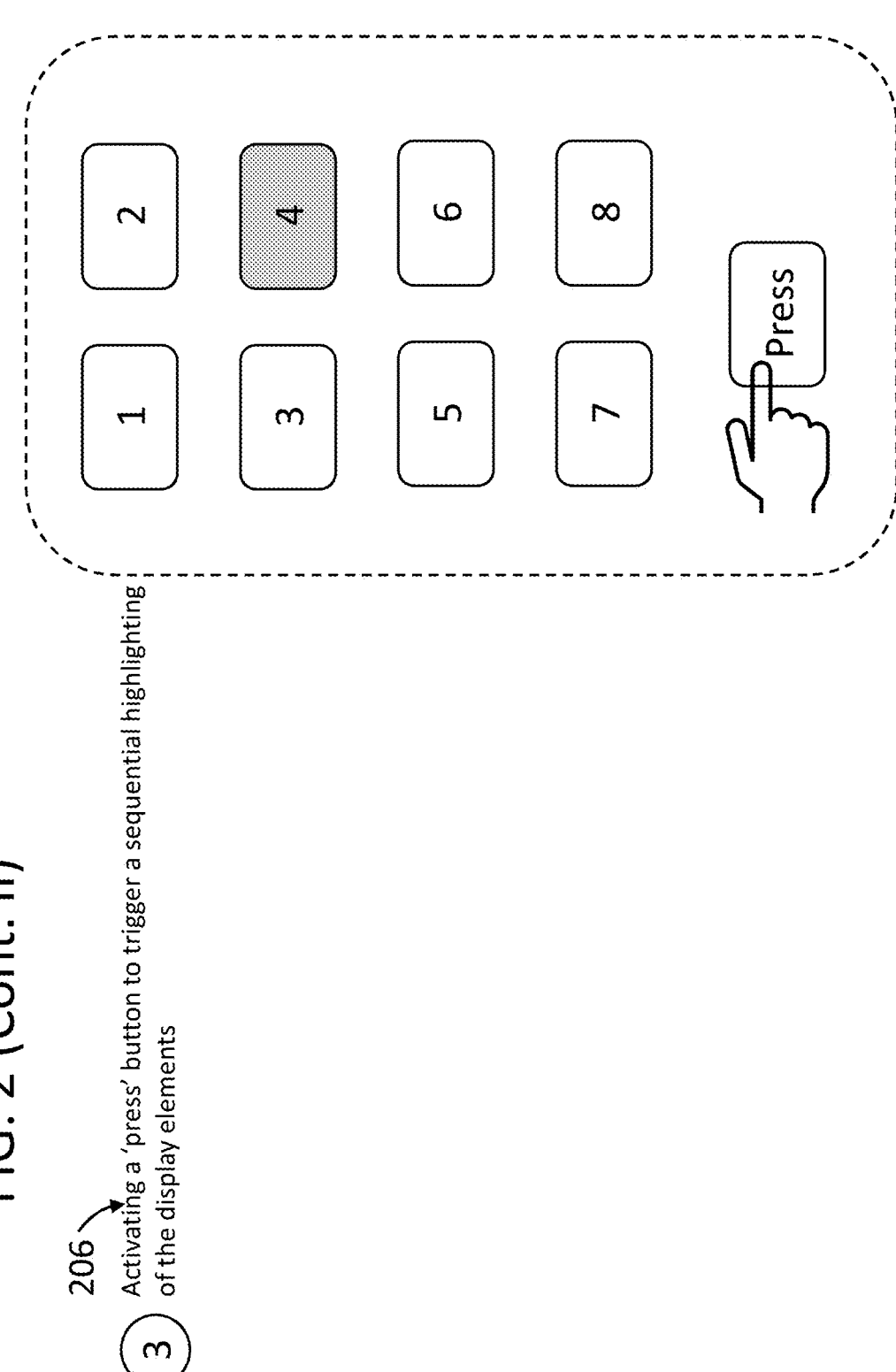
FIG. 2 (Cont. II)
206
3 Activating a 'press' button to trigger a sequential highlighting of the display elements FIG. 2 (Cont. III)
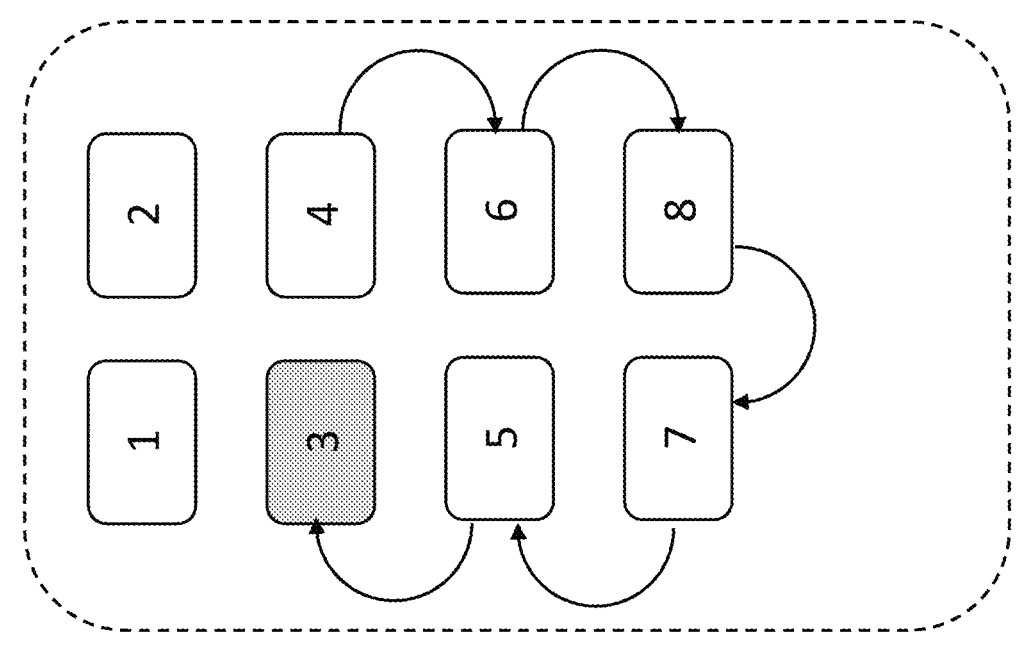
208
4
Compelling the sequential highlighting of the display elements to adopt a circular-like motion during a period

5  Stopping the sequential highlighting at the end of the period at a display element

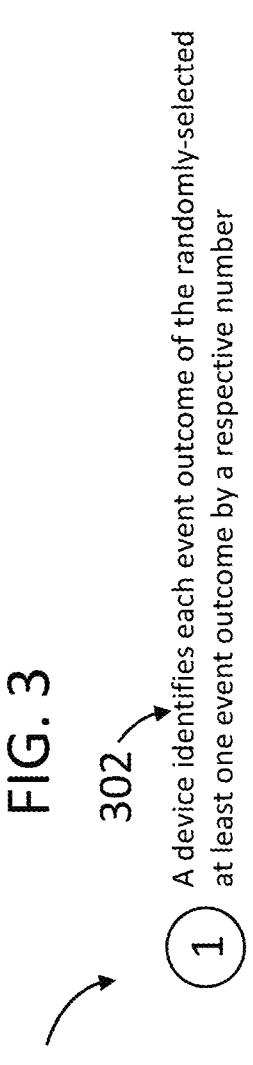

A device identifies each event outcome of the randomly-selected at least one event outcome by a respective number (1)

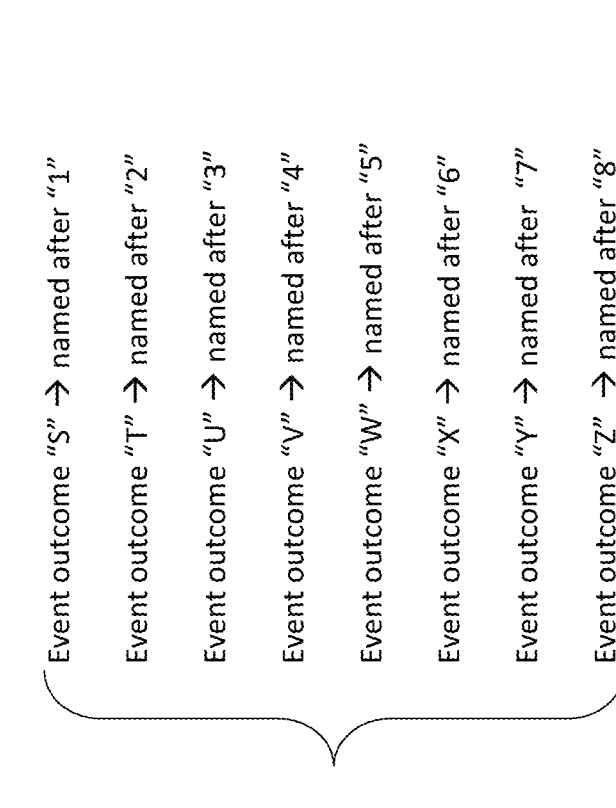

Event outcome "S" → named after "1"

Event outcome "T" → named after "2"

Event outcome "U" → named after "3"

Event outcome "V" → named after "4"

Event outcome "W" → named after "5"

Event outcome "X" → named after "6"

Event outcome "Y" → named after "7"

Event outcome "Z" → named after "8"

the randomly-selected at least one event outcome

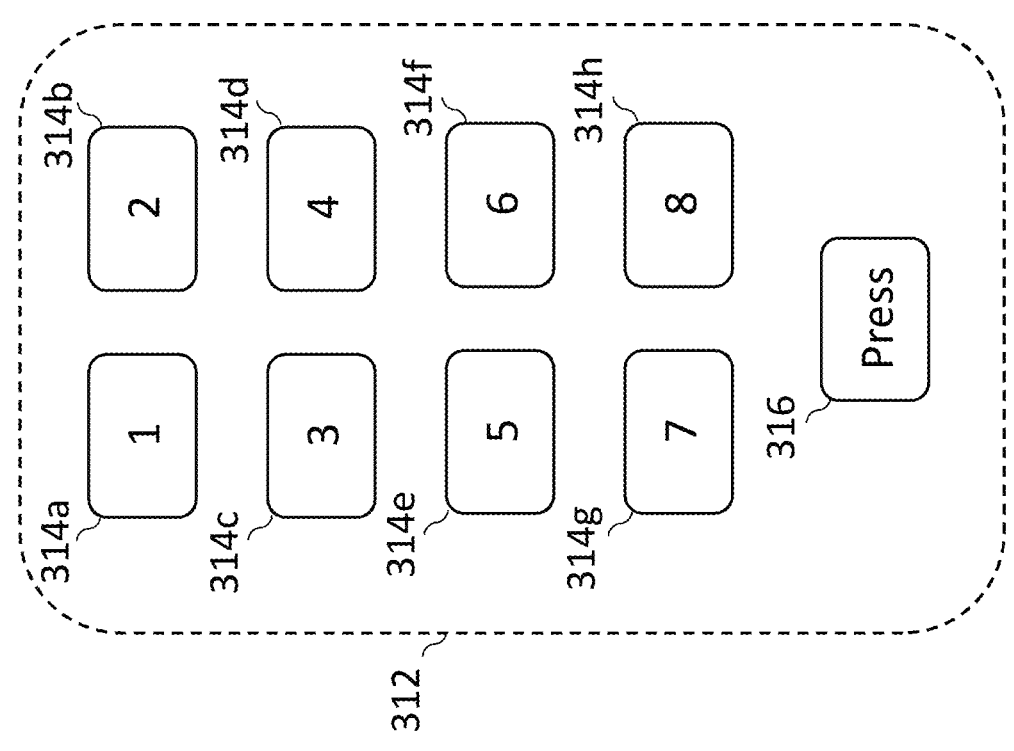
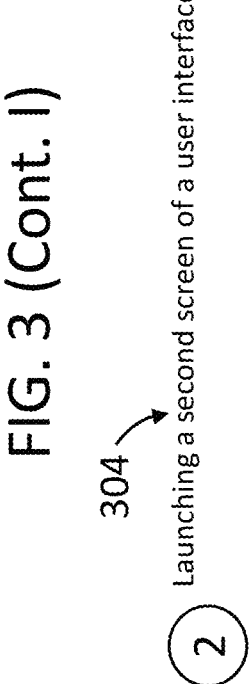
FIG. 3 (Cont. I)

FIG. 3 (Cont. II)
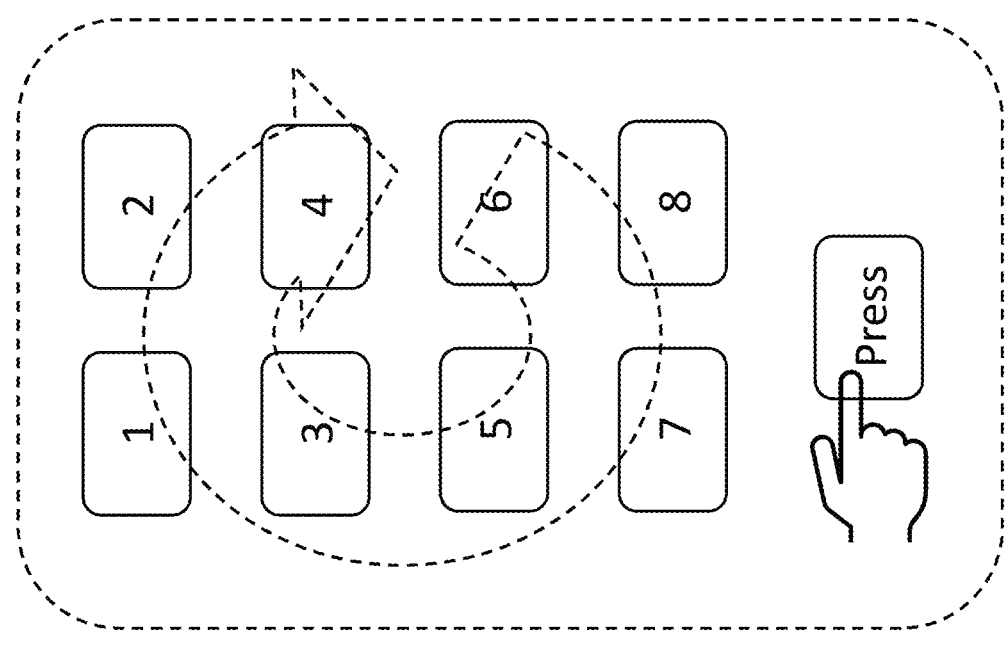
306
3  Activating the 'press' button to trigger the simultaneous motions of the plurality of display elements into the same trajectory at the same velocity

FIG. 3 (Cont. III)
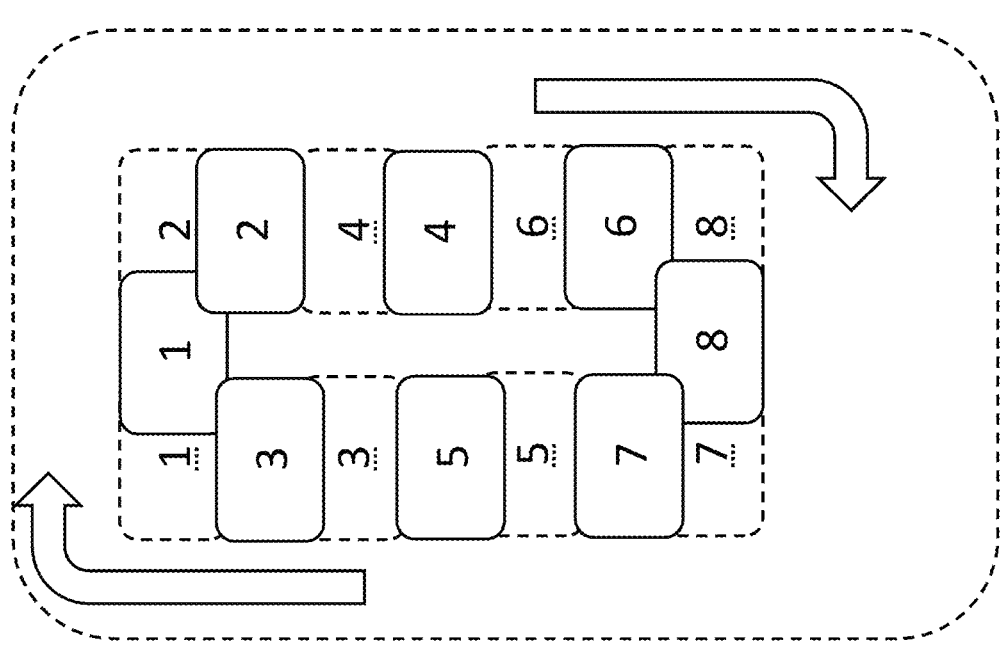
308
4. Compelling the simultaneous motions of the plurality of display elements into the same trajectory at the same velocity during a period FIG. 3 (Cont. IV)
310
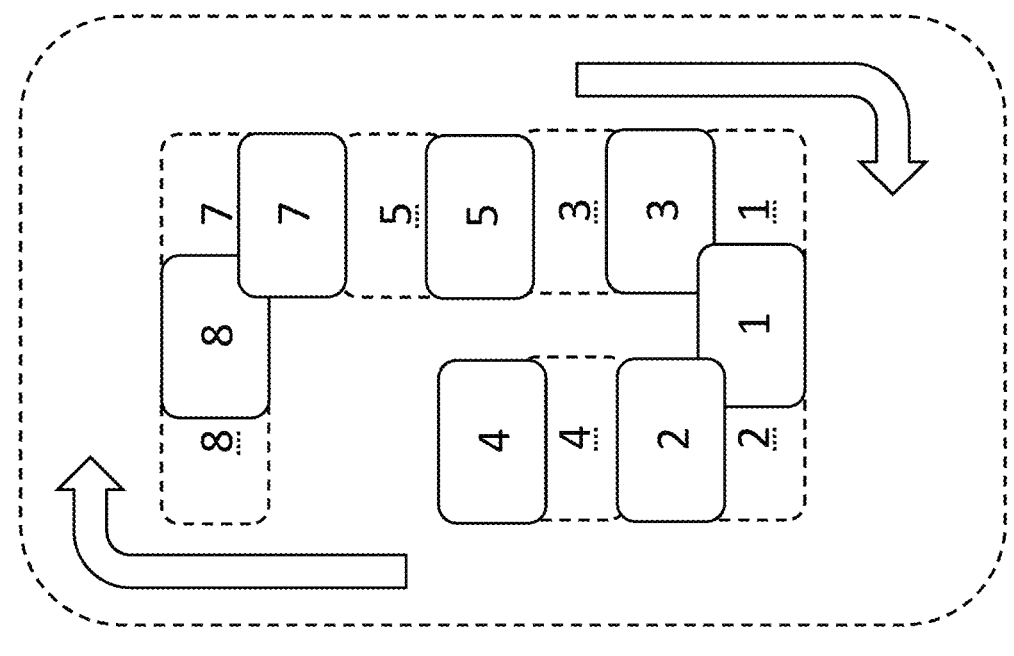
⑤ Activating a random number generator that determines the disappearance of a first display element from the second screen at the end of the first time increment

FIG. 3 (Cont. V)
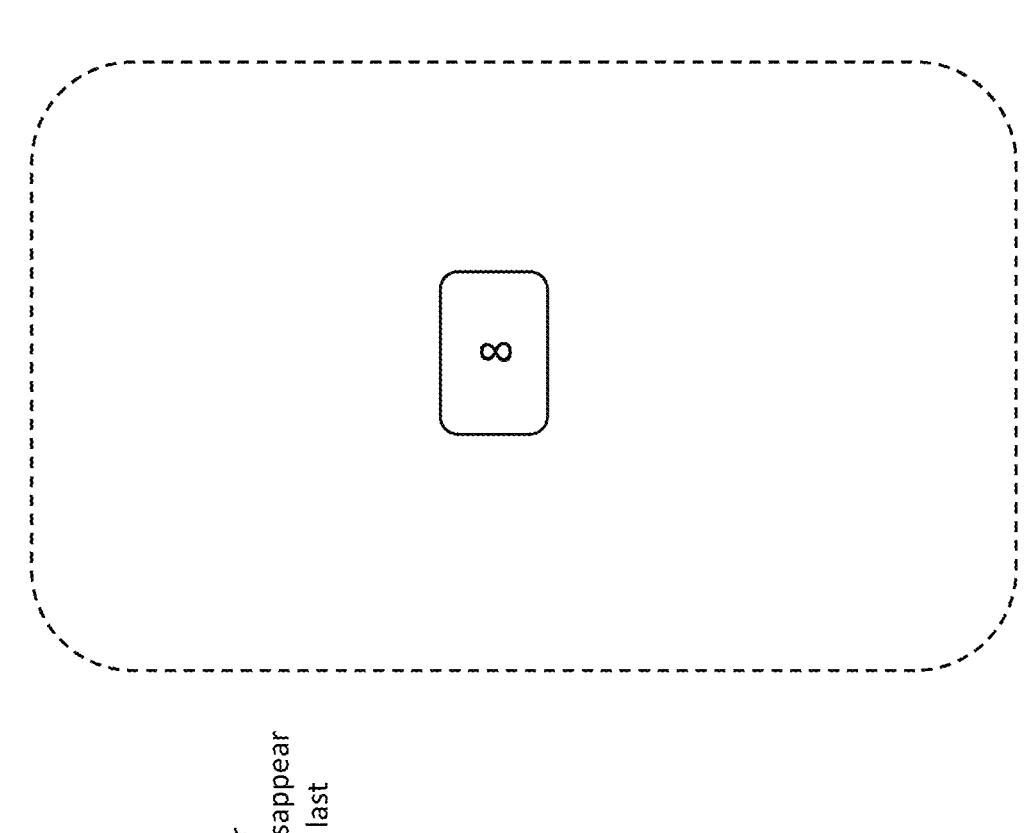
312
(6) After the device has activated the random number generator to determine the display elements to disappear at the end of each time increment, presenting the last remaining display element at the end of period

FIG. 4

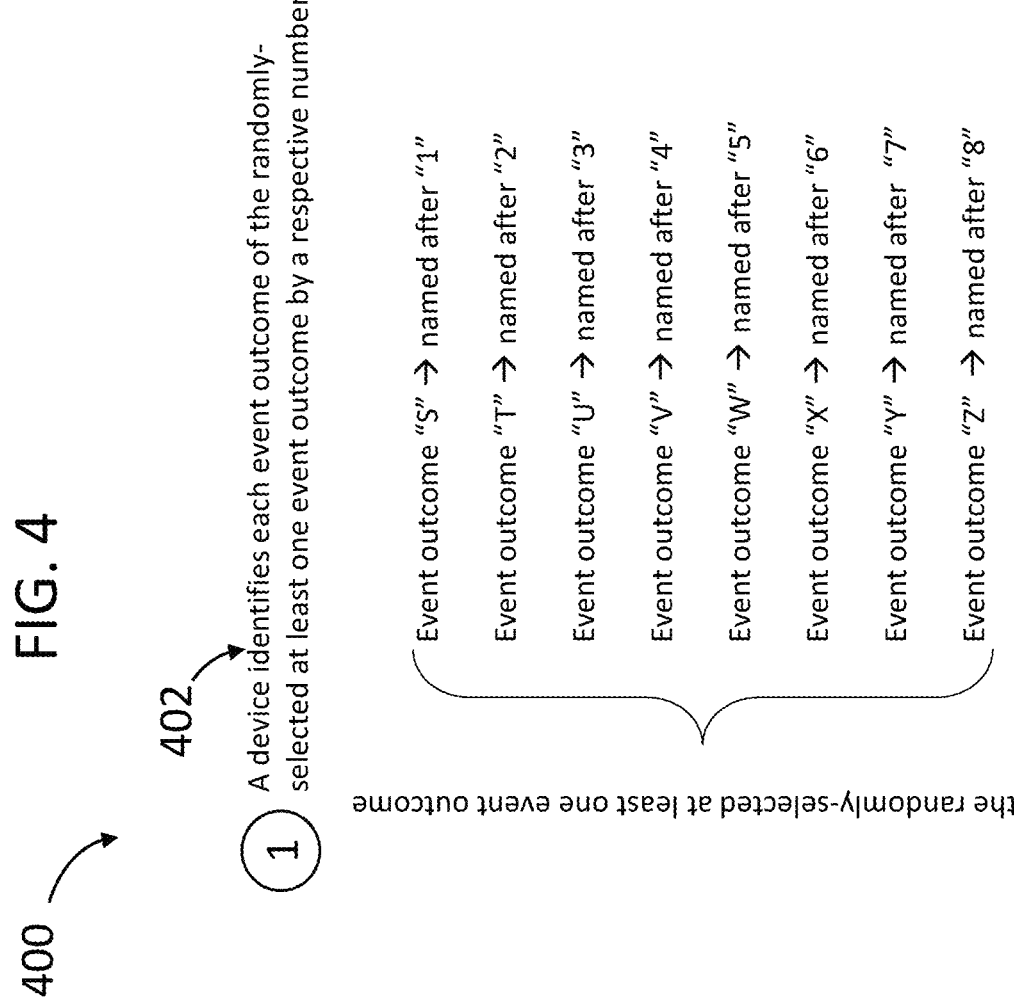

400

402

(1) A device identifies each event outcome of the randomly-selected at least one event outcome by a respective number Event outcome "S" → named after "1"

Event outcome "T" → named after "2"

Event outcome "U" → named after "3"

Event outcome "V" → named after "4"

Event outcome "W" → named after "5"

Event outcome "X" → named after "6"

Event outcome "Y" → named after "7"

Event outcome "Z" → named after "8"

the randomly-selected at least one event outcome

FIG. 4 (Cont. I)
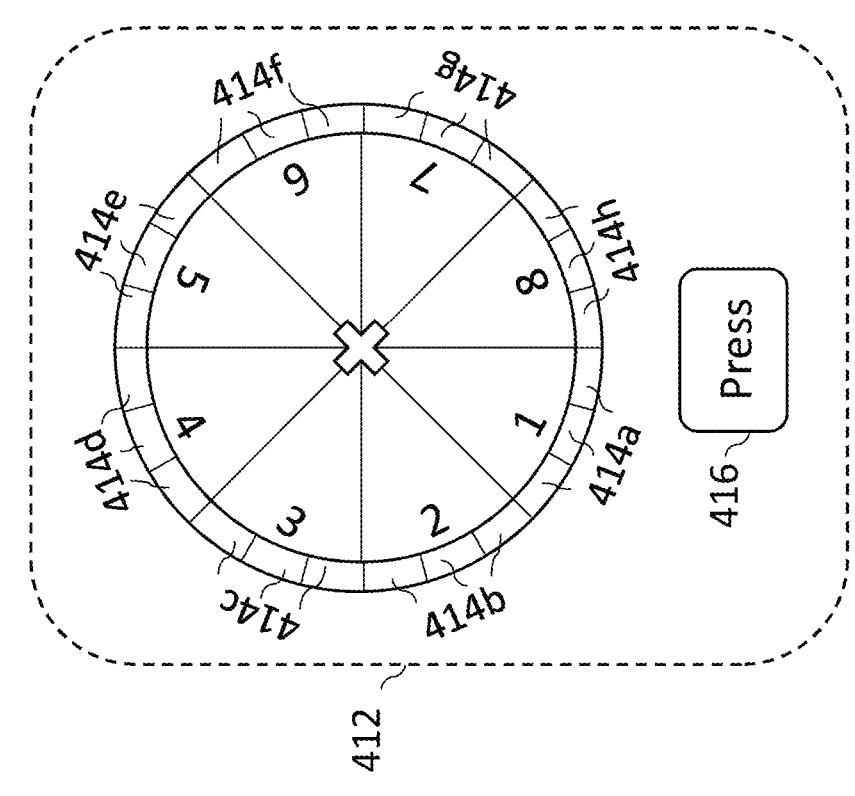
② 404 Launching a second screen of a user interface

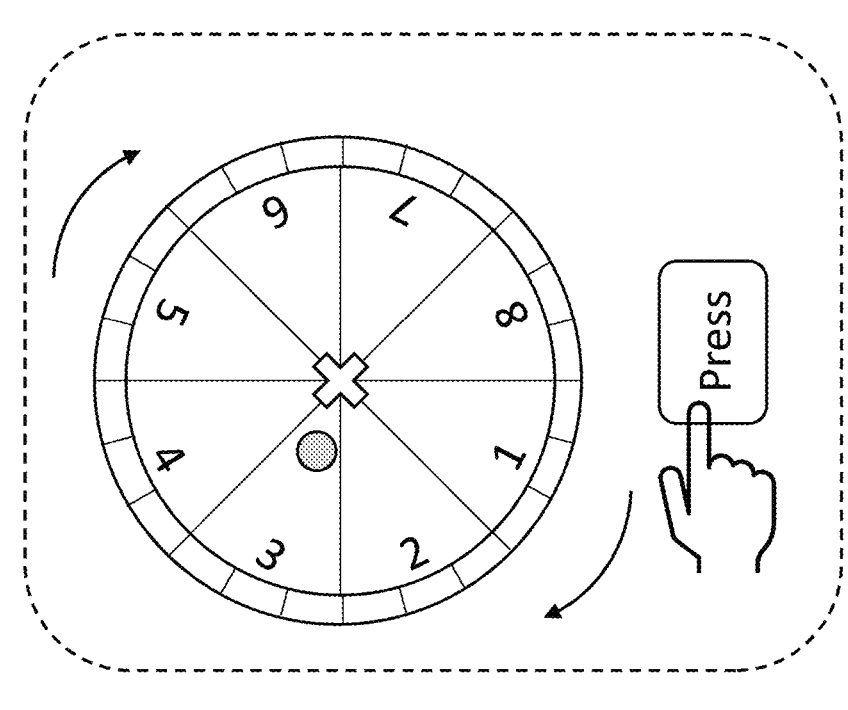
FIG. 4 (Cont. II)
406
③ Activating the 'press' button to trigger the spinning of the roulette and subsequently the dropping of a ball

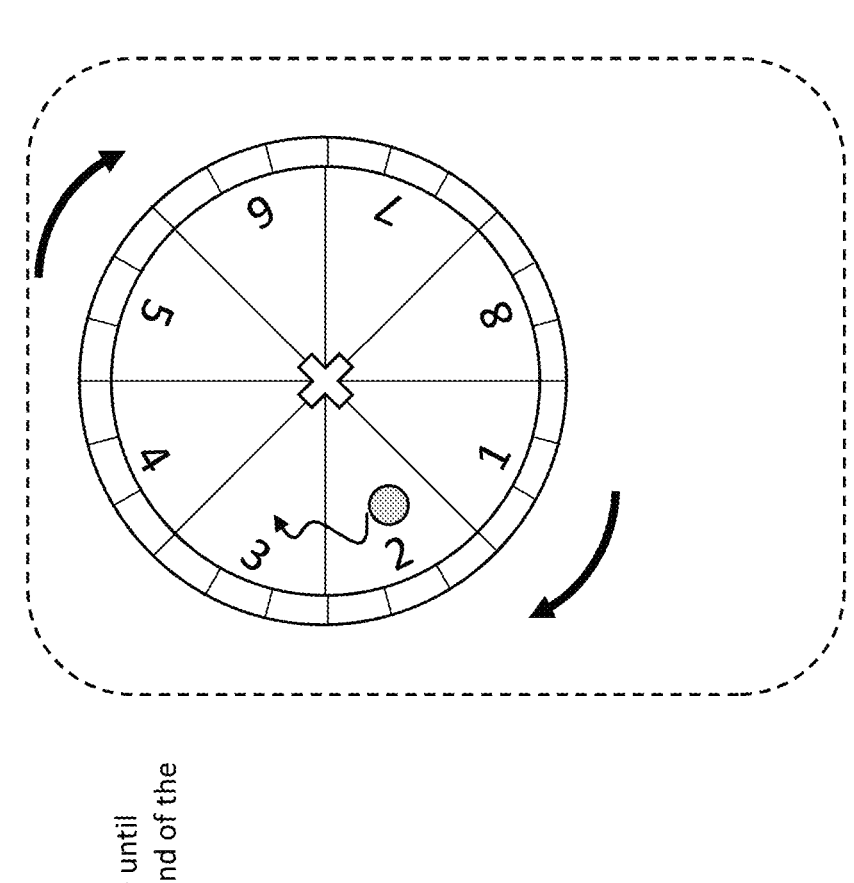
FIG. 4 (Cont. III)
408 →
4 — Increasing the spinning velocity of the roulette until reaching a maximum spinning velocity at the end of the first period

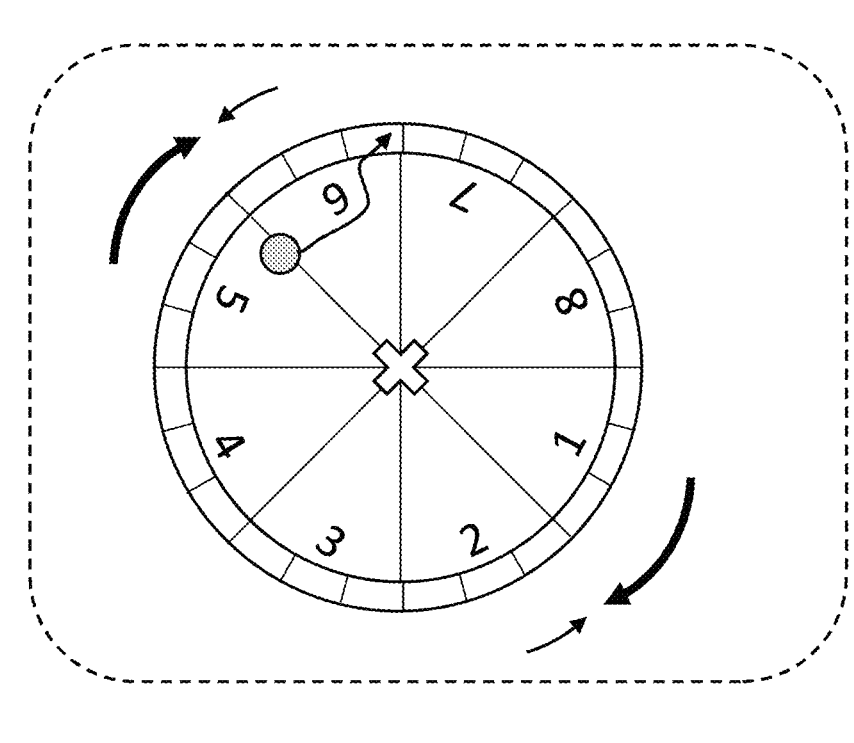
FIG. 4 (Cont. IV)
410
⑤ Decreasing the spinning velocity of the roulette during each time increment of a second period

FIG. 4 (Cont. V)
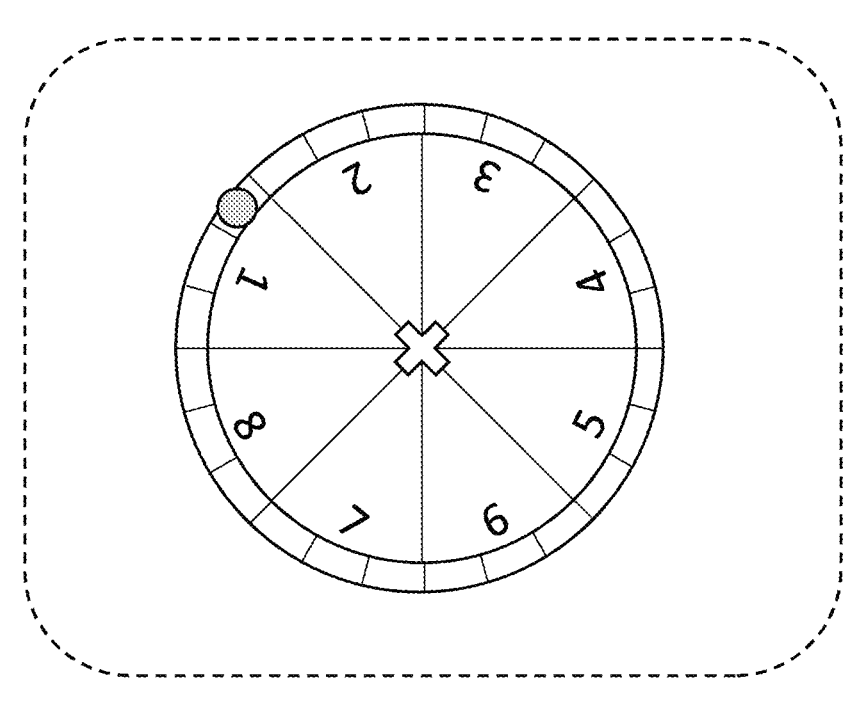
412
⑥ Setting the spinning velocity of the roulette to zero (rotation per minute) at the end of the last time increment of the second period to trap the ball in a compartment

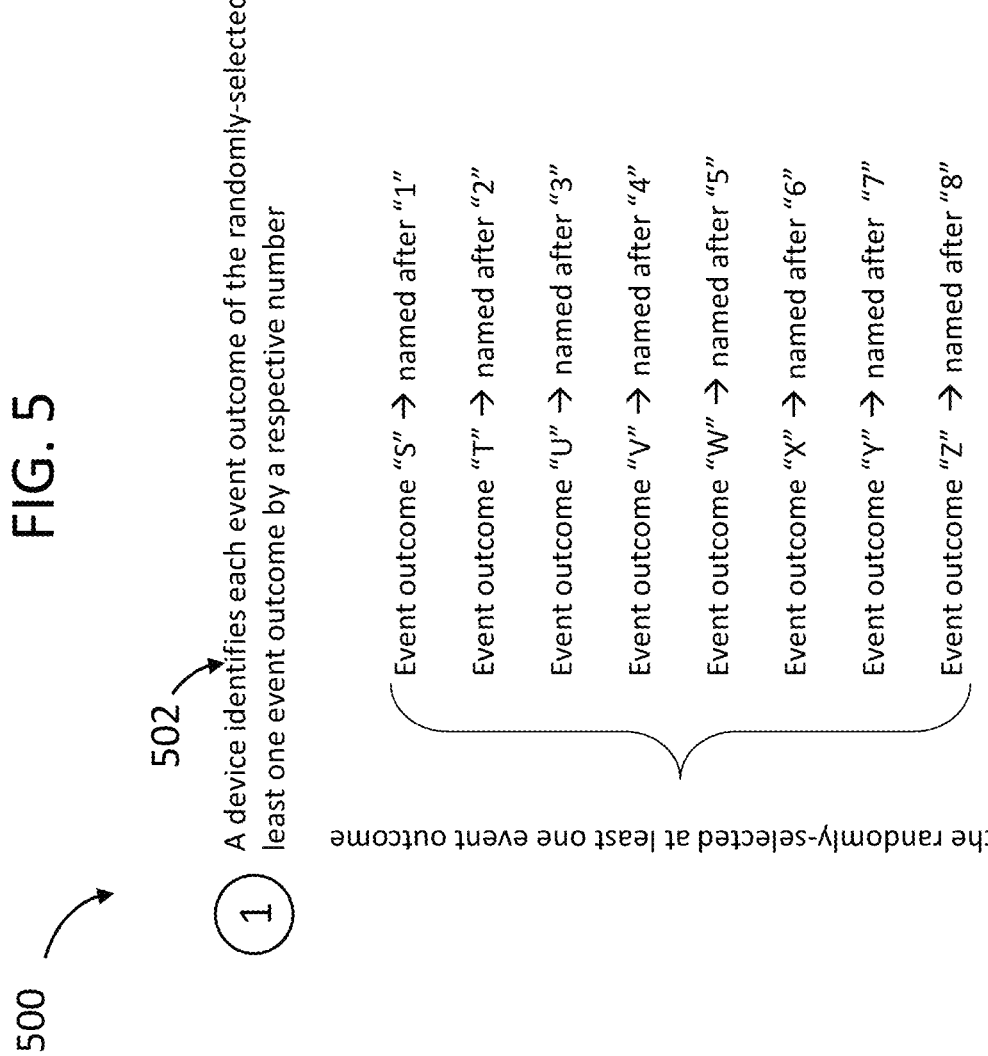

1

A device identifies each event outcome of the randomly-selected at least one event outcome by a respective number Event outcome "S" → named after "1"

Event outcome "T" → named after "2"

Event outcome "U" → named after "3"

Event outcome "V" → named after "4"

Event outcome "W" → named after "5"

Event outcome "X" → named after "6"

Event outcome "Y" → named after "7"

Event outcome "Z" → named after "8"

the randomly-selected at least one event outcome

FIG. 5 (Cont. I)
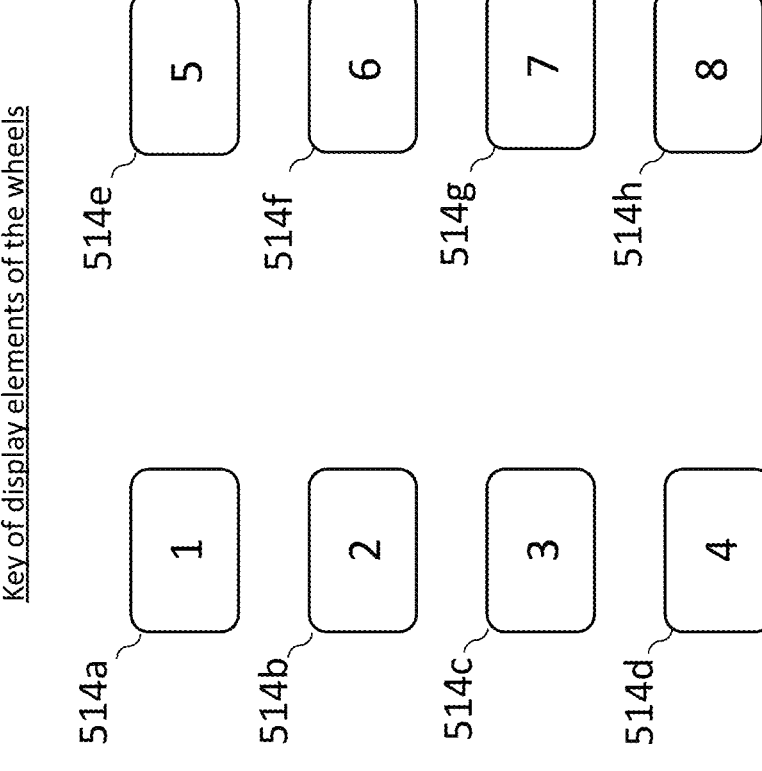
Key of display elements of the wheels

Launching a second screen of a user interface

512

| 1 | 4 | 7 | 2 | 5 |
|---|---|---|---|---|
| 2 | 5 | 8 | 3 | 6 |
| 3 | 6 | 1 | 4 | 7 |

516

Press

FIG. 5 (Cont. III)
506
③ Activating a 'press' button to trigger the spinning of each wheel of the slot machine.
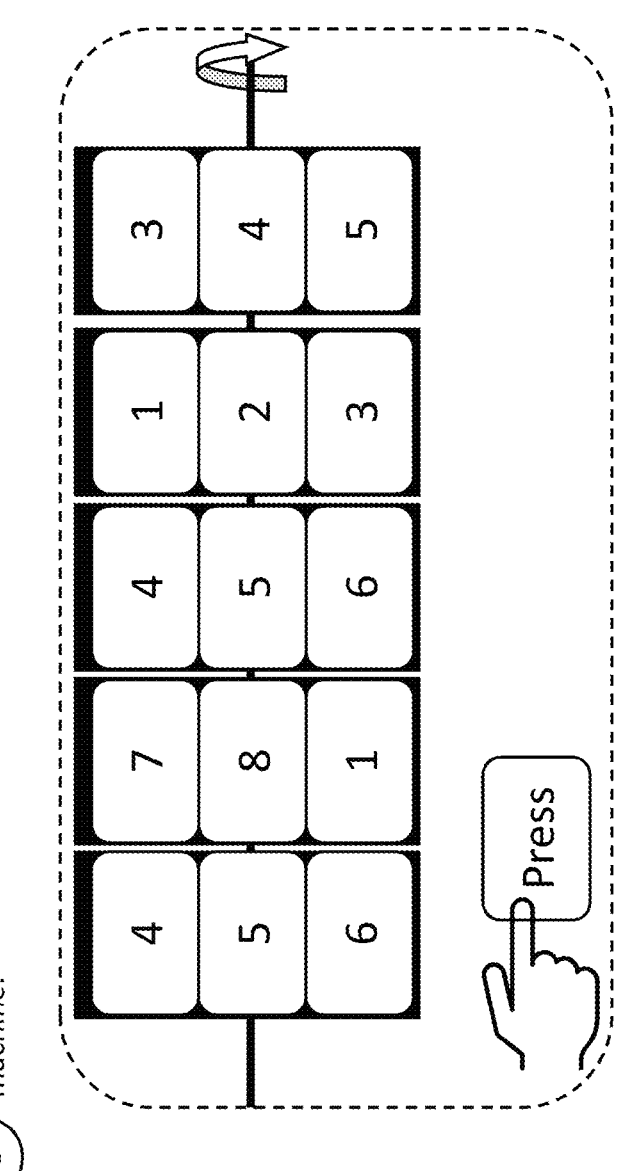

FIG. 5 (Cont. IV)
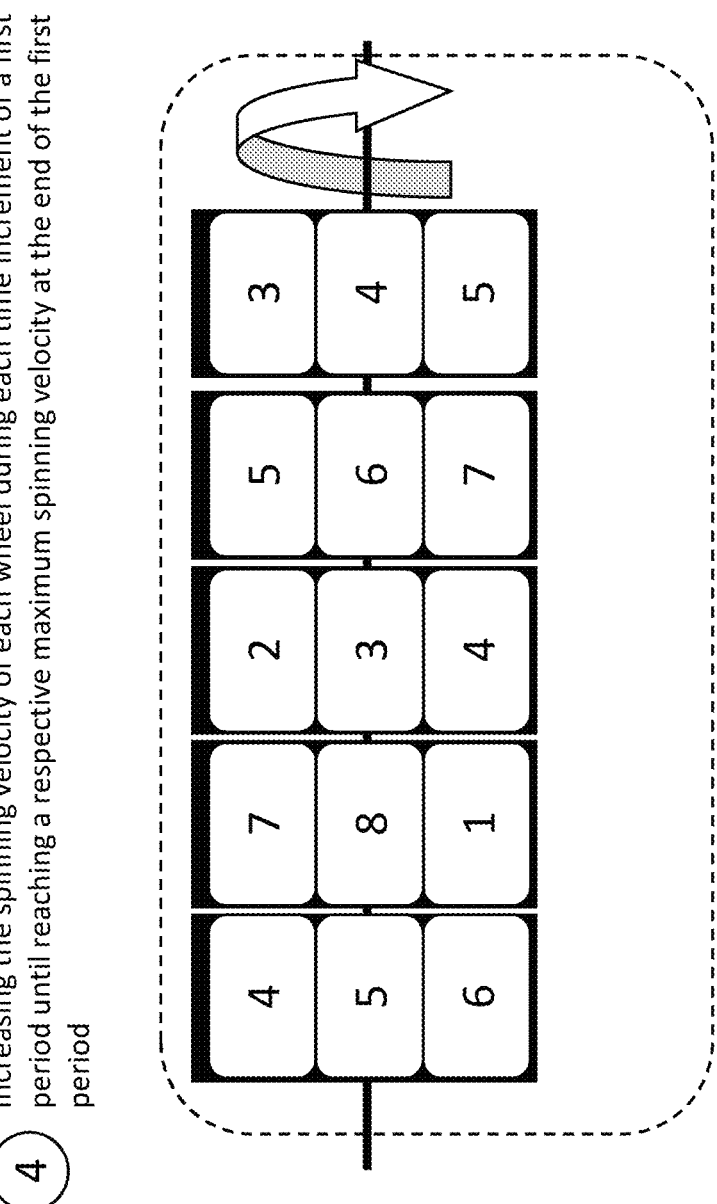
508
Increasing the spinning velocity of each wheel during each time increment of a first period until reaching a respective maximum spinning velocity at the end of the first period
4

FIG. 5 (Cont. V)
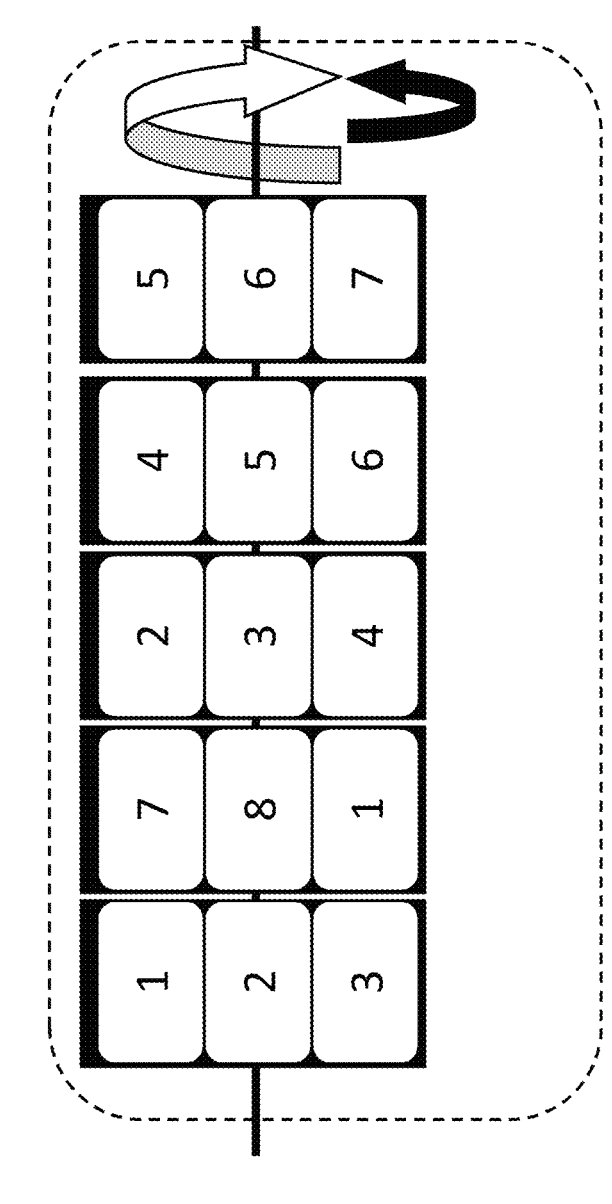
510
⑤ Decreasing the spinning velocity of each wheel during each time increment of a second period

FIG. 5 (Cont. VI)
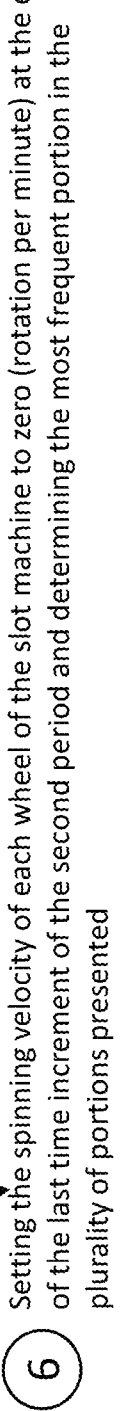
512
6 Setting the spinning velocity of each wheel of the slot machine to zero (rotation per minute) at the end of the last time increment of the second period and determining the most frequent portion in the plurality of portions presented
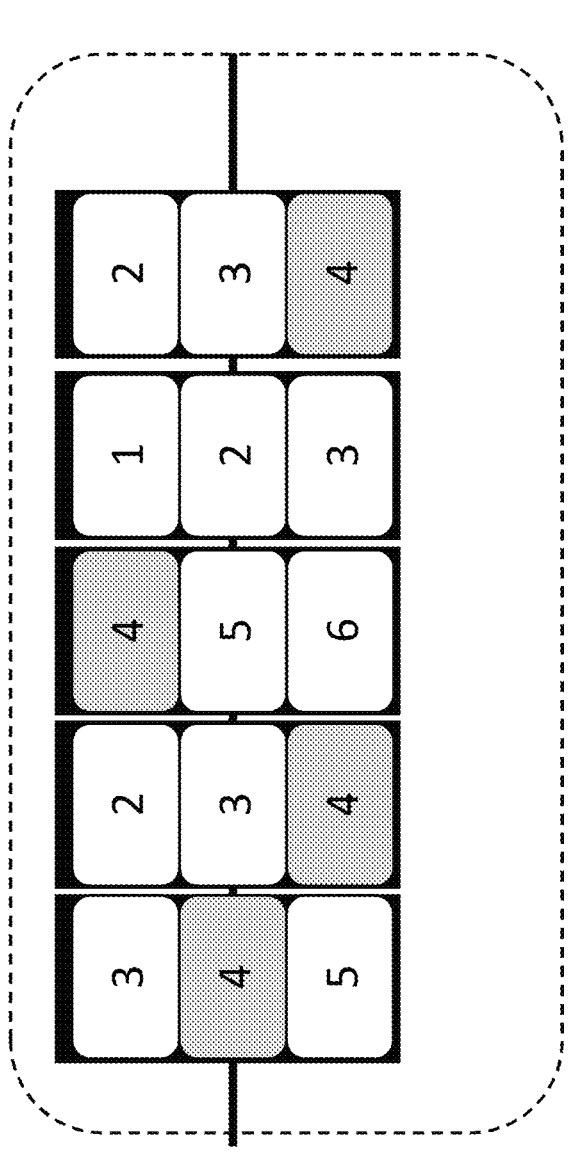

700

702 — Server

708 — Player Identification

710 — Action Categorization

712 — Game State Analysis

714 — Generated Metadata

706 — Live Game Feed

704 — Client device

716 — Updated Betting Options

720 — User Controls

718 — Wheels Display

722 — Live Video Display

900

902   Determine first metadata relating to multiple events in a media content item 904   Categorize the multiple events based on the first metadata 906   Select an event category

908 — Select, randomly, at least one event outcome within the selected event category 910 — Access second metadata to determine a probability of occurrence of the at least one event outcome 912 — Generate for display, on a first screen of a user interface, at least one selectable element for each event outcome of the randomly-selected at least one event outcome, allowing the selection of a selectable element related to an event outcome of the randomly-selected at least one event outcome

1000

1002 — Present a media content item

1004 — Analyze the media content item using an advanced computer vision and machine learning algorithm to determine first metadata relating to multiple events in the media content item 1006 — Categorize the multiple events based on the first metadata 1008 — Select an event category

1010  Select, randomly, at least one event outcome within the selected event category 1012  Access second metadata to determine a probability of occurrence of the at least one event outcome 1014  Generate for display, on a first screen of a user interface, at least one selectable element for each event outcome of the randomly-selected at least one event outcome, allowing the selection of a selectable element related to an event outcome of the randomly-selected at least one event outcome

C

FIG. 10 (Cont. II)
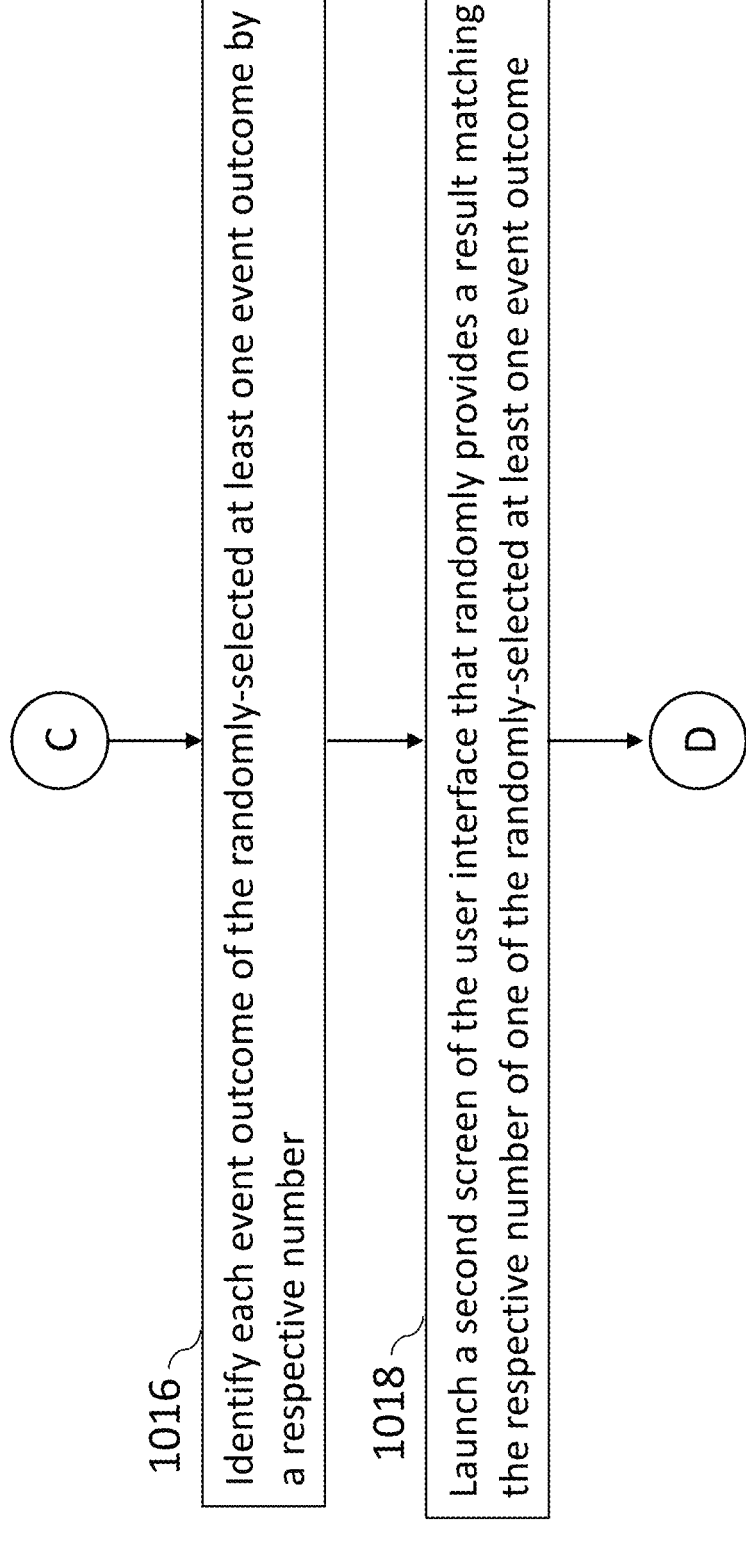
1016  Identify each event outcome of the randomly-selected at least one event outcome by a respective number
1018  Launch a second screen of the user interface that randomly provides a result matching the respective number of one of the randomly-selected at least one event outcome FIG. 10 (Cont. III)
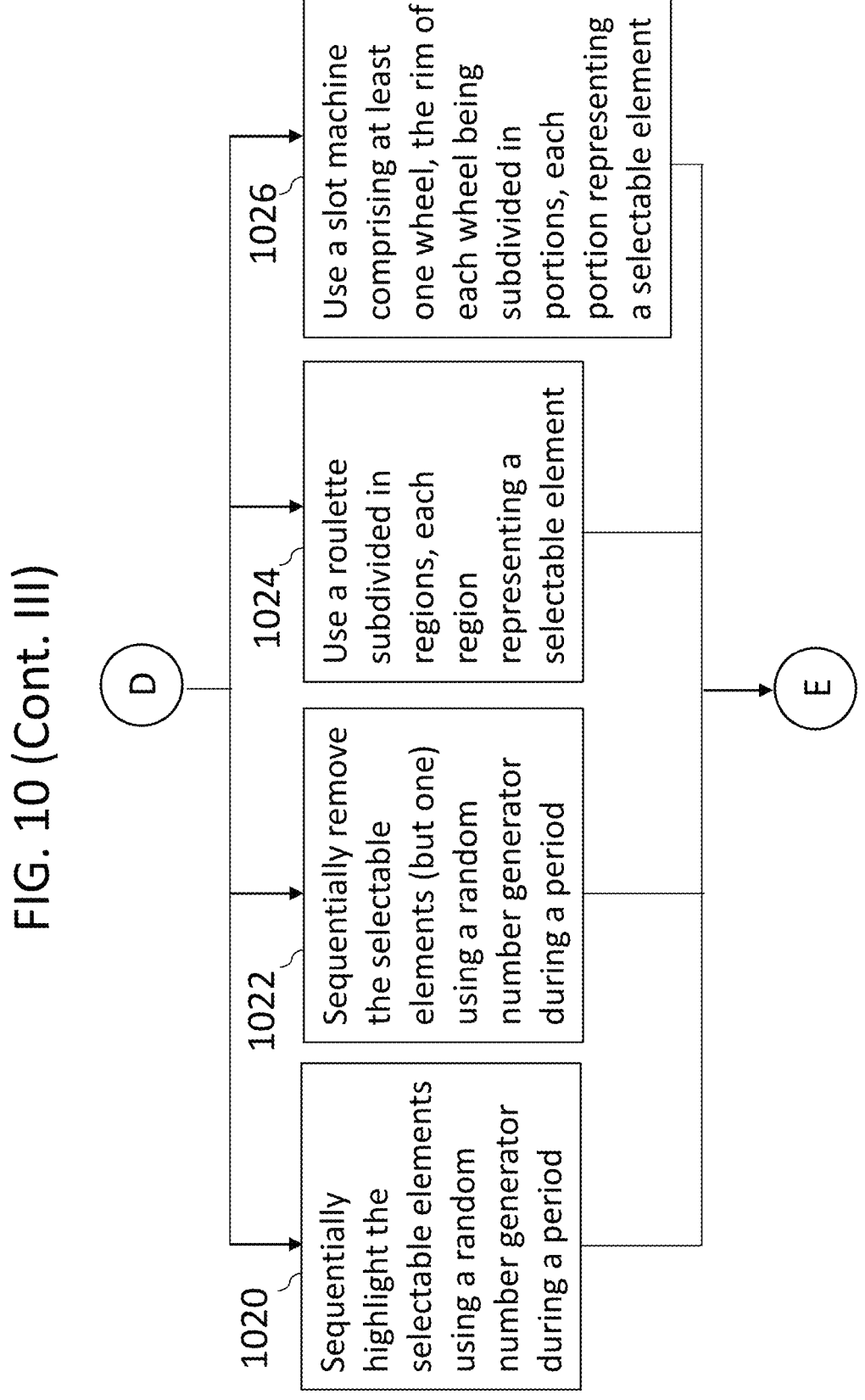

FIG. 10 (Cont. IV)

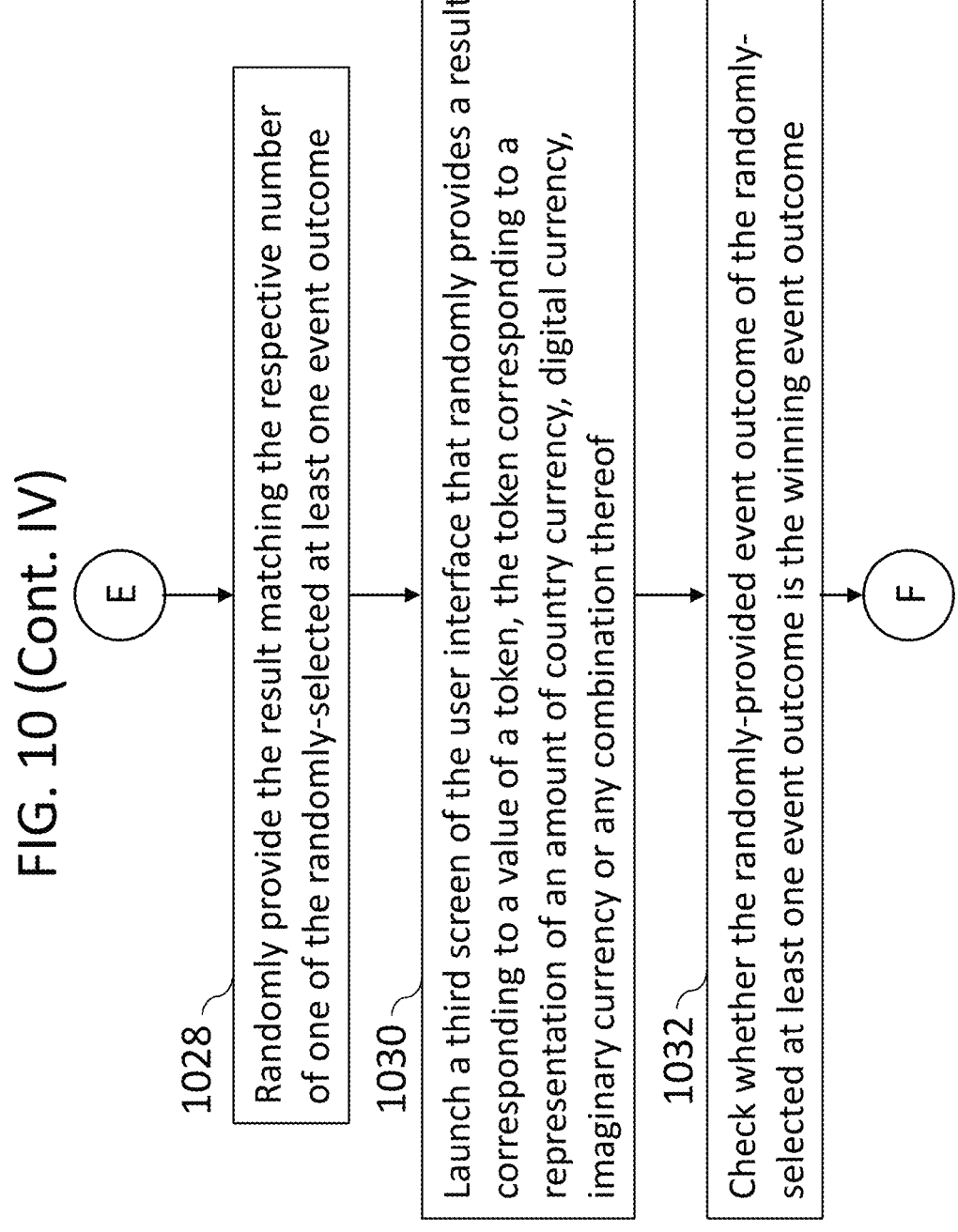

1028 — Randomly provide the result matching the respective number of one of the randomly-selected at least one event outcome 1030 — Launch a third screen of the user interface that randomly provides a result corresponding to a value of a token, the token corresponding to a representation of an amount of country currency, digital currency, imaginary currency or any combination thereof 1032 — Check whether the randomly-provided event outcome of the randomly-selected at least one event outcome is the winning event outcome

7  The device generates for display a first screen of a user interface comprising a poll for the user One event outcome randomly selected: fouling
Will Player 1 foul against Player 2 in the next five
seconds?

150

One event outcome randomly selected: fouling
How many fouls has Player 1 made so far in the first period?

One event outcome randomly selected: fouling, scoring

Will Player 1 foul against Player 2 or scores in the next five seconds?

170

172

172a

1/3

1

174

174a

1/6

2 fouling scoring

176a

USER INTERFACE FOR IMPROVING USER ENGAGEMENT ON A MEDIA CONTENT ITEM BEING PRESENTED

BACKGROUND

The present disclosure relates to methods and systems for improving, by a device, user engagement on a media content item being presented. More particularly, but not exclusively, the present disclosure relates to methods and systems for generating and presenting, by a device, a poll related to a media content item (e.g., a plurality of possible event outcomes related to the media content item) during a presentation of the media content item.

SUMMARY

Users tend to simultaneously use multiple user devices presenting respective media content items at the same time in order to have an overview of the respective media content items that are being presented and to easily switch their attention, based on their preferences, from one media content item to another media content item. For instance, some users use their mobile phone while watching a movie on a TV screen. Using simultaneously multiple user devices results in wasting computing resources, networking resources and energy to run those resources. There is thus a need for efficient methods and systems for improving user engagement on a media content item being presented.

Methods and systems, implemented by a device, are provided for improving user engagement on a media content item being presented. In some embodiments, a device determines first metadata relating to multiple events in a media content item. In some approaches, the device categorizes the multiple events based on the first metadata. In some approaches, the device selects an event category. In some approaches, the device selects, randomly, at least one event outcome within the selected event category. In some approaches, the device accesses second metadata to determine a probability of occurrence of the at least one event outcome. In some approaches, the device generates for display, on a first screen of a user interface, at least one selectable element for each event outcome of the randomly-selected at least one event outcome. In some examples, the probability of occurrence of each event outcome is associated with each respective selectable element.

In some examples, the device is a client device (e.g., a user device such as a mobile phone, a tablet, a computer, a television and the likes) that is in communication with a server (e.g., local or remote server) via a communication network (e.g., LAN or WAN): the device is able to produce, during the presentation of the media content item or while the media content item is paused, screens or windows of a user interface with which a user can interact. In some examples, the device is a server (e.g., local or remote server) connected to a client device via a communication network (e.g., LAN or WAN) such that the server is able to produce screens or windows of a user interface accessible via the client device during the presentation of the media content item or while the media content item is paused, and with which a user can interact.

In some examples, the device selects an event category upon a user input directly reflecting the user's instruction. Alternatively, the device randomly selects an event category using a random number generator after having identified each event category by a respective number. In some instances, non-transitory computer-readable instructions encoded on a non-transitory computer-readable medium and executed by control circuitry of the device comprise instructions to identify an object (e.g., event category) by a respective number and control a random number generator to randomly provide a number corresponding to an event category.

In some examples, a poll is generated and presented, by a device, e.g., during presentation of the media content item. The poll may be related to a media content item (e.g., a plurality of possible event outcomes related to the media content item). In some examples, the poll relies on a single event outcome and the user is to choose whether the randomly-selected at least one event outcome is to occur or not. In some examples, the poll relies on a single event outcome and the user is to choose whether the randomly-selected at least one event outcome is to occur a given amount of times during a time window corresponding to progression points of the media content item. In some examples, the poll relies on multiple event outcomes and the user is to choose whether one of the randomly-selected at least one event outcome is to occur.

In some examples, the media content item comprises a media content item that has already been presented. Each event of the multiple events is an event that has already been presented in the media content item and each event outcome of the randomly-selected at least one event outcome is either an event outcome that has been presented in the media content item or an event outcome that has not been presented in the media content item (e.g., randomly generated, extracted from another media content item).

In some examples, the media content item comprises a live media content item. Each event of the multiple events is an event presented in the media content item and each event outcome of the randomly-selected at least one event outcome is either an event outcome that has been presented in the media content item, an event outcome that will be presented in the media content item, or an event outcome that has not been presented or will never be presented in the media content item (e.g., randomly generated, extracted from another media content item).

In some examples, the winning event outcome to a poll relating to an event presented in a media content item, is the event outcome that has occurred or will be occurring in the media content item, and correctly responds to the question inherent to the poll presented to the user.

In some examples, the device selects, randomly at least one event outcome within the selected event category using a random number generator after having identified each event outcome within an event category. In some instances, non-transitory computer-readable instructions encoded on a non-transitory computer-readable medium and executed by control circuitry of the device comprise instructions to identify an object (e.g., event outcomes within the selected event category) by a respective number and control a random number generator to randomly provide a number corresponding to an event outcome within the selected event category.

In some examples, the device generates the second metadata using an algorithm that computes the amount of favorable event outcomes and the total amount of possible event outcomes so as to determine the probability of occurrence of each event outcome of the randomly-selected at least one event outcome. Alternatively, the device retrieves a database comprising the second metadata, wherein the second metadata comprises the probability of occurrence of each event outcome of the randomly-selected at least one event outcome. In some examples, the device presents each probability of occurrence related to a respective event outcome of the randomly-selected at least one event outcome either on a selectable element corresponding to the respective event outcome of the randomly-selected at least one event outcome, or in the vicinity of the corresponding selectable element such that the user can easily associate each probability of occurrence with the respective selectable element and respective event outcome of the randomly-selected at least one event outcome.

Hereby, the device allows for generating for display, on a screen of a user interface, for a user, a poll related to a media content item (that comprises a media content item that has already been presented or a live media content item) during the presentation of the media content item or while the media content item is paused. The poll comprises (1) the randomly-selected at least one event outcome related to an event in the media content item, (2) the probability of occurrence (or non-occurrence) of each event outcome of the randomly-selected at least one event outcome in the media content item and (3) the possibility, for the user, to choose an event outcome among the randomly-selected at least one event outcome upon a user input on the device. The poll, in question, represents an opportunity for the user to engage further with the media content item in order to determine the winning event outcome among the randomly-selected at least one event outcome. This compels the user to focus on the media content item being presented.

In some embodiments, the device identifies each event outcome of the randomly-selected at least one event outcome by a respective number. In some approaches, the device launches a second screen of the user interface that randomly provides a result matching the respective number of one of the randomly-selected at least one event outcome.

In some approaches, the device chooses, upon a user input, an event outcome among the randomly-selected at least one event outcome. A user input enables a given level of control with respect to the choice of the event outcome to be chosen among the randomly-selected at least one event outcome, depending on the type of the user input used. In some examples, the device chooses, upon a user input, a selectable element, directly indicated by the user, corresponding to an event outcome of the randomly-selected at least one event outcome. Alternatively, the device chooses, upon a user input, a selectable element (e.g., button such as a 'press' button) that does not correspond to an event outcome of the randomly-selected at least one event outcome, causing the device to randomly provide an event outcome among the randomly-selected at least one event outcome using a random number generator: different types of screen (e.g., second screen) can be used to achieve it. In some instances, non-transitory computer-readable instructions encoded on a non-transitory computer-readable medium and executed by control circuitry of the device comprise instructions to identify an object (e.g., event outcome of the randomly-selected at least one event outcome) by a respective number and control a random number generator to randomly provide a number corresponding to an event outcome of the randomly-selected at least one event outcome.

In some approaches, the second screen comprises a plurality of display elements, each display element of the plurality of display elements is named after a respective number corresponding to a single event outcome of the randomly-selected at least one event outcome such that the number of display elements is equal to the number of the randomly-selected at least one event outcome. Additionally, the second screen comprises a depiction of a button (e.g., a 'press' button) that triggers the sequential highlighting of the plurality of display elements. During each time increment of a period, a single display element of the plurality of display elements is highlighted such that the sequence of the highlighted display elements follows a pattern. In some instances, the pattern is random: the device determines, using a random number generator, the time increment, the period, and the random pattern by establishing the sequence of the highlighted display elements using the respective numbers after which the display elements are named. In some instances, the pattern corresponds to the circumference of the space bound by the plurality of the display elements: the device determines the first display element to be highlighted (using a random number generator and the respective numbers after which the display elements are named) and the period (using a random number generator). During the last time increment of the period, a last display element of the plurality of the display elements is highlighted and the highlighting of the last display element continues after the period has passed so as to emphasize that the respective number after which the last display element is named corresponds to a randomly-provided result corresponding to an event outcome of the randomly-selected at least one event outcome. In some instances, the device selects the time increment such that a human could perceive the highlighting of each display element. In some instances, the time increment belongs to the time interval [0.1 second, 1 second]. In some instances, the period is a multiple of the time increment. In some instances, the multiple corresponds to the product of the number of the randomly-selected at least one event outcome by a factor, the factor belonging to the interval [1, 100]. In some instances, the device determines the factor using a random number generator so as to randomly determine the period. In some instances, non-transitory computer-readable instructions encoded on a non-transitory computer-readable medium and executed by control circuitry of the device comprise instructions to control a random number generator so as to determine e.g., the sequence of display elements to be sequentially highlighted, the time increment during which a given display element is highlighted and the period beyond which a last display is maintained highlighted.

In some approaches, the second screen comprises a plurality of display elements, each display element of the plurality of display elements is named after a respective number corresponding to a single event outcome of the randomly-selected at least one event outcome such that the number of display elements is equal to the number of the randomly-selected at least one event outcome. Additionally, the second screen comprises a depiction of a button (e.g., a 'press' button) that triggers the simultaneous motions of the plurality of display elements. In some instances, the plurality of the display elements follows a same circular-like trajectory at a same velocity. In some instances, the plurality of the display elements follows the circumference of the space initially bound by the plurality of the display elements, at a same velocity. During each time increment of a period, each display element runs a same distance of the same circular-like trajectory. In some instances, at the end of each time increment of a period, a single display element of the plurality of display elements disappears from the second screen. In some instances, at the end of each time increment of a period, the device selects the display element to disappear using a random number generator and the respective numbers after which the plurality of the display elements is named. At the end of the last time increment of the period, only a last display element of the plurality of the display elements remains in the second screen: the respective number after which the last display element is named corresponds to a randomly-provided result corresponding to an event outcome of the randomly-selected at least one event outcome. In some instances, the device selects the time increment such that a human could perceive the disappearance of all display elements but one. In some instances, the time increment belongs to the time interval [0.1 second, 1 second]. In some instances, the period is a multiple of the time increment. In some instances, the multiple corresponds to the product of the number of the randomly-selected at least one event outcome by a factor, the factor belonging to the interval [1, 100]. In some instances, the device determines the factor using a random number generator so as to randomly determine the period. In some instances, non-transitory computer-readable instructions encoded on a non-transitory computer-readable medium and executed by control circuitry of the device comprise instructions to control a random number generator so as to determine e.g., the display element to disappear from the second screen at the end of each time increment, the time increment and the period beyond which a last display remains on the second screen.

In some approaches, the second screen comprises a display element including a depiction of a roulette subdivided into regions, each region named after a respective number corresponding to an event outcome of the randomly-selected at least one event outcome such that the number of regions is equal to the number of the randomly-selected at least one event outcome. Additionally, the second screen comprises a depiction of a button (e.g., a 'press' button) that triggers the spinning of the roulette and subsequently the dropping of a ball. During each time increment of a first period, the spinning velocity of the roulette increases. At the end of the last time increment of the first period, the roulette spins at a maximum spinning velocity. During each time increment of a second period, the spinning velocity of the roulette decreases. At the end of the last time increment of the second period, the spinning velocity becomes null (zero rotation per minute). At the end of the last time increment of the second period, the roulette stops spinning and the ball subsequently loses its momentum and gets trapped in a compartment within a region of the roulette: the respective number after which the region trapping the ball is named corresponds to a randomly-provided result corresponding to an event outcome of the randomly-selected at least one event outcome. In some instances, the device determines, using a random number generator, at least one of the following parameters: the time increment of the first period, the first period, the maximum spinning velocity, the acceleration of the roulette during each time increment of the first period (i.e., the mathematical function of the acceleration of the spinning roulette against the time), the time increment of the second period, the second period and the deceleration of the spinning roulette during each time increment of the second period (i.e., the mathematical function of the deceleration of the spinning roulette against the time). In some instances, the device selects the time increment such that a human could perceive the motion of the ball. In some instances, the time increment belongs to the time interval [0.1 second, 1 second]. In some instances, the period is a multiple of the time increment. In some instances, the multiple corresponds to the product of the amount of the randomly-selected at least one event outcome by a factor, the factor belonging to the interval [1, 100]. In some instances, the device determines the factor using a random number generator so as to randomly determine the first period and the second period.

In some instances, non-transitory computer-readable instructions encoded on a non-transitory computer-readable medium and executed by control circuitry of the device comprise instructions to control a random number generator so as to determine e.g., the time increment of the first period, the first period, the maximum spinning velocity, the acceleration of the roulette during each time increment of the first period (i.e., the mathematical function of the acceleration of the spinning roulette against the time), the time increment of the second period, the second period and the deceleration of the spinning roulette during each time increment of the second period (i.e., the mathematical function of the deceleration of the spinning roulette against the time).

In some approaches, the second screen comprises a display element including a depiction of a slot machine comprising at least one wheel, the rim of each wheel being subdivided in portions, each portion displaying a respective number corresponding to a single event outcome of the randomly-selected at least one event outcome. The number of portions of each wheel is equal to the number of the randomly-selected at least one event outcome. The number of portions presented is equal to at least one or lower than the number of the randomly-selected at least one outcome. Additionally, the second screen comprises a depiction of a button (e.g., a 'press' button) that triggers the spinning of each wheel. During each time increment of a first period, the spinning velocity of each wheel increases following a respective acceleration. At the end of the last time increment of the first period, each wheel spins at a respective maximum velocity. During each time increment of a second period, the spinning velocity of each wheel decreases following a respective deceleration. At the end of the last time increment of the second period, the last wheel stops spinning. In some instances, the device determines, using a random number generator, at least one of the following parameters: the respective maximum spinning velocity of each wheel, the time increment of the first period, the first period, the acceleration of each wheel during each time increment of the first period (i.e., the mathematical function of the acceleration of each wheel against the time), the time increment of the second period, the second period and the deceleration of each wheel during each time increment of the second period (i.e., the mathematical function of the deceleration of each wheel against the time). In some instances, the device determines a randomly-provided result corresponding to a single event outcome of the randomly-selected at least one event outcome by e.g., determining the most frequent or less frequent number shown on the portions presented, using the numbers of at least a part of the portions presented into a calculation, etc. In some instances, non-transitory computer-readable instructions encoded on a non-transitory computer-readable medium and executed by control circuitry of the device comprise instructions to control a random number generator so as to determine e.g., the respective maximum spinning velocity of each wheel, the time increment of the first period, the first period, the acceleration of each wheel during each time increment of the first period (i.e., the mathematical function of the acceleration of each wheel against the time), the time increment of the second period, the second period and the deceleration of each wheel during each time increment of the second period (i.e., the mathematical function of the deceleration of each wheel against the time).

In some examples, the second screen comprises a display element including a depiction of a slot machine comprising at least two wheels, the rim of each wheel being subdivided in portions, each portion displaying a respective number corresponding to a single event outcome of the randomly-selected at least one event outcome. The number of portions of each wheel is equal to the amount of the randomly-selected at least one event outcome. The number of portions presented is equal to at least one or lower than the number of the randomly-selected at least one outcome. At least one wheel is of a first type of wheels while the rest of the wheels are of a second type of wheels. The first type of wheels corresponds to the wheels that randomly provide, upon a user input, a portion corresponding to a part of an event outcome of the randomly-selected at least one event outcome, based on the use of a random number generator. Additionally, the second screen comprises a depiction of a button (e.g., a 'press' button) that triggers the spinning of each first-type wheel. During each time increment of a first period, the spinning velocity of each wheel increases following a respective acceleration. At the end of the last time increment of the first period, each wheel spins at a respective maximum velocity. During each time increment of a second period, the spinning velocity of each wheel decreases following a respective deceleration. At the end of the last time increment of the second period, the last wheel stops spinning. In some instances, the device determines, using a random number generator, at least one of the following parameters: the respective maximum spinning velocity of each wheel, the time increment of the first period, the first period, the acceleration of each wheel during each time increment of the first period (i.e., the mathematical function of the acceleration of each wheel against the time), the time increment of the second period, the second period and the deceleration of each wheel during each time increment of the second period (i.e., the mathematical function of the deceleration of each wheel against the time). The second type of wheels corresponds to the wheels that provide, upon a user input, a portion corresponding to a part of an event outcome of the randomly-selected at least one event outcome, based on the user's direct selection. As soon as the user has selected a portion of a wheel, the wheel becomes a wheel of second type and cannot spin: the portion is then fixed. This allows for applying different levels of randomness in the choice of the event outcome of the randomly-selected at least one event outcome. In some instances, the device determines a randomly-provided result corresponding to a single event outcome of the randomly-selected at least one event outcome by e.g., determining the most frequent or less frequent number shown on the portions presented, using the numbers of at least a part of the portions presented into a calculation, etc. In some instances, non-transitory computer-readable instructions encoded on a non-transitory computer-readable medium and executed by control circuitry of the device comprise instructions to control a random number generator so as to determine e.g., the respective maximum spinning velocity of each wheel of the first type, the time increment of the first period related to the set of wheels of the first type, the first period related to the set of wheels of the first type, the acceleration of each wheel of the first type during each time increment of the first period (i.e., the mathematical function of the acceleration of each wheel against the time), the time increment of the second period related to the set of wheels of the first type, the second period related to the set of wheels of the first type and the deceleration of each wheel of the first type of wheels during each time increment of the second period (i.e., the mathematical function of the deceleration of each wheel against the time).

In some approaches, the device presents a supplemental content item (e.g., advertisements, breaking news, etc.) in conjunction with the presentation of the second screen of the user interface. In some approaches, the device presents a supplemental content item (e.g., advertisements, breaking news, etc.) when the randomly-provided result is being determined based on the second screen of the user interface, irrespective of the way the randomly-provided result is determined (See the five aforementioned ways).

In this way, the device is able to randomly choose, upon a user input, an event outcome among the randomly-selected at least one event outcome using a random number generator, resulting in the reduction of the time to choose one of the alternatives proposed in the poll (compared to the case where the user is to directly pick, upon a user input, an event outcome among the randomly-selected at least one event outcome), which decreases the consumption of network resources, computing resources and energy to run those resources.

In some embodiments, the device analyzes the media content item to determine a count of event outcomes for a predetermined duration based on a time of a first presentation of the media content item in order to determine the first metadata relating to multiple events.

In some approaches, when the media content item comprises a live real event (e.g., sport event, news coverage, etc.) that is being recorded on camera to be presented right away (with a negligible time lag), the time of the first presentation of the media content item corresponds to the time of the recording of the media content item on camera. In some instances, the predetermined duration corresponds to at least a portion of the duration of the media content item. In some instances, when the predetermined duration corresponds to a portion of the duration of the media content item, the device triggers the predetermined duration when the device detects an event. In some instances, the detected event can influence the outcome (e.g., a score of a match, a position of a team in a competition, or a position of a team or a player on a podium) of the live real event. The detected event is e.g., a player's foul, a player's or athlete's disqualification, a player's threshold distance from a goal, the start of a player's or athlete's performance, etc. In some instances, the detected event is so subtle that it is difficult for a human to perceive it at a standard speed of the presentation of the media content item: the detected event is e.g., a player mumbling a specific word, a player making a specific sign with their hands, etc.

In some approaches, when the media content item comprises a past real event (e.g., sport event, news coverage, etc.) recorded on camera, the time of the first presentation of a media content item corresponds to the time when the media content item has been released to be presented to the public. In some instances, the predetermined duration corresponds to at least a portion of the duration of the media content item. In some instances, when the predetermined duration corresponds to a portion of the duration of the media content item, the device triggers the predetermined duration when the device detects an event. In some instances, the detected event can influence the outcome (e.g., a score of a match, a position of a team in a competition, or a position of a team or a player on a podium) of the past real event. The detected event is e.g., a player's foul, a player's or athlete's disqualification, a player's threshold distance from a goal, the start of a player's or athlete's performance, etc. In some instances, the detected event is so subtle that it is difficult for a human to perceive it at a standard speed of the presentation of the media content item: the detected event is e.g., a player mumbling a specific word, a player making a specific sign with their hands, etc.

In some approaches, when the media content item (e.g., movies based or not on true events) comprises a fictitious event recorded on camera, the time of the first presentation of a media content item corresponds to the time when the media content item has been released to be presented to the public. In some instances, the predetermined duration corresponds to at least a portion of the duration of the media content item. In some instances, when the predetermined duration corresponds to a portion of the duration of the media content item, the device triggers the predetermined duration when the device detects an event. In some instances, the detected event can influence the outcome (e.g., identity of a killer, arrest or escape of a suspect, verdict of a jury etc.) of the fictitious event. The detected event is e.g., a testimony of a witness, the appearance of a clue, the sudden change of music type, a fight between two protagonists, etc.

In some approaches, when the media content item comprises a live real event (e.g., sport event, news coverage, etc.) that is being camera-recorded, the device analyzes, in real-time, images of the media content item, using an advanced computer vision and machine learning algorithm so as to identify and count event outcomes and generate annotated metadata (comprising e.g., first metadata) related to the media content item. In some instances, non-transitory computer-readable instructions encoded on a non-transitory computer-readable medium and executed by control circuitry of the device comprise instructions to control a vision-based machine learning model able to analyze a media content item, identify and count event outcomes and generate annotated metadata (comprising e.g., first metadata). In some approaches, the device uses the annotated metadata to establish the list of the event outcomes among which at least one of the randomly-selected at least one event outcome is to be selected.

In some approaches, when the media content item comprises a past real event (e.g., sport event, news coverage, etc.) recorded on camera, the device extracts the annotated metadata (comprising e.g., first metadata) related to the media content item so as to have access to the nature of the event outcomes and a count of the event outcomes (when the annotated metadata has been generated earlier). Alternatively or additionally, the device analyzes images of the media content item, using an advanced computer vision and machine learning algorithm so as to identify and count event outcomes and generate annotated metadata (comprising e.g., first metadata) related to the media content item. In some instances, non-transitory computer-readable instructions encoded on a non-transitory computer-readable medium and executed by control circuitry of the device comprise instructions to control a vision-based machine learning model able to analyze a media content item, identify and count event outcomes and generate annotated metadata (comprising e.g., first metadata). In some approaches, the device uses the annotated metadata to extract the event outcomes among which the randomly-selected at least one event outcome are to be selected. In some approaches, the device uses the annotated metadata to establish the list of the event outcomes among which at least one of the randomly-selected at least one event outcome is to be selected.

In some approaches, when the media content item (e.g., movies based or not on true events) comprises a fictitious event recorded on camera, the device extracts the annotated metadata (comprising e.g., first metadata) related to the media content item so as to have access to the nature of the event outcomes and a count of the event outcomes (when the annotated metadata has been generated earlier). Alternatively or additionally, the device analyzes images of the media content item, using an advanced computer vision and machine learning algorithm so as to identify and count event outcomes and generate annotated metadata (comprising e.g., first metadata) related to the media content item. In some instances, non-transitory computer-readable instructions encoded on a non-transitory computer-readable medium and executed by control circuitry of the device comprise instructions to control a machine learning model able to analyze a media content item, identify and count event outcomes and generate annotated metadata (comprising e.g., first metadata). In some approaches, the device uses the annotated metadata to extract the event outcomes among which the randomly-selected at least one event outcome are to be selected. In some approaches, the device uses the annotated metadata to establish the list of the event outcomes among which the randomly-selected at least one event outcome are to be selected.

In some approaches, the device senses the use of another advanced computer vision and machine learning algorithm running on the same device or on different devices a distance apart from each other. In some approaches, the device prevents the poll from being presented when the device senses that several advanced computer vision and machine learning algorithms are being run one the same device or on different devices a distance apart from each other.

The device generates a list of event outcomes occurring in a media content item, wherein several fields (e.g., timestamp, action involving at least one person and/or at least one object, the at least one person and/or at least one object involved in the action, etc.) are specified for each event outcome. When two or more event outcomes share the same fields except for the timestamp, the two or more event outcomes are deemed to be identical. A number of identical event outcomes is determined in function of a timestamp window of the media content item. This list of event outcomes is included in the annotated metadata (comprising e.g., first metadata) related to the media content item.

In some embodiments, to categorize the multiple events, the device accesses a list of event categories, wherein each event category comprises at least one event outcome. In some approaches, to categorize the multiple events, the device compares each event outcome whose count was determined with the at least one event outcome of each event category. In some approaches, to categorize the multiple events, in response to the comparing, the device assigns each event outcome whose count was determined to at least one event category.

In some approaches, the list of event categories contains pre-defined event categories that are based on various parameters of the media content item subject of the poll. For instance, when the media content item subject of the poll relates to sport, the pre-defined event categories are based on a set of parameters e.g., rules of the sport in question, the players, the referees, coach-designed strategies, weather forecasts, etc. For instance, when the media content item subject of the poll relates to a movie, the pre-defined event categories are based on a set of parameters e.g., movie genre, protagonists, plot, actors/actresses, director, productors, etc.

In some approaches, each event category comprises at least one pre-defined event outcome e.g., extracted from at least one media content item that relates to the media content item subject of the poll. In some instances, the at least one media content item that relates to the media content item subject of the poll belongs to the same genre of the media content item subject of the poll. For instance, the media content item subject of the poll, is a basketball match wherein the French national team faces the German national team. The device extracts annotated metadata from recently recorded basketball matches involving either one of the basketball teams and/or both basketball teams in order to populate event categories with pre-defined event outcomes.

In some approaches, the content of each field of each event outcome related to the media content item subject of the poll are compared to the content of each corresponding field of each event outcome of each event category. If there is a literal match or a partial match (e.g., synonym or having a similar meaning) between the content of a field of an event outcome related to the media content item subject of the poll and the content of a corresponding field of an event outcome of an event category (the fields in question being different from timestamp-related fields), the event outcome related to the media content item subject of the poll is placed into the corresponding event category.

In some approaches, the device selects, upon a user input (e.g., reflecting directly the user's instruction or randomly selected), an event category among the event categories to which at least one event outcome related to the media content item subject of the poll has been assigned.

In some embodiments, to select, randomly, the at least one event outcome within the selected event category, the device determines a plurality of time windows in the media content item. Additionally, the device determines a plurality of persons in the media content item. Furthermore, the device determines a plurality of actions in the media content item, performed by a person of the plurality of persons during a time window of the plurality of time windows. A combination of a time window of the plurality of the time windows, a person of the plurality of persons and an action of the plurality of actions corresponds to an event outcome of the randomly-selected at least one event outcome.

Accordingly, the device generates multiple media content item-related combinations of a time window, a person and an action, each combination corresponding to an event outcome of the randomly-selected event outcome: this allows for subsequently randomly providing an event outcome of the randomly-selected at least one event outcome.

In some embodiments, the device launches a fourth screen of the user interface that randomly provides a combination of a time window of the plurality of the time windows, a person of the plurality of persons and an action of the plurality of actions.

In some approaches, the fourth screen comprises a display element including a depiction of a slot machine comprising three wheels (one wheel for proposing time windows in the media content item, one wheel for proposing persons in the media content item and one wheel for proposing actions performed by at least one person in the media content item), the rim of each wheel being subdivided in portions, each portion displaying a respective option. The number of portions of each wheel is option type-dependent. The number of portions presented is equal to at least one. Additionally, the fourth screen comprises a depiction of a button (e.g., a 'press' button) that triggers the spinning of each wheel. During each time increment of a first period, the spinning velocity of each wheel increases following a respective acceleration. At the end of the last time increment of the first period, each wheel spins at a respective maximum velocity. During each time increment of a second period, the spinning velocity of each wheel decreases following a respective deceleration. At the end of the last time increment of the second period, the last wheel stops spinning. In some instances, the device determines, using a random number generator, at least one of the following parameters: the respective maximum spinning velocity of each wheel, the time increment of the first period, the first period, the acceleration of each wheel during each time increment of the first period (i.e., the mathematical function of the acceleration of each wheel against the time), the time increment of the second period, the second period and the deceleration of each wheel during each time increment of the second period (i.e., the mathematical function of the deceleration of each wheel against the time). In some instances, the device determines the randomly-provided result corresponding to a combination of a time window, a person and an action by e.g., reading the option of each wheel corresponding to the portion presented or to the middle portion presented. In some instances, non-transitory computer-readable instructions encoded on a non-transitory computer-readable medium and executed by control circuitry of the device comprise instructions to control a random number generator so as to determine e.g., the respective maximum spinning velocity of each wheel, the time increment of the first period, the first period, the acceleration of each wheel during each time increment of the first period (i.e., the mathematical function of the acceleration of each wheel against the time), the time increment of the second period, the second period and the deceleration of each wheel during each time increment of the second period (i.e., the mathematical function of the deceleration of each wheel against the time).

In some approaches, the fourth screen comprises a display element including a depiction of a slot machine comprising three wheels, wherein a first configuration and a second configuration are possible. In the first configuration, two wheels are of a first type of wheels while the other wheel is of a second type of wheels. In the second configuration, one wheel is of a first type of wheels while the other two wheels are of a second type of wheels. The first type of wheels corresponds to the wheels that randomly provide, upon a user input, a portion corresponding to a part of an event outcome of the randomly-selected at least one event outcome, based on the use of a random number generator. The second type of wheels corresponds to the wheels that provide, upon a user input, a portion corresponding to a part of an event outcome of the randomly-selected at least one event outcome, based on the user's direct selection. As soon as the user has selected a portion of a wheel, the wheel becomes a wheel of second type and cannot spin: the portion is then fixed. This allows for applying different levels of randomness in the choice of the event outcome of the randomly-selected at least one event outcome. In some instances, non-transitory computer-readable instructions encoded on a non-transitory computer-readable medium and executed by control circuitry of the device comprise instructions to control a random number generator so as to determine e.g., the respective maximum spinning velocity of each wheel of the first type, the time increment of the first period related to the set of wheels of the first type, the first period related to the set of wheels of the first type, the acceleration of each wheel of the first type during each time increment of the first period (i.e., the mathematical function of the acceleration of each wheel against the time), the time increment of the second period related to the set of wheels of the first type, the second period related to the set of wheels of the first type and the deceleration of each wheel of the first type of wheels during each time increment of the second period (i.e., the mathematical function of the deceleration of each wheel against the time).

In some approaches, the device activates, upon a user input, a button (e.g., a 'press' button) to trigger the spinning of each wheel within a duration corresponding to a time countdown. In some instances, the duration is equal to e.g., 1, 2, 3, 4 or 5 seconds. In some instances, beyond the duration, the device cannot activate anymore, upon a user input, the button to trigger the spinning of each wheel. In some instances, beyond the duration, the device generates another poll, wherein each portion of each wheel is an updated respective option related to a new event in the media content item.

In some approaches, the fourth screen comprises a display element including a depiction of three wheels of fortune (one wheel for proposing time windows in the media content item, one wheel for proposing persons in the media content item and one wheel for proposing actions performed by at least one person in the media content item) wherein each wheel of fortune is subdivided into regions and each region corresponds to an option. Additionally, the fourth screen comprises a depiction of a button (e.g., a 'press' button) that triggers the spinning of each wheel of fortune. During each time increment of a first period, the spinning velocity of each wheel of fortune increases following a respective acceleration. At the end of the last time increment of the first period, each wheel of fortune spins at a respective maximum velocity. During each time increment of a second period, the spinning velocity of each wheel of fortune decreases following a respective deceleration. At the end of the last time increment of the second period, the last wheel of fortune stops spinning. In some instances, the device determines, using a random number generator, at least one of the following parameters: the respective maximum spinning velocity of each wheel of fortune, the time increment of the first period, the first period, the acceleration of each wheel of fortune during each time increment of the first period (i.e., the mathematical function of the acceleration of each wheel of fortune against the time), the time increment of the second period, the second period and the deceleration of each wheel of fortune during each time increment of the second period (i.e., the mathematical function of the deceleration of each wheel of fortune against the time). In some instances, the device determines the randomly-provided result corresponding to a combination of a time window, a person and an action by e.g., determining, for wheel of fortune, each region indicated by a fixed indicator. In some instances, non-transitory computer-readable instructions encoded on a non-transitory computer-readable medium and executed by control circuitry of the device comprise instructions to control a random number generator so as to determine e.g., the respective maximum spinning velocity of each wheel of fortune, the time increment of the first period related to the set of wheels of fortune, the first period related to the set of wheels of fortune, the acceleration of each wheel of fortune during each time increment of the first period (i.e., the mathematical function of the acceleration of each wheel of fortune against the time), the time increment of the second period related to the set of wheels of fortune, the second period related to the set of wheels of fortune and the deceleration of each wheel of fortune during each time increment of the second period (i.e., the mathematical function of the deceleration of each wheel of fortune against the time).

In some approaches, the fourth screen comprises a display element including a depiction of three roulettes (one roulette for proposing time windows in the media content item, one roulette for proposing persons in the media content item and one roulette for proposing actions performed by at least one person in the media content item) wherein each roulette is subdivided into regions and each region is named after a respective number corresponding to an option such that for each roulette, the number of regions is equal to the number of options. Additionally, the fourth screen comprises a depiction of a button (e.g., a 'press' button) that triggers the spinning of each roulette and subsequently the dropping of each ball. During each time increment of a first period, the spinning velocity of each roulette increases following a respective acceleration. At the end of the last time increment of the first period, each roulette spins at a respective maximum spinning velocity. During each time increment of a second period, the spinning velocity of each roulette decreases following a respective deceleration. At the end of the last time increment of the second period, the spinning velocity of the last spinning roulette becomes null (zero rotation per minute). At the end of the last time increment of the second period, the last spinning roulette stops spinning and the ball subsequently lose its momentum and gets trapped in a compartment within a region of the roulette: the respective number after which the region trapping the ball is named corresponds to a randomly-provided result corresponding to an option relating to a specific field (e.g., time window, person, action). Similarly, any roulette that stopped spinning during the second period before the last spinning roulette, determines an option of another field. The device thus determines a randomly-provided result corresponding to a combination of a time window, a person and an action by e.g., determining, for each roulette, the region where the ball is trapped. In some instances, the device determines, using a random number generator, at least one of the following parameters: the time increment of the first period related to the set of roulettes, the first period related to the set of roulettes, the maximum spinning velocity of each roulette, the acceleration of each roulette during each time increment of the first period (i.e., the mathematical function of the acceleration of each spinning roulette against the time), the time increment of the second period related to the set of roulettes, the second period related to the set of roulettes and the deceleration of each spinning roulette during each time increment of the second period (i.e., the mathematical function of the deceleration of each spinning roulette against the time). In some instances, the device selects the time increment such that a human could perceive the motion of the ball. In some instances, the time increment belongs to the time interval [0.1 second, 1 second]. In some instances, the period is a multiple of the time increment. In some instances, the multiple corresponds to the product of the number of options (with respect to the roulette that contains the highest number of options) by a factor, the factor belonging to the interval [1, 100]. In some instances, the device determines the factor using a random number generator so as to randomly determine the first period and the second period. In some instances, non-transitory computer-readable instructions encoded on a non-transitory computer-readable medium and executed by control circuitry of the device comprise instructions to control a random number generator so as to determine e.g., the time increment of the first period related to the set of roulettes, the first period related to the set of roulettes, the maximum spinning velocity of each roulette, the acceleration of each roulette during each time increment of the first period (i.e., the mathematical function of the acceleration of each spinning roulette against the time), the time increment of the second period related to the set of roulettes, the second period related to the set of roulettes and the deceleration of each spinning roulette during each time increment of the second period (i.e., the mathematical function of the deceleration of each spinning roulette against the time).

In some approaches, the fourth screen is based on the Keno game. The device chooses, upon a user input, an option (named after a respective number) for each option field (e.g., time window, person, action) among the options proposed by the device: the device determines the options based on the user's direct instructions. The device then randomly draws, upon a user input, three numbers in total (one number for each option field) using a random number generator so as to determine the combination time window/person/action: there may be (or not) a match or partial match between the three drawn numbers and the three numbers determined based on the user's direct instructions. In some instances, non-transitory computer-readable instructions encoded on a non-transitory computer-readable medium and executed by control circuitry of the device comprise instructions to control a random number generator so as to determine e.g., the three numbers drawn to determine the combination time window/person/action.

In some approaches, the fourth screen is based on the Bingo game. The device presents a depiction of a Bingo board comprising three numbers, each corresponding to an option of a given option field (e.g., time window, person, action). The device chooses, upon a user input, the three numbers: the device determines the options based on the user's direct instructions. Alternatively, the device randomly chooses the three numbers. The device then randomly draws, upon a user input, three numbers in total (one number for each option field) using a random number generator so as to determine the combination time window/person/action. There may be (or not) a match or partial match between the three drawn numbers and the three numbers determined based on the user's direct instructions or randomly chosen. In some instances, non-transitory computer-readable instructions encoded on a non-transitory computer-readable medium and executed by control circuitry of the device comprise instructions to control a random number generator so as to determine e.g., the three numbers of the Bingo board randomly drawn, the three numbers randomly drawn to determine the combination time window/person/action.

In this way, the device is able to randomly provide, upon a user input, an event outcome among the randomly-selected at least one event outcome, resulting in the reduction of the time to respond to a poll and the decrease of consumption of network resources, computing resources and energy to run those resources.

In some embodiments, progression points of the media content item corresponding to the time window of the randomly-provided combination and a supplemental content item (e.g., advertisements, breaking news) are being presented upon a provision of the randomly-provided combination.

This allows the device to present the portion of interest of the media content item relating to the poll in conjunction with a supplemental content item (e.g., advertisements, breaking news).

In some embodiments, the time window of the randomly-provided combination is defined from an end point. Additionally, the person of the randomly-provided combination is determined based on the first metadata. Additionally, the action of the randomly-provided combination is determined based on the first metadata.

In the generated poll, the time window is to be expressed in a negative time unit to suggest that the poll relates to a portion of the media content item that has been presented prior to the generation of the poll.

In some embodiments, the time window of the randomly-provided combination is defined from a start point. Additionally, the person of the randomly-provided combination is determined based on the first metadata. Additionally, the action of the randomly-provided combination is determined based on the first metadata.

In the generated poll, the time window is to be expressed in a positive time unit to suggest that the poll relates to a portion of the media content item that has not been presented prior to the generation of the poll.

BRIEF DESCRIPTION OF THE FIGURES

FIG. 2 illustrates the steps of an example for improving user engagement on a media content item being presented in accordance with some implementations of the disclosure;

FIG. 3 depicts the steps of an example for improving user engagement on a media content item being presented in accordance with some implementations of the disclosure;

FIG. 4 shows the steps of an example for improving user engagement on a media content item being presented in accordance with some implementations of the disclosure;

FIG. 5 represents the steps of an example for improving user engagement on a media content item being presented in accordance with some implementations of the disclosure;

DETAILED DESCRIPTION

As referred to herein, the terms "content item" should be understood to mean an electronically consumable user asset, such as an electronic version of a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, articles, newspapers, blogs, advertisements, chat sessions, social media, applications, games, and/or any other media or multimedia and/or combination of the same.

Figure 1:
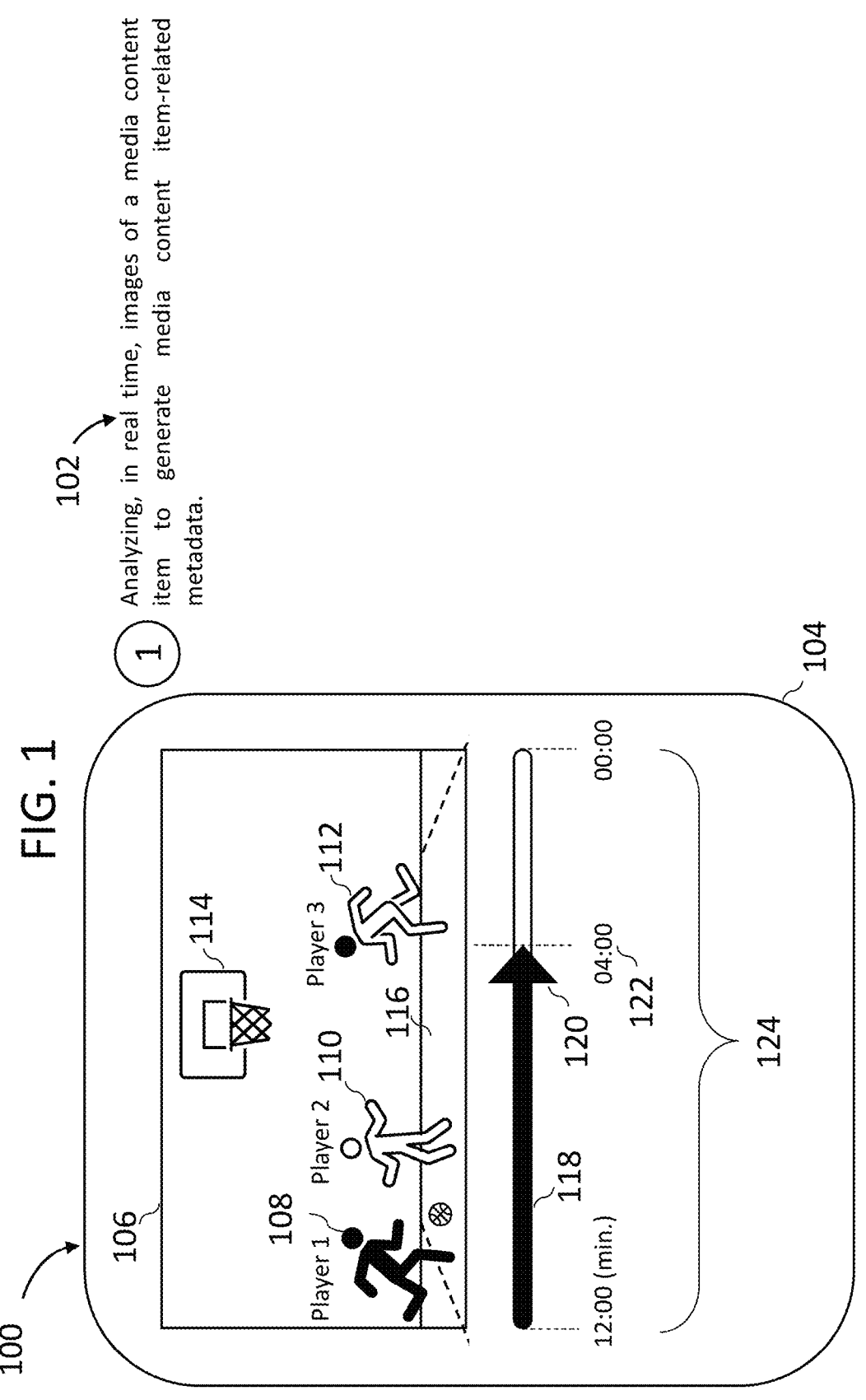
FIG. 1 represents the steps of an example for improving user engagement on a media content item being presented, in accordance with some implementations of the disclosure.

FIG. 1 represents the steps of an example 100 for improving, by a device 104, user engagement on a media content item being presented in accordance with some implementations of the disclosure. In some embodiments, device 104 is a client device (e.g., a user device such as a mobile phone, a tablet, a computer, a television and the likes) that is in communication with a server (e.g., local or remote server) via a communication network (e.g., LAN or WAN): device 104 is able to produce, during the presentation of the media content item or while the media content item is paused, screens or windows of a user interface with which a user can interact. In some embodiments, device 104 is a server (e.g., local or remote server) connected to a client device via a communication network (e.g., LAN or WAN) such that the server is able to produce screens or windows of a user interface accessible via the client device during the presentation of the media content item or while the media content item is paused, and with which a user can interact.

In some embodiments, at step 102, device 104 analyzes, in real-time, images (or frames) of a media content item, using an advanced computer vision and machine learning algorithm, so as to determine each event, the event outcome(s) related to each event and the count of the event outcome(s) so as generate media content item-related metadata. For instance, device 104 analyzes an image 106 of a camera-recorded live media content item about a basketball match wherein Team 1 and Team 2 face each other. There is a progress bar 118 and a progress indicator 120 indicating a timestamp 122 of image 106, corresponding to the countdown time of the first period 124, equal to 4:00 minutes. Image 106 includes a depiction 108 of Player 1 from Team 1, a depiction 110 of Player 2 from Team 2 and a depiction 112 of Player 3 from Team 2 wherein Player 1, Player 2 and Player 3 are located in a key 116 of Team 2's backcourt. In some approaches, at step 102, device 104 transcribes image 106 into media content item-related metadata 126 which comprise text. During a time increment (e.g., 1 second) from 3:59 minutes to 4:00 minutes, Player 1 has just entered the key of Team 2's backcourt and is dribbling towards the basket of Team 2: Player 1 is on offense. During the same time increment (e.g., 1 second) Player 2 is guarding Player 1 while trying to steal the ball from Player 1: Player 2 is on defense. During the same time increment (e.g., 1 second), Player 3 is running towards Player 1 and Player 2: Player 3 is on defense. In some approaches, at step 102, device 104 detects an event 128a (e.g., Player 1 is on offense: Player 1 has just entered the "key" of the backcourt of Team 2 and is dribbling towards the basket of Team 2), an event 128b (e.g., Player 2 is on defense: Player 2 is positioned in the "key" of the backcourt of Team 2 and is guarding Player 1 while trying to steal the ball from Player 1) and an event 128c (e.g., Player 3 is on defense; Player 3 is positioned in the "key" of the backcourt of Team 2 and is running towards Player 1 and Player 2).

In some embodiments, at step 130, device 104 establishes a list 132 of pre-defined event categories ('Offense' category (e.g., aiming, shooting, scoring, missing attempt, fouling, committing a violation, etc.); 'Defense' category (e.g., guarding an opponent, marking an opponent, fouling, committing a violation, etc.); 'Technical Fouls' category (e.g., delay-of-game, fighting fouls, etc.);

'Personal Fouls' category (e.g., by dribbler, by screening, offending, etc.); 'Violations' category (e.g, travelling, illegal dribble, cross-court violation, etc.) based on e.g., the type of the media content item (e.g., sport events—e.g., basketball matches—, news coverage, movies, etc.).

In some embodiments, at step 134, device 104 categorizes event 128a, event 128b and event 128c based on media content item-related metadata 126 by assigning event 128a to the 'offense' category 130a, event 128b and event 128c to the 'defense' category 130b. The device categorizes multiple events based on the media asset-related metadata by assigning the multiple events to one or more pre-defined event categories.

In some embodiments, at step 136, device 104 selects, upon a user input, an event category (e.g., 'offense' category) among the event categories relating to the multiple events in the media content item based on the user's direct instruction. Alternatively, the device 104 selects, upon a user input, an event category randomly by identifying each event category with a respective number and activating a random number generator that randomly provides a result corresponding to an event category. The rectangle/arrow object 138 illustrates the selection of the 'offense' category.

In some embodiments, at step 140, device 104 randomly selects at least one event outcome (e.g., 'fouling') within the selected event category (e.g., 'offense' category). The rectangle/arrow object 142 illustrates the randomly selecting of the 'event outcome 'fouling'.

In some embodiments, at step 144, device 104 accesses probabilistic metadata (e.g., odds 146 related to Player 1, statistics about Player 1) to determine a probability of occurrence of the randomly-selected at least one event outcome (e.g., Player 1 fouling).

In some embodiments, at step 148, device 104 generates for display a screen of a user interface, in which the device presents a poll comprising (1) a question (e.g., 150, 158 or 170) related to the randomly-selected at least one event outcome, (2) the randomly-selected at least one event outcome and (3) the probability of occurrence associated with the randomly-selected at least one event outcome based on the probabilistic metadata, each event outcome of the randomly-selected at least one event outcome represented by a selectable element presented on the screen of the user interface, each selectable element named after a respective number to identify an event outcome of the randomly-selected at least one event outcome. Device 104 is accordingly able to propose a poll to a user.

In some instances, at step 148, the randomly-selected at least one event outcome is "Player 1 fouling" and device 104 presents a question 150 "Will Player 1 foul against Player 2 in the next five seconds?", an event outcome 152 "yes" associated with a probability 152a of occurrence of ⅓, an event outcome 154 "No" associated with a probability 154a of occurrence of ⅔ and the possibility to choose an event outcome between event outcome 152 or event outcome 154 as symbolized by the two arrows 156. The poll thus relies on a single event outcome and the device is to choose, upon a user input, whether the randomly-selected at least one event outcome is to occur or not.

In some instances, at step 148, the randomly-selected at least one event outcome is "Player 1 fouling" and device 104 presents a question 158 "How many fouls has Player 1 made so far in the first period?", an event outcome 160 "one" associated with a probability 160a of occurrence of ⅕, an event outcome 162 "two" associated with a probability 162a of occurrence of ⅓, an event outcome 164 "three" associated with a probability 164a of occurrence of 1/10, an event outcome 166 associated with a probability 166a of occurrence of 1/10 and the possibility to choose an event outcome among event outcomes 160, 162, 164 and 166, as symbolized by the four arrows 168. The poll thus relies on a single event outcome and the device is to choose, upon a user device, whether the randomly-selected at least one event outcome is to occur a given amount of times during a time window corresponding to progression points of the media content item.

In some instances, at step 148, the randomly-selected at least one event outcome is "Player 1 fouling" and "Player 1 scoring" and device 104 presents a question 170 "Will Player 1 foul against Player 2 or scores in the next five seconds?", an event outcome 172 "Player 1 fouling" associated with a probability 172a of occurrence of ⅓, an event outcome 174 "Player 1 scoring" associated with a probability 174a of occurrence of ⅙ and the possibility to choose an event outcome between event outcome 172 and event outcome 174, as symbolized by the two arrows 176. The poll relies on multiple event outcomes and the device is to choose, upon a user input, whether one of the randomly-selected at least one event outcome is to occur.

In some approaches, at step 148, when the device generates for display the poll, the device chooses, upon a user input, an event outcome among the randomly-selected at least one event outcome. A user input enables a given level of control with respect to the choice of the event outcome to be chosen among the randomly-selected at least one event outcome, depending on the type of the user input used. In some examples, the device chooses, upon a user input, a selectable element, directly indicated by the user, corresponding to an event outcome of the randomly-selected at least one event outcome. Alternatively, the device chooses, upon a user input, a selectable element (e.g., button such as a 'press' button) that does not correspond to an event outcome of the randomly-selected at least one event outcome, causing the device to randomly provide an event outcome among the randomly-selected at least one event outcome using a random number generator: different types of screen (e.g., second screen) can be used to achieve it.

Figure 2:
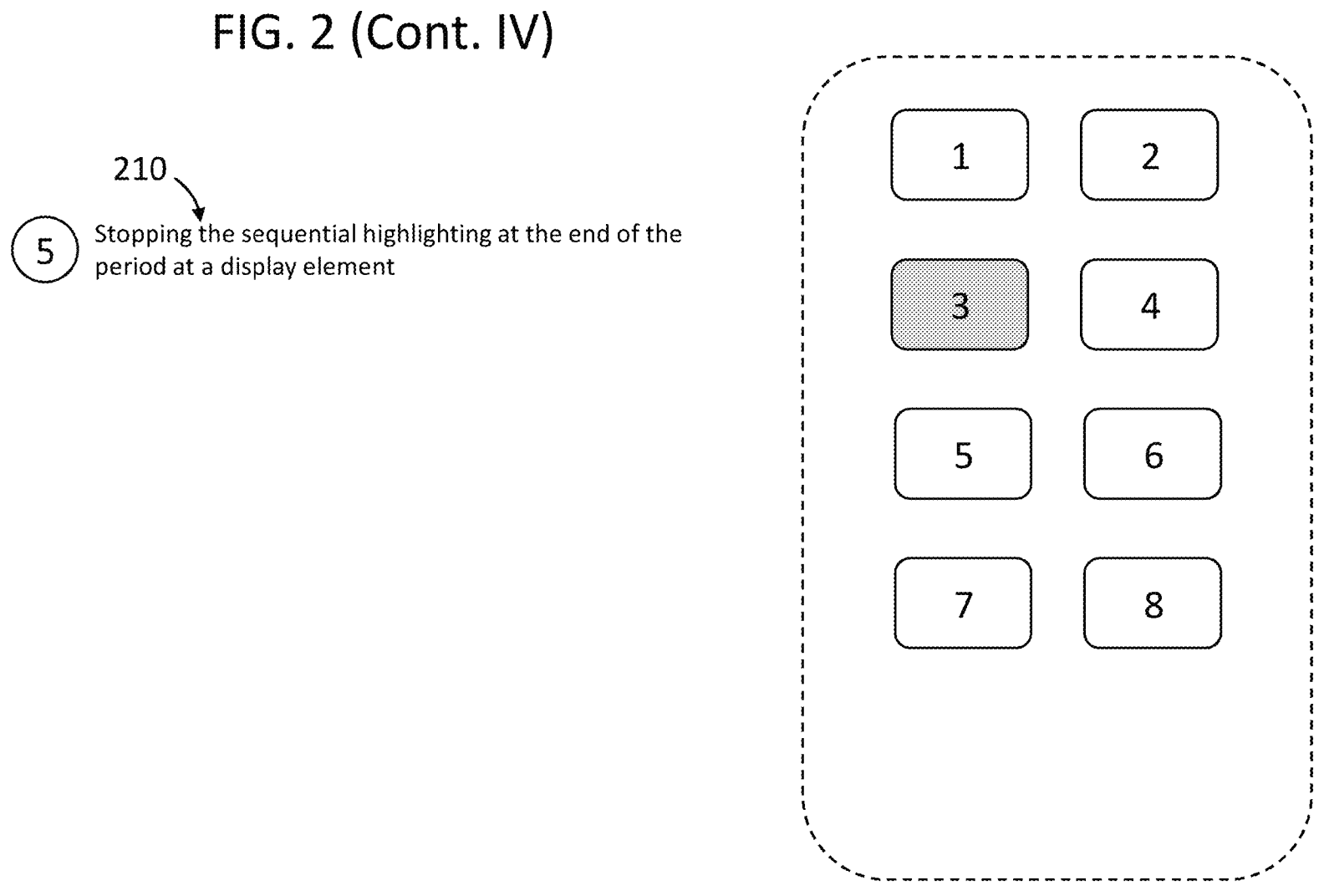

FIG. 2 illustrates the steps of an example 200 for improving, by a device, user engagement on a media content item being presented in accordance with some implementations of the disclosure. In some embodiments, the device is a client device (e.g., a user device such as a mobile phone, a tablet, a computer, a television and the likes) that is in communication with a server (e.g., local or remote server) via a communication network (e.g., LAN or WAN): the device is able to produce, during the presentation of the media content item or while the media content item is paused, screens or windows of a user interface with which a user can interact. In some embodiments, the device is a server (e.g., local or remote server) connected to a client device via a communication network (e.g., LAN or WAN) such that the server is able to produce screens or windows of a user interface accessible via the client device during the presentation of the media content item or while the media content item is paused, and with which a user can interact.

In some embodiments, at step 202, the device identifies each event outcome of the randomly-selected at least one event outcome by a respective number. In some instances, there are eight event outcomes within the randomly-selected at least one event outcome: event outcome "S", event outcome "T", event outcome "U", event outcome "V", event outcome "W", event outcome "X", event outcome "Y" and event outcome "Z" are named after "1", "2", "3", "4", "5", "6", "7" and "8", respectively.

In some embodiments, at step 204, the device launches a screen 212 of a user interface that is to randomly provide a result matching the respective number of one of the randomly-selected at least one event outcome. Screen 212 depicts a 'press' button 216 (to trigger the sequential highlighting of eight display elements) and eight display elements 214a, 214b, 214c, 214d, 214e, 214f, 214g and 214h, each display element named after a respective number from 1 to 8, each respective number corresponding to an event outcome of the randomly-selected at least one event outcome.

In some embodiments, at step 206, the device activates 'press' button 216 upon a user input so as to trigger the sequential highlighting of eight display elements 214a, 214b, 214c, 214d, 214e, 214f, 214g and 214h. In some approaches, at step 206, the device activates a random number generator that determines the highlighting of a first display element (among the eight display elements 214a, 214b, 214c, 214d, 214e, 214f, 214g and 214h) at the start of the first time increment, by selecting the number after which the first display element is named. Additionally, the device activates the random number generator to determine the period during which the sequential highlighting of the display elements is to last. In some instances, the device selects the time increment such that a human could perceive the highlighting of each display element. In some instances, the time increment belongs to the time interval [0.1 second, 1 second]. In some instances, the period is a multiple of the time increment. In some instances, the multiple corresponds to the product of the number of the randomly-selected at least one event outcome by a factor, the factor belonging to the interval [1, 100]. In some instances, the device determines the factor using a random number generator so as to randomly determine the period. In some instances, the first display element to be highlighted is display element 214d named after "4".

In some embodiments, at step 208, the device compels the sequential highlighting of the display elements to adopt a circular-like motion. The device compels the sequential highlighting of the display elements to adopt a circular-like motion during a period.

In some embodiments, at step 210, the device stops the sequential highlighting at the end of the period. The number after which the last display element to be highlighted is named corresponds to a randomly-provided result corresponding to an event outcome of the randomly-selected at least one outcome. In some instances, the last display element to be highlighted during the last time increment of the period is display element 214c named after "3" and remains highlighted after the end of the period in order to indicate that the randomly-provided result is "3" corresponding to event outcome "U" of the randomly-selected at least one event outcome FIG. 3 depicts the steps of an example 300 for improving, by a device, user engagement on a media content item being presented in accordance with some implementations of the disclosure. In some embodiments, the device is a client device (e.g., a user device such as a mobile phone, a tablet, a computer, a television and the likes) that is in communication with a server (e.g., local or remote server) via a communication network (e.g., LAN or WAN): the device is able to produce, during the presentation of the media content item or while the media content item is paused, screens or windows of a user interface with which a user can interact. In some embodiments, the device is a server (e.g., local or remote server) connected to a client device via a communication network (e.g., LAN or WAN) such that the server is able to produce screens or windows of a user interface accessible via the client device during the presentation of the media content item or while the media content item is paused, and with which a user can interact.

In some embodiments, at step 302, the device identifies each event outcome of the randomly-selected at least one event outcome by a respective number. In some instances, there are eight event outcomes within the randomly-selected at least one event outcome: event outcome "S", event outcome "T", event outcome "U", event outcome "V", event outcome "W", event outcome "X", event outcome "Y" and event outcome "Z" are named after "1", "2", "3", "4", "5", "6", "7" and "8", respectively.

In some embodiments, at step 304, the device launches a screen 312 of a user interface that is to randomly provide a result matching the respective number of one of the randomly-selected at least one event outcome. Screen 312 depicts a 'press' button 316 (to trigger the sequential highlighting of eight display elements) and eight display elements 314a, 314b, 314c, 314d, 314e, 314f, 314g and 314h, each display element named after a respective number from 1 to 8, each respective number corresponding to an event outcome of the randomly-selected at least one event outcome.

In some embodiments, at step 306, the device activates 'press' button 316 upon a user input so as to trigger the simultaneous motions of the eight display elements 314a, 314b, 314c, 314d, 314e, 314f, 314g and 314h into the same circular-like trajectory at the same velocity.

In some embodiments, at step 308, the device compels the simultaneous motions of the eight display elements 314a, 314b, 314c, 314d, 314e, 314f, 314g and 314h into the same circular-like trajectory at the same velocity during a period.

In some embodiments, at step 310, the device activates a random number generator that determines the disappearance of a first display element (among the eight display elements 314a, 314b, 314c, 314d, 314e, 314f, 314g and 314h) at the end of the first time increment, by randomly providing the number after which the first display element is named. In some instances, the device selects the time increment such that a human could perceive the simultaneous motions of the plurality of the display elements and the disappearance of all display elements but one. In some instances, the time increment belongs to the time interval [0.1 second, 1 second]. In some instances, the period is a multiple of the time increment. In some instances, the multiple corresponds to the product of the number of the randomly-selected at least one event outcome by a factor, the factor belonging to the interval [1, 100]. In some instances, the device determines the factor using a random number generator so as to randomly determine the period. In some instances, the first display element to be removed is display element 314f named after "6".

In some embodiments, at step 312, after the device has activated the random number generator to determine the display elements to disappear at the end of each time increment (up to the last remaining display element), the device presents a single display element i.e., the last remaining display element at the end of the period. The number after which the last remaining display element is named corresponds to a randomly-provided result corresponding to an event outcome of the randomly-selected at least one outcome. In some instances, the remaining display element is display element 314h named after "8", corresponding to event outcome "Z" of the randomly-selected at least one event outcome.

FIG. 4 shows the steps of an example 400 for improving, by a device, user engagement on a media content item being presented in accordance with some implementations of the disclosure In some embodiments, the device is a client device (e.g., a user device such as a mobile phone, a tablet, a computer, a television and the likes) that is in communication with a server (e.g., local or remote server) via a communication network (e.g., LAN or WAN): the device is able to produce, during the presentation of the media content item or while the media content item is paused, screens or windows of a user interface with which a user can interact. In some embodiments, the device is a server (e.g., local or remote server) connected to a client device via a communication network (e.g., LAN or WAN) such that the server is able to produce screens or windows of a user interface accessible via the client device during the presentation of the media content item or while the media content item is paused, and with which a user can interact.

In some embodiments, at step 402, the device identifies each event outcome of the randomly-selected at least one event outcome by a respective number. In some instances, there are eight event outcomes within the randomly-selected at least one event outcome: event outcome "S", event outcome "T", event outcome "U", event outcome "V", event outcome "W", event outcome "X", event outcome "Y" and event outcome "Z" are named after "1", "2", "3", "4", "5", "6", "7" and "8", respectively.

In some embodiments, at step 404, the device launches a screen 412 of a user interface that is to randomly provide a result matching the respective number of one of the randomly-selected at least one event outcome. Screen 412 depicts a 'press' button 416 (to trigger the spinning of a roulette) and a roulette subdivided into eight regions, each region comprising compartments 414a, 414b, 414c, 414d, 414e, 414f, 414g and 414h, each region named after a respective number from 1 to 8, each respective number corresponding to an event outcome of the randomly-selected at least one event outcome.

In some embodiments, at step 406, the device activates 'press' button 416 upon a user input so as to trigger the spinning of the roulette and subsequently the dropping of a ball. In some embodiments, at step 406, the device activates a random number generator to determine at least one of the following parameters: the time increment of the first period, the first period, the maximum spinning velocity, the acceleration of the roulette during each time increment of the first period (i.e., the mathematical function of the acceleration of the spinning roulette against the time), the time increment of the second period, the second period and the deceleration of the spinning roulette during each time increment of the second period (i.e., the mathematical function of the deceleration of the spinning roulette against the time). In some instances, the device selects the time increment such that a human could perceive the motion of the ball. In some instances, the time increment belongs to the time interval [0.1 second, 1 second]. In some instances, the period is a multiple of the time increment. In some instances, the multiple corresponds to the product of the number of the randomly-selected at least one event outcome by a factor, the factor belonging to the interval [1, 100]. In some instances, the device determines the factor using a random number generator so as to randomly determine the first period and the second period.

In some embodiments, at step 408, the device increases the spinning velocity of the roulette during each time increment of a first period, until the spinning velocity of the roulette reaches a maximum spinning velocity at the end of the first period.

In some embodiments, at step 410, the device decreases the spinning velocity of the roulette during each time increment of a second period.

In some embodiments, at step 412, the device sets the spinning velocity of the roulette to zero (rotation per minute) at the end of the last time increment of the second period in order to trap the ball in a compartment located in a region of the roulette named after a number corresponding to an event outcome of the randomly-selected at least one event outcome. In some instances, at step 412, the ball is trapped in the region 414a named after "1" corresponding to event outcome "S" of the randomly-selected at least one event outcome.

Figure 5:
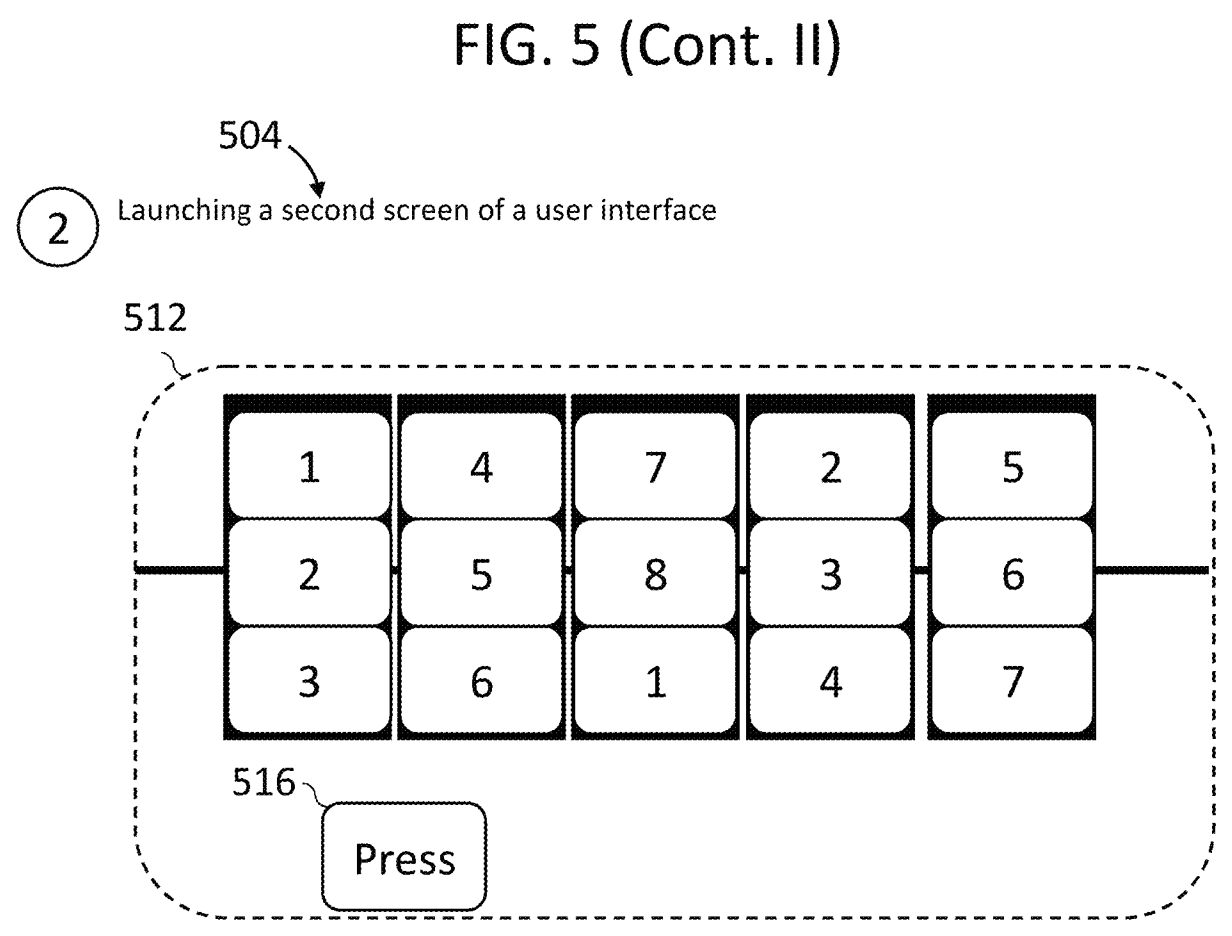

FIG. 5 represents the steps of an example 500 for improving, by a device, user engagement on a media content item being presented in accordance with some implementations of the disclosure. In some embodiments, the device is a client device (e.g., a user device such as a mobile phone, a tablet, a computer, a television and the likes) that is in communication with a server (e.g., local or remote server) via a communication network (e.g., LAN or WAN): the device is able to produce, during the presentation of the media content item or while the media content item is paused, screens or windows of a user interface with which a user can interact. In some embodiments, the device is a server (e.g., local or remote server) connected to a client device via a communication network (e.g., LAN or WAN) such that the server is able to produce screens or windows of a user interface accessible via the client device during the presentation of the media content item or while the media content item is paused, and with which a user can interact.

In some embodiments, at step 502, the device identifies each event outcome of the randomly-selected at least one event outcome by a respective number. In some instances, there are eight event outcomes within the randomly-selected at least one event outcome: event outcome "S", event outcome "T", event outcome "U", event outcome "V", event outcome "W", event outcome "X", event outcome "Y" and event outcome "Z" are named after "1", "2", "3", "4", "5", "6", "7" and "8", respectively.

In some embodiments, at step 504, the device launches a screen 512 of a user interface that is to randomly provide a result matching the respective number of one of the randomly-selected at least one event outcome. Screen 512 depicts a 'press' button 516 (to trigger the spinning of each wheel) and a slot machine comprising five wheels, the rim of each wheel being subdivided in eight portions 514a, 514b, 514c, 514d, 514e, 514f, 514g and 514h, each portion named after a respective number from 1 to 8, each respective number corresponding to an event outcome of the randomly-selected at least one event outcome. In some instances, the number of portions presented is equal to three per wheel.

In some embodiments, at step 506, the device activates 'press' button 516 upon a user input so as to trigger the spinning of each wheel. In some approaches, at step 506, the device activates a random number generator to determine at least one of the following parameters: the respective maximum spinning velocity of each wheel, the time increment of the first period, the first period, the acceleration of each wheel during each time increment of the first period (i.e., the mathematical function of the acceleration of each wheel against the time), the time increment of the second period, the second period and the deceleration of each wheel during each time increment of the second period (i.e., the mathematical function of the deceleration of each wheel against the time).

In some embodiments, at step 508, the device increases the spinning velocity of each wheel during each time increment of a first period, until the spinning velocity of each wheel reaches a respective maximum spinning velocity at the end of the first period.

In some embodiments, at step 510, the device decreases the spinning velocity of each wheel during each time increment of a second period.

In some embodiments, at step 512, the device sets the spinning velocity of last spinning wheel of the slot machine to zero (rotation per minute) at the end of the last time increment of the second period. In some approaches, at step 512, the device determines the most frequent portion in the plurality of portions presented so as to randomly provide a result corresponding to an event outcome of the randomly-selected at least one event outcome. (In some instances, the most frequent portion in the plurality of the portions presented is the portion named after "4" corresponding to event outcome "V" of the randomly-selected at least one event outcome). Alternatively, the device determines the least frequent portion in the plurality of portions presented so as to randomly provide a result corresponding to an event outcome of the randomly-selected at least one event outcome. Alternatively, the device performs at least one calculation based on the portions presented so as to randomly provide a result corresponding to an event outcome of the randomly-selected at least one event outcome.

Figure 6:
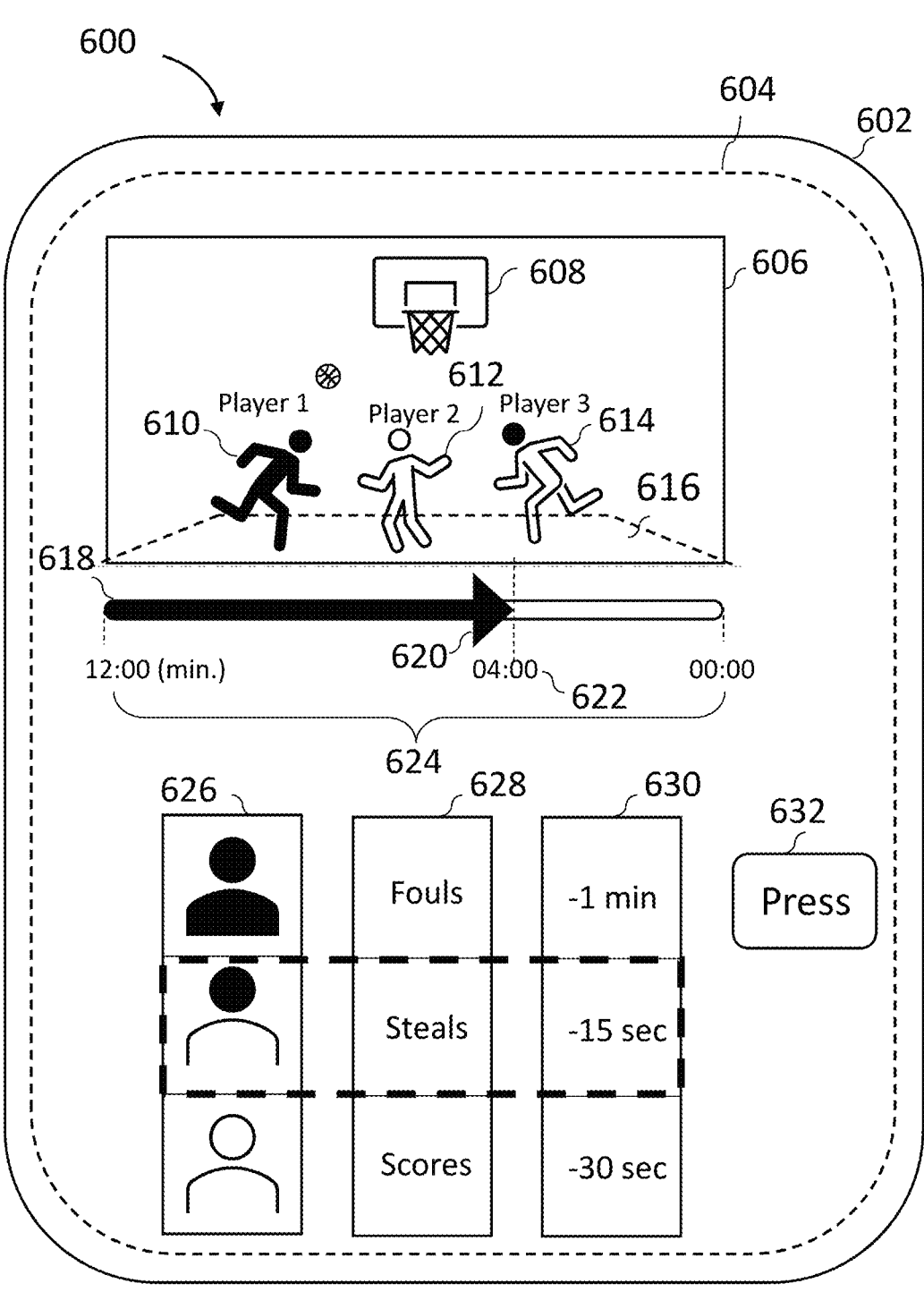
FIG. 6 shows an example for improving user engagement on a media content item being presented in accordance with some implementations of the disclosure.

FIG. 6 shows an example 600 for improving, by a device 602, user engagement on a media content item being presented in accordance with some implementations of the disclosure. In some embodiments, device 602 is a client device (e.g., a user device such as a mobile phone, a tablet, a computer, a television and the likes) that is in communication with a server (e.g., local or remote server) via a communication network (e.g., LAN or WAN): device 602 is able to produce, during the presentation of the media content item or while the media content item is paused, screens or windows of a user interface with which a user can interact. In some embodiments, device 602 is a server (e.g., local or remote server) connected to a client device via a communication network (e.g., LAN or WAN) such that the server is able to produce screens or windows of a user interface accessible via the client device during the presentation of the media content item or while the media content item is paused, and with which a user can interact.

Device 602 presents a screen 604 depicting an image 606 of a media content item (that is being presented), a progress bar 618 including a progress indicator 620 indicating a timestamp 622 of image 606, corresponding to the countdown time of the first period 624, equal to 4:00 minutes. Image 606 includes a depiction 610 of Player 1 from Team 1, a depiction 612 of Player 2 from Team 2 and a depiction 614 of Player 3 from Team 2 which are all located in a key 616 of Team 2's backcourt. Player 1 is on offense: Player 1 has just shot the ball towards the basket of Team 2. During the same time increment (e.g., 1 second), Player 2 is on defense: Player 2 is trying to steal the ball from Player 1. During the same time increment (e.g., 1 second), Player 3 is on defense: Player 3 is running towards Player 1 and Player 2.

In some embodiments, the device requests a user input to credit an account in order to wager an item of value (corresponding to e.g., an amount of country currency, digital currency, imaginary currency or a combination thereof) on a specific event outcome. In some embodiments, the device requests a user input to determine the item of value that is to be wagered on an event outcome.

In some embodiments, at timestamp 622, the device pauses the media content item and highlights a 'press' button 632 to indicate that the device can activate 'press' button 632 upon a user input. In some embodiments, at timestamp 622, the device maintains the presentation of the media content item and highlights 'press' button 632 for a duration during which the device can 'press' button 632.

In some embodiments, the device activates 'press' button 632 upon a user input so as to trigger the spinning of several wheels, each wheel dedicated to a respective field (e.g., players, actions, time windows of different lengths). In some embodiments, the device analyzes, in real-time, images of the media content item using an advanced computer vision and machine learning algorithm to generate annotated metadata (related to the media content item). The device then determines the field of each wheel, the number of portions of each wheel and the content of each portion using the annotated metadata related to the media content item. Additionally or alternatively, the device retrieves annotated metadata related to a media content item (especially when the media content item has already been analyzed by an advanced computer vision and machine learning algorithm).

In some embodiments, the device activates 'press' button 632 upon a user input so as to trigger the spinning of three wheels 626, 628 and 630. The rim of the first wheel 626 is subdivided into several portions, each portion corresponding to a single player (e.g., player 610, player 612 and player 614). The rim of the second wheel is subdivided into several portions, each portion corresponding to an action (e.g., fouls, steals, scores). The rim of the third wheel is subdivided into several portions, each portion corresponding to a time window expressed in e.g., seconds, minutes. In some embodiments, the time windows are negative, indicating that the combination player/action/time window is a past event outcome that may have happen or not before the timestamp at which the device highlighted the 'press' button. In some embodiments, the time windows are positive, indicating that the combination player/action/time window is a future event outcome that may occur or not after the timestamp at which the device highlighted the 'press' button. In some embodiments, the media content item is a camera-recorded live event e.g., a sport event such as a basketball match, news coverage, etc. In some embodiments, the media content item is a camera-recorded past real event (e.g., sport event, news coverage, etc.) or a fictitious event recorded on camera (e.g., movies based or not on true event).

In some embodiments, the device increases, decreases then stops the spinning velocity of each wheel and determines a combination player/action/time window by considering one row (e.g., horizontal line, diagonal line) encompassing one portion of each wheel, that is presented. In some instances, the combination player/action/time window is Player 2/Steals/-15 seconds which corresponds to having "Has Player 2 stolen the ball within a 15-seconds time window that has passed?" as a question inherent to the poll. In some embodiments, if the poll is won, the received reward depends upon the rules set by the company using device 602 to present the basketball match. For instance, the user could win a basketball match ticket.

In some embodiments, supplemental content item (e.g., advertisements, breaking news) is presented next to the wheels when the wheels spin.

Figure 7:
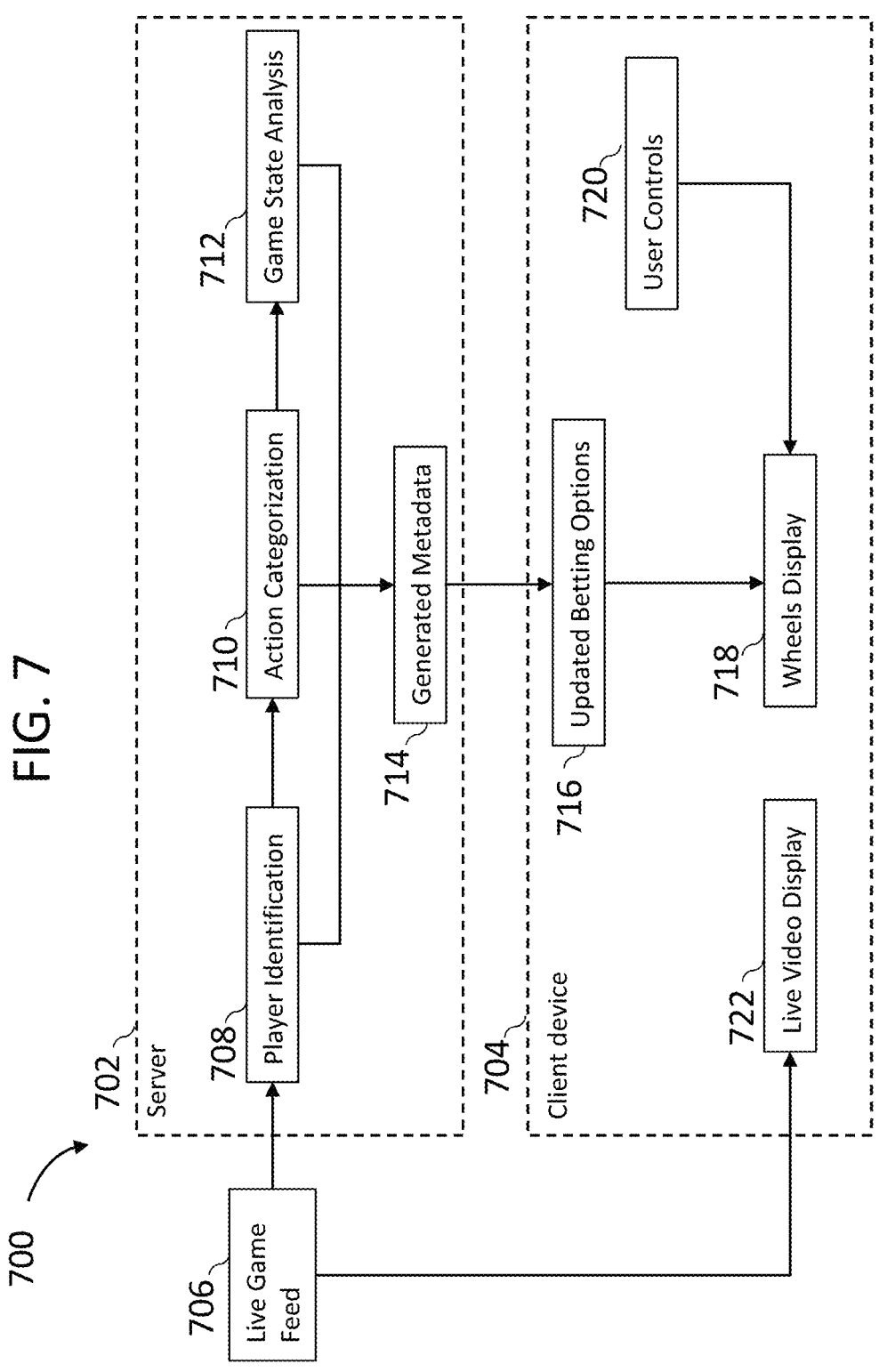
FIG. 7 illustrates a flowchart describing an example for improving user engagement on a media content item being presented in accordance with some implementations of the disclosure.

FIG. 7 illustrates a flowchart describing an example 700 for improving, by a device, user engagement on a media content item being presented, in accordance with some implementations of the disclosure.

In some embodiments, a server 702 requests the forwarding of a live game feed 706. In some embodiments, server 702 analyzes live game feed 706 using an advanced computer vision and machine learning algorithm so as to achieve a player identification 708, an action categorization 710 and a game state analysis 712, resulting in the provision of generated metadata 714.

In some embodiments, a client device 704 requests the forwarding of live game feed 706 so as to present it as a live video display 722. In some embodiments, client device 704 simultaneously requests, from server 702, generated metadata 714. In some embodiments, server 702 forwards generated metadata 714 to client device 704. Client device 704 generates updated betting options 716 based on generated metadata 714. Client device 704 updates the wheel display based on the updated betting options 716.

Figure 8:
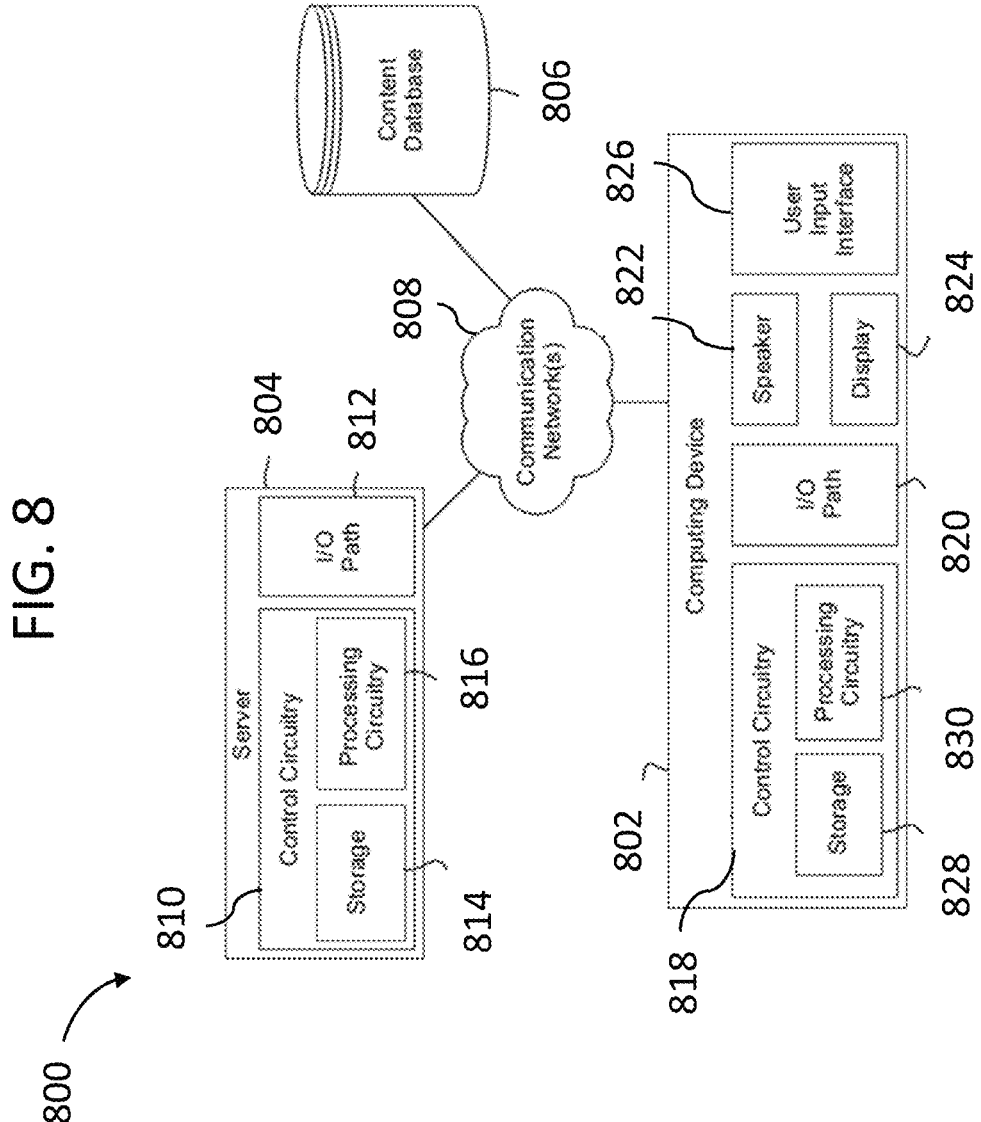
FIG. 8 depicts a block diagram showing components of an example for improving user engagement on a media content item being presented in accordance with some implementations of the disclosure.

FIG. 8 depicts a block diagram showing components of an example system 800 for improving, by a device, user engagement on a media content item being presented in accordance with some implementations of the disclosure. Although FIG. 8 shows system 800 as including a number and configuration of individual components, in some examples, any number of the components of system 800 is combined and/or integrated as one device, e.g., as device 104, device 602, client device 704, any one of devices of FIGS. 2 to 5, any one of devices of FIGS. 9 to 11. System 800 includes computing device 802, server 804, and content database 806, each of which is communicatively coupled to communication network 808, which is the Internet or any other suitable network or group of networks. In some examples, system 800 excludes server 804, and functionality that would otherwise be implemented by server 804 is instead implemented by other components of system 800, such as computing device 802. In still other examples, server 804 works in conjunction with computing device 802 to implement certain functionality described herein in a distributed or cooperative manner.

Server 804 includes control circuitry 810 and input/output (hereinafter "I/O") path 812, and control circuitry 810 includes storage 814 and processing circuitry 816. Computing device 802, which can be a personal computer, a laptop computer, a tablet computer, a smartphone, a smart television, a smart speaker, or any other type of computing device, includes control circuitry 818, I/O path 820, speaker 822, display 824, and user input interface 826, which in some examples provides a user selectable option for enabling and disabling the display of modified closed captions. Control circuitry 818 includes storage 828 and processing circuitry 830. Control circuitry 810 and/or 818 is based on any suitable processing circuitry such as processing circuitry 816 and/or 830. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and includes a multi-core processor (e.g., dual-core, quad-core, hexa-core, or any suitable number of cores). In some examples, processing circuitry is distributed across multiple separate processors, for example, multiple of the same type of processors (e.g., two Intel Core i9 processors) or multiple different processors (e.g., an Intel Core i7 processor and an Intel Core i9 processor).

Each of storage 814, storage 828, and/or storages of other components of system 800 (e.g., storages of content database 806, and/or the like) is an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 814, storage 828, and/or storages of other components of system 800 is used to store various types of content, metadata, and or other types of data. Non-volatile memory also is used (e.g., to launch a boot-up routine and other instructions). Cloud-based storage is used to supplement storages 814, 828 or instead of storages 814, 828. In some examples, control circuitry 810 and/or 818 executes instructions for an application stored in memory (e.g., storage 814 and/or 828). Specifically, control circuitry 810 and/or 818 is instructed by the application to perform the functions discussed herein. In some implementations, any action performed by control circuitry 810 and/or 818 is based on instructions received from the application. For example, the application is implemented as software or a set of executable instructions that is stored in storage 814 and/or 828 and executed by control circuitry 810 and/or 818. In some examples, the application is a client/server application where only a client application resides on computing device 802, and a server application resides on server 804.

The application is implemented using any suitable architecture. For example, it is a stand-alone application wholly implemented on computing device 802. In such an approach, instructions for the application are stored locally (e.g., in storage 828), and data for use by the application is downloaded on a periodic basis (e.g., from an out-of-band feed, from an Internet resource, or using another suitable approach). Control circuitry 818 retrieves instructions for the application from storage 828 and process the instructions to perform the functionality described herein. Based on the processed instructions, control circuitry 818 determines what action to perform when input is received from user input interface 826.

In client/server-based examples, control circuitry 818 includes communication circuitry suitable for communicating with an application server (e.g., server 804) or other networks or servers. The instructions for carrying out the functionality described herein are stored on the application server. Communication circuitry includes a cable modem, an Ethernet card, or a wireless modem for communication with other equipment, or any other suitable communication circuitry. Such communication involves the Internet or any other suitable communication networks or paths (e.g., communication network 808). In another example of a client/server based application, control circuitry 818 runs a web browser that interprets web pages provided by a remote server (e.g., server 804). For example, the remote server stores the instructions for the application in a storage device. The remote server processes the stored instructions using circuitry (e.g., control circuitry 810) and/or generates displays. Computing device 802 receives the displays generated by the remote server and displays the content of the displays locally via display 824. This way, the processing of the instructions is performed remotely (e.g., by server 804) while the resulting displays are provided locally on computing device 802. Computing device 802 receives inputs from the user via input interface 826 and transmits those inputs to the remote server for processing and generating the corresponding displays.

A user sends instructions, e.g., to view an interactive media content item and/or selects one or more programming options of the interactive media content item, to control circuitry 810 and/or 818 using user input interface 826. User input interface 826 is any suitable user interface, such as a remote control, trackball, keypad, keyboard, touchscreen, touchpad, stylus input, joystick, speech recognition interface, gaming controller, or other user input interfaces. User input interface 826 is integrated with or combined with display 824, which can be a monitor, a television, a liquid crystal display (LCD), an electronic ink display, or any other equipment suitable for displaying visual images.

Server 804 and computing device 802 transmits and receives content and data via I/O path 812 and 820, respectively. For instance, I/O path 812 and/or I/O path 820 includes a communication port(s) configured to transmit and/or receive (for instance to and/or from content database 806), via communication network 808, content item identifiers, content metadata, natural language queries, and/or other data. Control circuitry 810, 818 is used to send and receive commands, requests, and other suitable data using I/O paths 812, 820. I/O paths 812 of server 804 and I/O paths 820 of computing device 802 each comprises I/O circuitry e.g., network interface, port, bus, wire.

Figure 9:
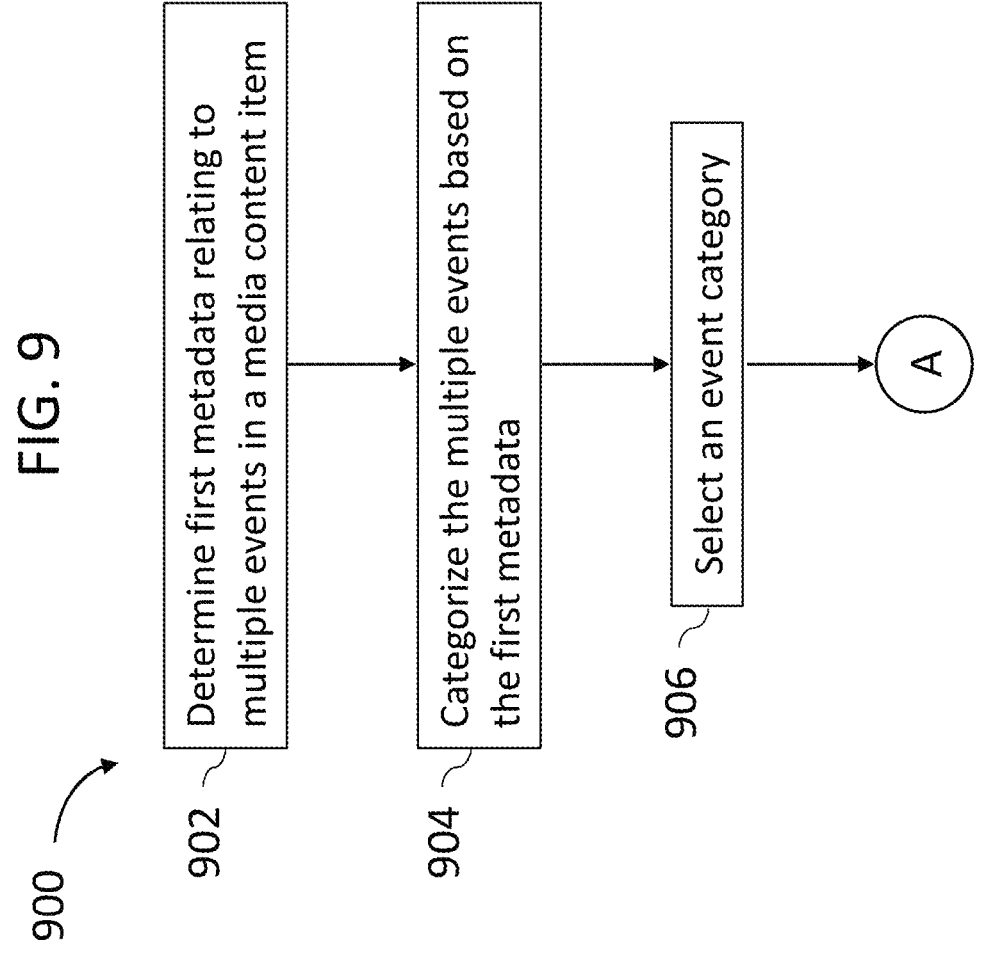
FIG. 9 represents a flowchart describing an example for improving user engagement on a media content item being presented in accordance with some implementations of the disclosure.

FIG. 9 represents a flowchart 900 describing an example for improving user engagement on a media content item being presented in accordance with some implementations of the disclosure. In some embodiments, the device is a client device (e.g., a user device such as a mobile phone, a tablet, a computer, a television and the likes) that is in communication with a server (e.g., local or remote server) via a communication network (e.g., LAN or WAN): such is the case for e.g., device 104, device 602, any one of devices of FIGS. 2 to 5 and any one of devices of FIGS. 9 to 11 (when the device is a client device) as well as client device 704 and computing device 802. The device is able to produce, during the presentation of the media content item or while the media content item is paused, screens or windows of a user interface with which a user can interact. In some embodiments, the device is a server (e.g., local or remote server) connected to a client device via a communication network (e.g., LAN or WAN) such that the server is able to produce screens or windows of a user interface accessible via the client device during the presentation of the media content item or while the media content item is paused, and with which a user can interact: such is the case for e.g., device 104, device 602, any one of devices of FIGS. 2 to 5 and any one of devices of FIGS. 9 to 11 (when the device is a server) as well as server 702 and server 804.

In some embodiments, at step 902, control circuitry of the device (e.g., control circuitry 810 of server 804 or control circuitry 818 of computing device 802) determines first metadata relating to multiple events in a media content item (e.g., image 106 or image 606). In some approaches, at step 902, the control circuitry of the device analyzes the media content item using an advanced computer vision and machine learning algorithm so as to identify and count event outcomes and generate annotated metadata (comprising e.g., first metadata) related to the media content item.

In some embodiments, at step 904, the control circuitry of the device categorizes the multiple events based on the first metadata. In some approaches, at step 904, the control circuitry of the device accesses a list of pre-defined event categories, wherein each event category comprises at least one event outcome. Additionally, the control circuitry of the device compares each event outcome whose count was determined with the at least one event outcome of each event category. In response to the comparing, the control circuitry of the device assigns each event outcome whose count was determined to at least one event category.

In some embodiments, at step 906, the control circuitry of the device selects an event category (e.g., 'Offense' category 132*a* (e.g., aiming, shooting, scoring, missing attempt, fouling, committing a violation, etc.), 'Defense' category 132*b*

(e.g., guarding an opponent, marking an opponent, fouling, committing a violation, etc.), 'Technical Fouls' category (e.g., delay-of-game, fighting fouls, etc.), 'Personal Fouls' category (e.g., by dribbler, by screening, offending, etc.), 'Violations' category (e.g, travelling, illegal dribble, cross-court violation, etc.)). In some approaches, the control circuitry of the device selects an event category upon a user input reflecting the user's instruction (e.g., rectangle/arrow object 138). Alternatively, the control circuitry of the device randomly selects an event category using a random number generator after having identified each event category by a respective number. In some approaches, at step 906, the device selects, upon a user input (e.g., reflecting directly the user's instruction or randomly selected), an event category among the event categories to which at least one event outcome related to the media content item subject of the poll has been assigned.

In some embodiments, at step 908, the control circuitry of the device selects, randomly, at least one event outcome within the selected event category. In some approaches, the control circuitry of the device selects, randomly, at least one event outcome within the selected event category using a random number generator after having identified each event outcome within an event category.

In some embodiments, at step 910, the control circuitry of the device accesses second metadata to determine a probability of occurrence of the at least one event outcome. In some approaches, at step 910, the control circuitry of the device generates the second metadata using an algorithm that computes the amount of favorable event outcomes and the total amount of possible event outcomes so as to determine the probability of occurrence of each event outcome of the randomly-selected at least one event outcome. Alternatively, the control circuitry of the device retrieves a database comprising the second metadata.

In some embodiments, at step 912, the control circuitry of the device generates for display, on a first screen of a user interface, at least one selectable element (e.g., display elements 152, 154, 160, 162, 164, 166, 172, 174, display elements 214*a* to 214*h*, display elements 314*a* to 314*h*, regions comprising compartments 414*a* to 414*h*, portions 514*a* to 514*h* of each of the five wheels in FIG. 5, portions of wheels 626, 628 and 630 in FIG. 6) for each event outcome of the randomly-selected at least one event outcome (e.g., event outcomes mentioned in step 202, event outcomes mentioned in step 302, event outcomes mentioned in step 402, event outcomes mentioned in step 502), allowing the selection of a selectable element related to an event outcome of the randomly-selected at least one event outcome. In some approaches, at step 912, the control circuitry of the device presents each probability of occurrence related to a respective event outcome of the randomly-selected at least one event outcome either on a selectable element corresponding to the respective event outcome of the randomly-selected at least one event outcome, or in the vicinity of the corresponding selectable element such that the user can easily associate each probability of occurrence with the respective selectable element.

Figure 10:
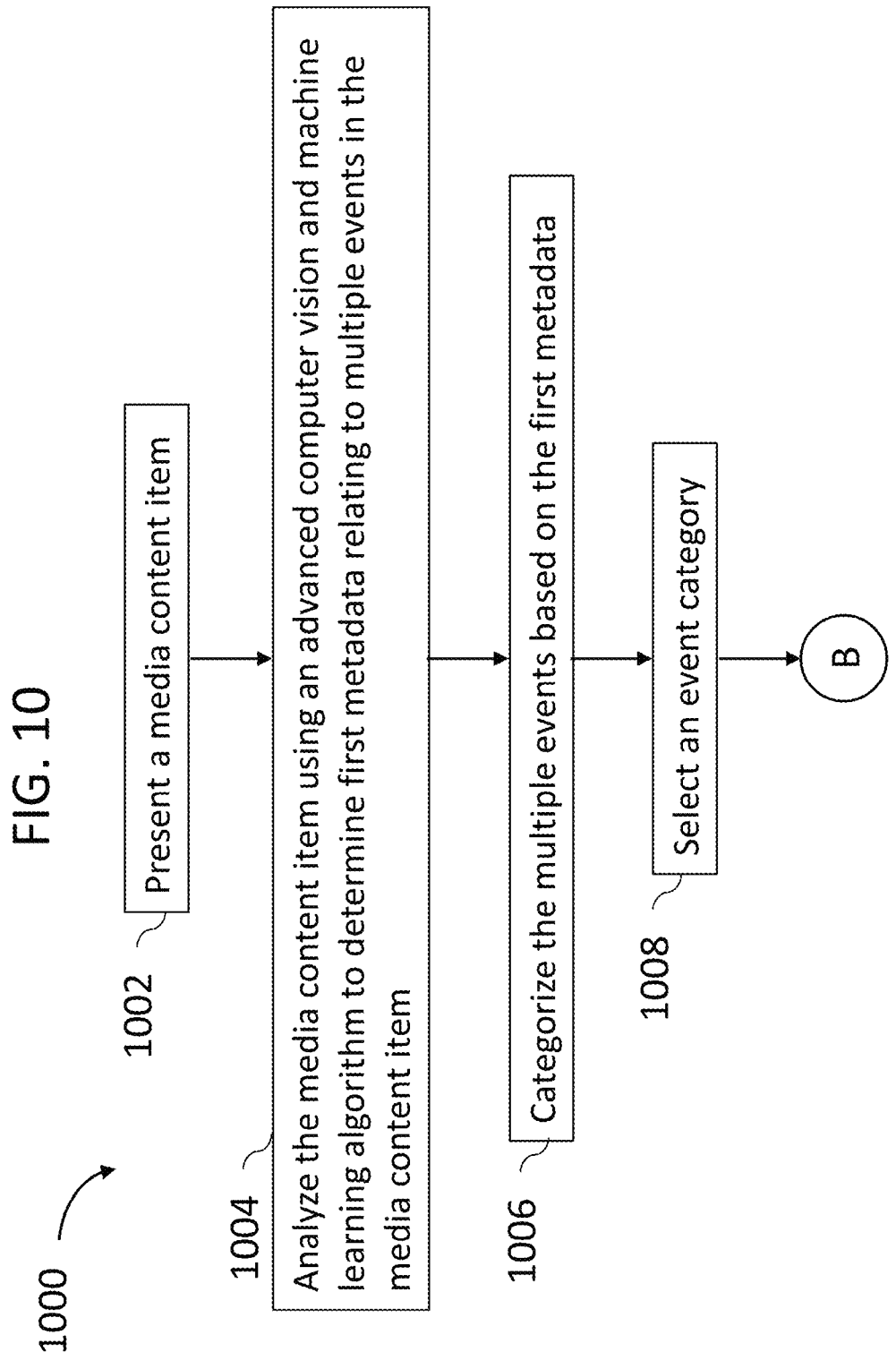
FIG. 10 shows a flowchart describing an example for improving user engagement on a media content item being presented in accordance with some implementations of the disclosure.

FIG. 10 shows a flowchart 1000 describing an example for improving user engagement on a media content item being presented in accordance with some implementations of the disclosure. In some embodiments, the device is a client device (e.g., a user device such as a mobile phone, a tablet, a computer, a television and the likes) that is in communication with a server (e.g., local or remote server) via a communication network (e.g., LAN or WAN): such is the case for e.g., device 104, device 602, any one of devices of FIGS. 2 to 5 and any one of devices of FIGS. 9 to 11 (when the device is a client device) as well as client device 704 and computing device 802. The device is able to produce, during the presentation of the media content item or while the media content item is paused, screens or windows of a user interface with which a user can interact. In some embodiments, the device is a server (e.g., local or remote server) connected to a client device via a communication network (e.g., LAN or WAN) such that the server is able to produce screens or windows of a user interface accessible via the client device during the presentation of the media content item or while the media content item is paused, and with which a user can interact: such is the case for e.g., device 104, device 602, any one of devices of FIGS. 2 to 5 and any one of devices of FIGS. 9 to 11 (when the device is a server) as well as server 702 and server 804.

In some embodiments, at step 1002, control circuitry of the device (e.g., control circuitry 810 of server 804 or control circuitry 818 of computing device 802) presents a media content item (e.g., image 106 or image 606). In some approaches, at step 1002, the control circuitry of the device presents a live media content item. Alternatively, at step 1002, the control circuitry of the device presents a media content item that has already been presented.

In some embodiments, at step 1004, the control circuitry of the device analyzes images of the media content item using an advanced computer vision and machine learning algorithm to determine first metadata relating to multiple events in the media content item. In some approaches, at step 1004, the control circuitry of the device analyzes images of the media content item using an advanced computer vision and machine learning algorithm so as to identify and count event outcomes and generate annotated metadata (comprising e.g., first metadata) related to the multiple events of the media content item.

In some embodiments, at step 1006, the control circuitry of the device categorizes the multiple events based on the first metadata. In some approaches, at step 1006, the control circuitry of the device accesses a list of pre-defined event categories, wherein each event category comprises at least one event outcome. Additionally, the control circuitry of the device compares each event outcome whose count was determined with the at least one event outcome of each event category. In response to the comparing, the control circuitry of the device assigns each event outcome whose count was determined to at least one event category.

In some embodiments, at step 1008, the control circuitry of the device selects an event category (e.g., 'Offense' category 132*a* (e.g., aiming, shooting, scoring, missing attempt, fouling, committing a violation, etc.), 'Defense' category 132*b* (e.g., guarding an opponent, marking an opponent, fouling, committing a violation, etc.), 'Technical Fouls' category (e.g., delay-of-game, fighting fouls, etc.), 'Personal Fouls' category (e.g., by dribbler, by screening, offending, etc.), 'Violations' category (e.g, travelling, illegal dribble, cross-court violation, etc.)). In some approaches, the control circuitry of the device selects an event category upon a user input reflecting the user's instruction (e.g., rectangle/arrow object 138). Alternatively, the control circuitry of the device randomly selects an event category using a random number generator after having identified each event category by a respective number. In some approaches, at step 1008, the device selects, upon a user input (e.g., reflecting directly the user's instruction or randomly selected), an event category among the event categories to which at least one event outcome related to the media content item subject of the poll has been assigned.

In some embodiments, at step 1010, the control circuitry of the device selects, randomly, at least one event outcome within the selected event category. In some approaches, the control circuitry of the device selects, randomly, at least one event outcome within the selected event category using a random number generator after having identified each event outcome within an event category.

In some embodiments, at step 1012, the control circuitry of the device accesses second metadata to determine a probability of occurrence of the at least one event outcome. In some approaches, at step 1010, the control circuitry of the device generates the second metadata using an algorithm that computes the amount of favorable event outcomes and the total amount of possible event outcomes so as to determine the probability of occurrence of each event outcome of the randomly-selected at least one event outcome. Alternatively, the control circuitry of the device retrieves a database comprising the second metadata.

In some embodiments, at step 1014, the control circuitry of the device generates for display, on a first screen of a user interface, at least one selectable element (e.g., display elements 152, 154, 160, 162, 164, 166, 172, 174, display elements 214a to 214h, display elements 314a to 314h, regions comprising compartments 414a to 414h, portions 514a to 514h of each of the five wheels in FIG. 5, portions of wheels 626, 628 and 630 in FIG. 6) for each event outcome of the randomly-selected at least one event outcome (e.g., event outcomes mentioned in step 202, event outcomes mentioned in step 302, event outcomes mentioned in step 402, event outcomes mentioned in step 502), allowing the selection of a selectable element related to an event outcome of the randomly-selected at least one event outcome. In some approaches, at step 1014, the control circuitry of the device presents each probability of occurrence related to a respective event outcome of the randomly-selected at least one event outcome either on a selectable element corresponding to the respective event outcome of the randomly-selected at least one event outcome, or in the vicinity of the corresponding selectable element such that the user can easily associate each probability of occurrence with the respective selectable element.

In some embodiments, at step 1016, the control circuitry of the device identifies each event outcome of the randomly-selected at least one event outcome by a respective number.

In some embodiments, at step 1018, the control circuitry of the device launches a second screen of the user interface that randomly provides a result matching the respective number of one of the randomly-selected at least one event outcome. Afterwards, the control circuitry of the device chooses one of the available second screens 1020 to 1026 to proceed to step 1028.

In some embodiments, at step 1020, the control circuitry of the device sequentially highlights the selectable elements during a period using a random number generator (See FIG. 2). At the end of the period, the highlighted selectable element corresponds to a randomly-provided result corresponding to an event outcome of the randomly-selected at least one event outcome.

In some embodiments, at step 1022, the control circuitry of the device sequentially removes all the selectable elements but one during a period using a random number generator (See FIG. 3). At the end of the period, the remaining selectable element corresponds to a randomly-provided result corresponding to an event outcome of the randomly-selected at least one event outcome.

In some embodiments, at step 1024, the control circuitry of the device uses a roulette subdivided in regions, each region representing a selectable element, so as to randomly-provide a result corresponding to an event outcome of the randomly-selected at least one event outcome (See FIG. 4). At the end of a period, the ball dropped while the roulette was spinning loses its momentum and gets trapped within one of the regions corresponding the randomly-provided result corresponding to an event outcome of the randomly-selected at least one event outcome.

In some embodiments, at step 1026, the control circuitry of the device uses a slot machine comprising at least one wheel, the rim of each wheel being subdivided in portions, each portion representing a selectable element, so as to randomly-provide a result corresponding to an event outcome of the randomly-selected at least one event outcome (See FIG. 5). At the end of a period, all wheels have stopped spinning: the control circuitry uses the portions presented to randomly provide the result corresponding to an event outcome of the randomly-selected at least one event outcome. In some instances, at step 1026, the control circuitry of the device determines a randomly-provided result corresponding to a single event outcome of the randomly-selected at least one event outcome by e.g., determining the most frequent (or less frequent number) shown on the portions presented, using the numbers of at least a part of the portions presented into a calculation, etc.

In some embodiments, at step 1028, the control circuitry of the device randomly provide the result matching the respective number of one of the randomly-selected at least one event outcome.

In some embodiments, at step 1030, the control circuitry of the device launches a third screen of the user interface that randomly provides a result corresponding to a value of a token, the token corresponding to a representation of an amount of country currency, digital currency, imaginary currency or any combination thereof. In some approaches, at step 1030, the third screen comprises a plurality of display elements, each display element of the plurality of display elements is named after a respective number corresponding to a single value of the token such that the amount of display elements is equal to the number of single values of the token. In some instances, at step 1030, the control circuitry of the device determines the number of single values of the token using a random number generator. In some instances, at step 1030, the control circuitry of the device determines each single value of the token using a random number generator. In some instances, at step 1030, the control circuitry of the device determines each single value of the token using a random number generator, after a user input has set a range within which each single value of the token lies. In some instances, at step 1030, the control circuitry of the device uses a third screen similar to a second screen of e.g., any one of steps 1020 to 1026 in order to randomly provide a result corresponding to a value of a token.

In some embodiments, at step 1032, the control circuitry of the device checks whether the randomly-provided event outcome of the randomly-selected at least one event outcome is the winning event outcome. In some embodiments, at step 1032, the control circuitry of the device presents the progression points of the media content item relevant to the poll. If the randomly-provided event outcome of the randomly-selected at least one event outcome is the winning event outcome, the control circuitry of the device proceeds to step 1034. Otherwise, the control circuitry of the device proceeds to step 1036.

In some embodiments, at step 1034, the control circuitry of the device provides a reward based on the value of the token and the probability of occurrence. Afterwards, the control circuitry of the device proceeds back to step 1004 so as to provide matter to generate a new poll.

In some embodiments, at step 1034, the control circuitry of the device does not provide a reward and transfers the token to the bank. Afterwards, the control circuitry of the device proceeds back to step 1004 so as to provide matter to generate a new poll.

Figure 11:
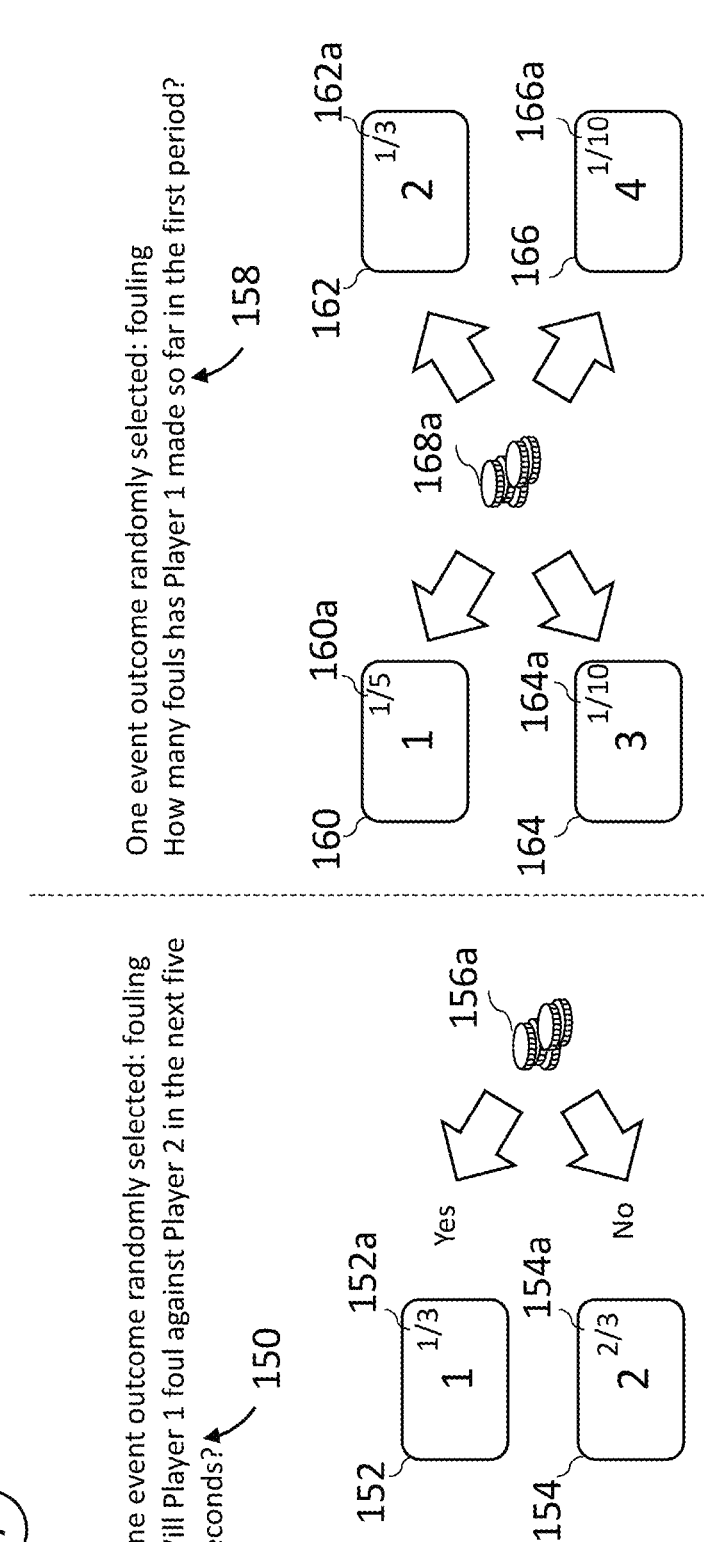
FIG. 11 represents an alternative of the last step of the example of FIG. 1.

FIG. 11 represents an alternative 148*a* of the last step 148 of the example of FIG. 1.

In some embodiments, at step 148*a*, device 104 generates for display a screen of a user interface, in which the device presents a poll comprising (1) a question (e.g., 150, 158 or 170) related to the randomly-selected at least one event outcome, (2) the randomly-selected at least one event outcome and (3) the probability of occurrence based on the probabilistic metadata associated with the randomly-selected at least one event outcome, each event outcome of the randomly-selected at least one event outcome represented by a selectable element presented on the screen of the user interface, each selectable element named after a respective number to identify an event outcome of the randomly-selected at least one event outcome. Device 104 is accordingly able to propose a bet to a user.

In some instances, at step 148*a*, the randomly-selected at least one event outcome is "Player 1 fouling" and device 104 presents a question 150 "Will Player 1 foul against Player 2 in the next five seconds?", an event outcome 152 "yes" associated with a probability 152*a* of occurrence of ⅓, an event outcome 154 "No" associated with a probability 154*a* of occurrence of ⅔ and the possibility to wager a token 156*a* on an event outcome (e.g., event outcome 152 or 154). The poll thus relies on a single event outcome and the device is to choose, upon a user input, whether the randomly-selected at least one event outcome is to occur or not.

In some instances, at step 148*a*, the randomly-selected at least one event outcome is "Player 1 fouling" and device 104 presents a question 158 "How many fouls has Player 1 made so far in the first period?", an event outcome 160 "one" associated with a probability 160*a* of occurrence of ⅕, an event outcome 162 "two" associated with a probability 162*a* of occurrence of ⅓, an event outcome 164 "three" associated with a probability 164*a* of occurrence of ⅒, an event outcome 166 associated with a probability 166*a* of occurrence of ⅒ and the possibility to wager a token 168*a* on an event outcome among event outcomes 160, 162, 164 and 166. The poll thus relies on a single event outcome and the device is to choose, upon a user device, whether the randomly-selected at least one event outcome is to occur a given amount of times during a time window corresponding to progression points of the media content item.

In some instances, at step 148*a*, the randomly-selected at least one event outcome is "Player 1 fouling" and "Player 1 scoring" and device 104 presents a question 170 "Will Player 1 foul against Player 2 or scores in the next five seconds?", an event outcome 172 "Player 1 fouling" associated with a probability 172*a* of occurrence of ⅓, an event outcome 174 "Player 1 scoring" associated with a probability 174*a* of occurrence of ⅙ and the possibility to wager a token 176*a* on an event outcome (e.g., event outcome 172 or 174). The poll relies on multiple event outcomes and the device is to choose, upon a user input, whether one of the randomly-selected at least one event outcome is to occur.

In some approaches, at step 148*a*, when the device generates for display the poll, the device chooses, upon a user input, an event outcome among the randomly-selected at least one event outcome. A user input enables a given level of control with respect to the choice of the event outcome to be chosen among the randomly-selected at least one event outcome, depending on the type of the user input used. In some examples, the device chooses, upon a user input, a selectable element, directly indicated by the user, corresponding to an event outcome of the randomly-selected at least one event outcome. Alternatively, the device chooses, upon a user input, a selectable element (e.g., button such as a 'press' button) that does not correspond to an event outcome of the randomly-selected at least one event outcome, causing the device to randomly provide an event outcome among the randomly-selected at least one event outcome using a random number generator: different types of screen (e.g., second screen) can be used to achieve it.

In some embodiments, at step 148*a*, the device launches a third screen of the user interface that randomly provides a result corresponding to a value of the token, wherein the token corresponds to a representation of an amount of country currency, digital currency, imaginary currency or any combination thereof.

In some approaches, at step 148*a*, the third screen comprises a plurality of display elements, each display element of the plurality of display elements is named after a respective number corresponding to a single value of the token such that the amount of display elements is equal to the number of single values of the token. In some instances, the device determines the number of single values of the token using a random number generator. In some instances, the device determines each single value of the token using a random number generator. In some instances, the device determines each single value of the token using a random number generator, after a user input has set a range within which each single values of the token lies. Additionally, the third screen comprises a depiction of a button (e.g., a 'press' button) that triggers the sequential highlighting of the plurality of display elements. During each time increment of a period, a single display element of the plurality of display elements is highlighted such that the sequence of the highlighted display elements follows a pattern. In some instances, the pattern is random: the device determines the time increment, the period, and the random pattern by establishing the sequence of the highlighted display elements using the respective numbers after which the display elements are named, using a random number generator. In some instances, the pattern corresponds to the circumference of the space bound by the plurality of the display elements: the device determines the first display element to be highlighted (using the respective numbers after which the display elements are named), the time increment and the period, using a random number generator.

During the last time increment of the period, a last display element of the plurality of the display elements is highlighted and the highlighting of the last display element continues after the period has passed so as to emphasize that the respective number after which the last display element is named corresponds to a randomly-provided result corresponding to a single value of the token. In some instances, the device selects the time increment such that a human could perceive the highlighting of each display element. In some instances, the time increment belongs to the time interval [0.1 second, 1 second]. In some instances, the period is a multiple of the time increment. In some instances, the multiple corresponds to the product of the amount of the randomly-selected at least one event outcome by a factor, the factor belonging to the interval [1, 100]. In some instances, the device determines the factor using a random number generator so as to randomly determine the period. In some instances, non-transitory computer-readable instructions encoded on a non-transitory computer-readable medium and executed by control circuitry of the device comprise instructions to control a random number generator so as to determine e.g., the sequence of display elements to be sequentially highlighted, the time increment during which a given display element is highlighted and the period beyond which a last display is maintained highlighted.

In some approaches, at step 148*a*, the third screen comprises a plurality of display elements, each display element of the plurality of display elements is named after a respective number corresponding to a single value of the token such that the amount of display elements is equal to the number of single values of the token. In some instances, the device determines the number of single values of the token using a random number generator. In some instances, the device determines each single value of the token using a random number generator. In some instances, the device determines each single value of the token using a random number generator, after a user input has set a range within which each single values of the token lies. Additionally, the third screen comprises a depiction of button (e.g., a 'press' button) that triggers the simultaneous motions of the plurality of display elements. In some instances, the plurality of the display elements follows a same circular-like trajectory at a same velocity. In some instances, the plurality of the display elements follows the circumference of the space initially bound by the plurality of the display elements, at a same velocity. During each time increment of a period, each display element runs a same distance of the same circular-like trajectory. In some instances, at the end of each time increment of a period, a single display element of the plurality of display elements disappears from the third screen. In some instances, at the end of each time increment of a period, the device selects the display element to disappear using a random number generator and the respective numbers after which the plurality of the display elements is named. At the end of the last time increment of the period, only a last display element of the plurality of the display elements remains: the respective number after which the last display element is named corresponds to a randomly-provided result corresponding to a single value of the token. In some instances, the device selects the time increment such that a human could perceive the simultaneous motion of each display element. In some instances, the time increment belongs to the time interval [0.1 second, 1 second]. In some instances, the period is a multiple of the time increment. In some instances, the multiple corresponds to the product of the amount of the randomly-selected at least one event outcome by a factor, the factor belonging to the interval [1, 100]. In some instances, the device determines the factor using a random number generator so as to randomly determine the period. In some instances, non-transitory computer-readable instructions encoded on a non-transitory computer-readable medium and executed by control circuitry of the device comprise instructions to control a random number generator so as to determine e.g., the display element to disappear from the second screen at the end of each time increment, the time increment and the period beyond which a last display remains on the second screen.

In some approaches, at step 148*a*, the third screen comprises a display element including a depiction of a roulette subdivided into regions, each region named after a respective number corresponding to a single value of the token such that the number of regions is equal to the amount of the single values of the token. In some instances, the device determines the number of single values of the token using a random number generator. In some instances, the device determines each single value of the token using a random number generator. In some instances, the device determines each single value of the token using a random number generator, after a user input has set a range within which each single values of the token lies. Additionally, the third screen comprises a depiction of a button (e.g., a 'press' button) that triggers the spinning of the roulette and subsequently the dropping of a ball. During each time increment of a first period, the spinning velocity of the roulette increases. At the end of the last time increment of the first period, the roulette spins at a maximum spinning velocity. During each time increment of a second period, the spinning velocity of the roulette decreases. At the end of the last time increment of the second period, the spinning velocity becomes null (zero rotation per minute). At the end of the last time increment of the second period, the roulette stops spinning and the ball subsequently loses its momentum and gets trapped in a compartment within a region of the roulette: the respective number after which the region trapping the ball is named corresponds to a randomly-provided result corresponding to a single value of the token. In some instances, the device determines, using a random number generator, at least one of the following parameters: the time increment of the first period, the first period, the maximum spinning velocity, the acceleration of the roulette during each time increment of the first period (i.e., the mathematical function of the acceleration of the spinning roulette against the time), the time increment of the second period, the second period and the deceleration of the spinning roulette during each time increment of the second period (i.e., the mathematical function of the deceleration of the spinning roulette against the time). In some instances, the device selects the time increment such that a human could perceive the motion of the ball. In some instances, the time increment belongs to the time interval [0.1 second, 1 second]. In some instances, the period is a multiple of the time increment. In some instances, the multiple corresponds to the product of the amount of the randomly-selected at least one event outcome by a factor, the factor belonging to the interval [1, 100]. In some instances, the device determines the factor using a random number generator so as to randomly determine the first period and the second period. In some instances, non-transitory computer-readable instructions encoded on a non-transitory computer-readable medium and executed by control circuitry of the device comprise instructions to control a random number generator so as to determine e.g., the time increment of the first period, the first period, the maximum spinning velocity, the acceleration of the roulette during each time increment of the first period (i.e., the mathematical function of the acceleration of the spinning roulette against the time), the time increment of the second period, the second period and the deceleration of the spinning roulette during each time increment of the second period (i.e., the mathematical function of the deceleration of the spinning roulette against the time).

In some approaches, at step 148*a*, the third screen comprises a display element including a depiction of a slot machine comprising at least one wheel, the rim of each wheel being subdivided in portions, each portion displaying a respective number corresponding to a single value of the token. The number of portions of each wheel is equal to the number of the single values of the token. The number of portions presented is equal to at least one or lower than the number of single values of the token. In some instances, the device determines the number of single values of the token using a random number generator. In some instances, the device determines each single value of the token using a random number generator. In some instances, the device determines each single value of the token using a random number generator, after a user input has set a range within which each single values of the token lies. Additionally, the third screen comprises a depiction of a button (e.g., a 'press' button) that triggers the spinning of each wheel. During each time increment of a first period, the spinning velocity of each wheel increases following a respective acceleration. At the end of the last time increment of the first period, each wheel spins at a respective maximum velocity. During each time increment of a second period, the spinning velocity of each wheel decreases following a respective deceleration. At the end of the last time increment of the second period, the last wheel stops spinning. In some instances, the device determines, using a random number generator, at least one of the following parameters: the respective maximum spinning velocity of each wheel, the time increment of the first period, the first period, the acceleration of each wheel during each time increment of the first period (i.e., the mathematical function of the acceleration of each wheel against the time), the time increment of the second period, the second period and the deceleration of each wheel during each time increment of the second period (i.e., the mathematical function of the deceleration of each wheel against the time). In some instances, the device determines the randomly-provided result corresponding to a single value of the token by e.g., determining the most frequent or less frequent number shown on the portions presented, using the numbers of at least a part of the portions presented into a calculation, etc. In some instances, non-transitory computer-readable instructions encoded on a non-transitory computer-readable medium and executed by control circuitry of the device comprise instructions to control a random number generator so as to determine e.g., the respective maximum spinning velocity of each wheel, the time increment of the first period, the first period, the acceleration of each wheel during each time increment of the first period (i.e., the mathematical function of the acceleration of each wheel against the time), the time increment of the second period, the second period and the deceleration of each wheel during each time increment of the second period (i.e., the mathematical function of the deceleration of each wheel against the time).

In some approaches, at step 148a, the third screen comprises a display element including a depiction of a slot machine comprising at least two wheels, the rim of each wheel being subdivided in portions, each portion displaying a respective number corresponding to a single value of the token. The number of portions of each wheel is equal to the number of the single values of the token. The number of portions presented is equal to at least one or lower than the number of single values of the token. In some instances, the device determines the number of single values of the token using a random number generator. In some instances, the device determines each single value of the token using a random number generator. In some instances, the device determines each single value of the token using a random number generator, after a user input has set a range within which each single values of the token lies. At least one wheel is of a first type of wheels while the rest of the wheels are of a second type of wheels. The first type of wheels corresponds to the wheels that randomly provide, upon a user input, a portion corresponding to a part of an event outcome of the randomly-selected at least one event outcome, based on the use of a random number generator. Additionally, the third screen comprises a depiction of a button (e.g., a 'press' button) that triggers the spinning of each wheel. During each time increment of a first period, the spinning velocity of each wheel increases following a respective acceleration. At the end of the last time increment of the first period, each wheel spins at a respective maximum velocity. During each time increment of a second period, the spinning velocity of each wheel decreases following a respective deceleration. At the end of the last time increment of the second period, the last wheel stops spinning. In some instances, the device determines, using a random number generator, at least one of the following parameters: the respective maximum spinning velocity of each wheel, the time increment of the first period, the first period, the acceleration of each wheel during each time increment of the first period (i.e., the mathematical function of the acceleration of each wheel against the time), the time increment of the second period, the second period and the deceleration of each wheel during each time increment of the second period (i.e., the mathematical function of the deceleration of each wheel against the time). The second type of wheels corresponds to the wheels that provide, upon a user input, a portion corresponding to a part of an event outcome of the randomly-selected at least one event outcome, based on the user's direct selection. As soon as the user has selected a portion of a wheel, the wheel becomes a wheel of second type and cannot spin: the portion is then fixed. This allows for applying different levels of randomness in the choice of the event outcome of the randomly-selected at least one event outcome. In some instances, the device determines the randomly-provided result corresponding to a single value of the token by e.g., determining the most frequent or less frequent number shown on the portions presented, using the numbers of at least a part of the portions presented into a calculation, etc. In some instances, non-transitory computer-readable instructions encoded on a non-transitory computer-readable medium and executed by control circuitry of the device comprise instructions to control a random number generator so as to determine e.g., the respective maximum spinning velocity of each wheel of the first type, the time increment of the first period related to the set of wheels of the first type, the first period related to the set of wheels of the first type, the acceleration of each wheel of the first type during each time increment of the first period (i.e., the mathematical function of the acceleration of each wheel against the time), the time increment of the second period related to the set of wheels of the first type, the second period related to the set of wheels of the first type and the deceleration of each wheel of the first type of wheels during each time increment of the second period (i.e., the mathematical function of the deceleration of each wheel against the time).

In some approaches, at step 148a, the device presents a supplemental content item (e.g., advertisements, breaking news, etc.) in conjunction with the presentation of the third screen of the user interface. In some approaches, the device presents a supplemental content item (e.g., advertisements, breaking news, etc.) when the randomly-provided result is being determined based on the third screen of the user interface, irrespective of the way the randomly-provided result is determined (See the five aforementioned ways).

In this way, the device randomly determines the value of the token the user is to wager on the randomly-provided event outcome of the randomly-selected at least one event outcome, resulting in the reduction of the time to place a bet and the decrease of consumption of network resources, computing resources and energy to run those resources.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
determining first metadata relating to a plurality of events in a media content item;
categorizing the plurality of events based on the first metadata to obtain a plurality of event categories;
selecting an event category of the plurality of event categories, wherein the selected event category is associated with a plurality of event outcomes;
selecting, randomly, at least one event outcome of the plurality of event outcomes within the selected event category;
accessing second metadata to determine a probability of occurrence of the at least one event outcome; and
generating for simultaneous display, on a user interface of a device, for each event outcome of the randomly-selected at least one event outcome:
at least one selectable element; and
an indication of the probability of occurrence.

2. The method of claim 1, further comprising:
identifying each event outcome of the randomly-selected at least one event outcome by a respective number; and
launching another user interface that randomly provides a result matching the respective number of one of the randomly-selected at least one event outcome.

3. The method of claim 1, wherein the determining the first metadata relating to the plurality of events further comprises:
analyzing the media content item to determine a count of event outcomes for a predetermined duration based on a first time of presentation of the media content item.

4. The method of claim 3, wherein the categorizing the plurality of events based on the first metadata comprises:
accessing a list of event categories, wherein each event category comprises the at least one event outcome;
comparing each event outcome whose count was determined with the at least one event outcome of each event category; and
in response to the comparing, assigning each event outcome whose count was determined to at least one event category.

5. The method of claim 1, wherein the selecting, randomly, the at least one event outcome within the selected event category comprises:
determining a plurality of time windows in the media content item;
determining a plurality of persons in the media content item; and
determining a plurality of actions in the media content item, performed by a person of the plurality of persons during a time window of the plurality of time windows; and wherein:

a combination of the time window of the plurality of time windows, the person of the plurality of persons and an action of the plurality of actions corresponds to an event outcome of the randomly-selected at least one event outcome.

6. The method of claim 5, further comprising:
launching another user interface that randomly provides the combination of the time window of the plurality of the time windows, the person of the plurality of persons and the action of the plurality of actions.

7. The method of claim 6, wherein:
progression points of the media content item corresponding to the time window of the randomly-provided combination and a supplemental content item are being presented upon a provision of the randomly-provided combination.

8. The method of claim 7, wherein:
the time window of the randomly-provided combination is defined from an end point, wherein the end point comprises a progression point within the media content item;
the person of the randomly-provided combination is determined based on the first metadata; and
the action of the randomly-provided combination is determined based on the first metadata.

9. The method of claim 7, wherein:
the time window of the randomly-provided combination is defined from a start point, wherein the start point comprises a progression point within the media content item;
the person of the randomly-provided combination is determined based on the first metadata; and
the action of the randomly-provided combination is determined based on the first metadata.

10. The method of claim 1, wherein:
determining the first metadata relating to the plurality of events in the media content item comprises identifying one or more persons shown in the media content item; and
accessing the second metadata to determine the probability of occurrence of the at least one event outcome comprises identifying one or more respective statistics for each of the one or more persons, wherein the one or more respective statistics indicate a likelihood of at least one of the one or more persons performing the at least one event outcome.

11. The method of claim 1, further comprising:
generating for display, on the user interface of the device, each of the at least one event outcomes as a respective icon; and
providing an indication of a sequential order of each of the respective icons, wherein the sequential order is arranged circularly.

12. A system comprising:
control circuitry configured to:
determine first metadata relating to a plurality of events in a media content item;
categorize the plurality of events based on the first metadata to obtain a plurality of event categories;
select an event category of the plurality of event categories, wherein the selected event category is associated with a plurality of event outcomes;
select, randomly, at least one event outcome of the plurality of event outcomes within the selected event category;
access second metadata to determine a probability of occurrence of the at least one event outcome; and generate for simultaneous display, a user interface of a device, for each event outcome of the randomly-selected at least one event outcome:

at least one selectable element; and an indication of the probability of occurrence.

13. The system of claim 12, wherein the control circuitry is further configured to:

identify each event outcome of the randomly-selected at least one event outcome by a respective number; and launch another user interface that randomly provides a result matching the respective number of one of the randomly-selected at least one event outcome.

14. The system of claim 12, wherein the control circuitry is further configured to determine the first metadata relating to the plurality of events by:

analyzing the media content item to determine a count of event outcomes for a predetermined duration based on a first time of presentation of the media content item.

15. The system of claim 14, wherein the control circuitry is further configured to categorize the plurality of events based on the first metadata by:

accessing a list of event categories, wherein each event category comprises the at least one event outcome;

comparing each event outcome whose count was determined with the at least one event outcome of each event category; and in response to the comparing, assigning each event outcome whose count was determined to at least one event category.

16. The system of claim 12, wherein the control circuitry is further configured to select, randomly, the at least one event outcome within the selected event category by:

determining a plurality of time windows in the media content item;

determining a plurality of persons in the media content item; and determining a plurality of actions in the media content item, performed by a person of the plurality of persons during a time window of the plurality of time windows; and wherein:

a combination of the time window of the plurality of time windows, the person of the plurality of persons and an action of the plurality of actions corresponds to an event outcome of the randomly-selected at least one event outcome.

17. The system of claim 16, wherein the control circuitry is further configured to:

launch another user interface that randomly provides the combination of the time window of the plurality of time windows, the person of the plurality of persons and the action of the plurality of actions.

18. The system of claim 17, wherein:

progression points of the media content item corresponding to the time window of the randomly-provided combination and a supplemental content item are being presented upon a provision of the randomly-provided combination.

19. The system of claim 18, wherein:

the time window of the randomly-provided combination is defined from an end point, wherein the end point comprises a progression point within the media content item;

the person of the randomly-provided combination is determined based on the first metadata; and the action of the randomly-provided combination is determined based on the first metadata.

20. The system of claim 18, wherein:

the time window of the randomly-provided combination is defined from a start point, wherein the start point comprises a progression point within the media content item;

the person of the randomly-provided combination is determined based on the first metadata; and the action of the randomly-provided combination is determined based on the first metadata.

* * * * *